US006791752B2

(12) United States Patent
Sedlmayr

(10) Patent No.: US 6,791,752 B2
(45) Date of Patent: Sep. 14, 2004

(54) HIGH EFFICIENCY ELECTROMAGNETIC BEAM PROJECTOR, AND SYSTEMS AND METHODS FOR IMPLEMENTATION THEREOF

(75) Inventor: Steven R. Sedlmayr, Gilbert, AZ (US)

(73) Assignee: Au Optronics Corporation (TW)

( * ) Notice: Subject to any disclaimer, the term of this patent is extended or adjusted under 35 U.S.C. 154(b) by 0 days.

(21) Appl. No.: 10/718,926

(22) Filed: Nov. 21, 2003

(65) Prior Publication Data

US 2004/0114234 A1 Jun. 17, 2004

Related U.S. Application Data

(62) Division of application No. 09/821,937, filed on Mar. 30, 2001, now Pat. No. 6,697,197, which is a continuation of application No. 09/502,889, filed on Feb. 11, 2000, now Pat. No. 6,243,198, which is a continuation of application No. 09/309,394, filed on May 10, 1999, now Pat. No. 6,034,818, which is a continuation of application No. 08/743,390, filed on Nov. 4, 1996, now Pat. No. 5,903,388, which is a continuation of application No. 08/344,899, filed on Nov. 25, 1994, now abandoned, which is a continuation of application No. 07/898,952, filed on Jun. 11, 1992, now abandoned.

(51) Int. Cl.$^7$ .............................................. G02B 5/30
(52) U.S. Cl. ...................... 359/497; 359/485; 359/495; 359/502; 349/8; 349/9; 353/20; 353/31
(58) Field of Search ................................. 359/483–485, 359/497, 487, 502, 494–495; 353/8, 20, 31; 349/8, 9

(56) References Cited

U.S. PATENT DOCUMENTS 5,267,029 A * 11/1993 Kurematsu et al. ............ 349/8

* cited by examiner

*Primary Examiner*—Mark A. Robinson
*Assistant Examiner*—Lee Fineman
(74) *Attorney, Agent, or Firm*—Law Office of Roxana H. Yang

(57) ABSTRACT

This invention relates to electromagnetic wave beam paths, formation of the beam, illumination of programmable electromagnetic wave field vector orientation rotating devices ("PEMFVORD") with an electromagnetic beam, and the technique of projection of the modulated beam. This invention also relates to a unique light path and method of forming the light into a rectangular beam to be used for optical projection systems and, more particularly, in a color and/or black and white liquid crystal device (LCD) projectors that produce high resolution, high brightness and/or three-dimensional images. This invention further relates to a device capable of receiving and displaying two-dimensional and three dimensional images.

2 Claims, 45 Drawing Sheets

- S Polarization
+ P Polarization
✳ Random Polarization
↑ Direction of light

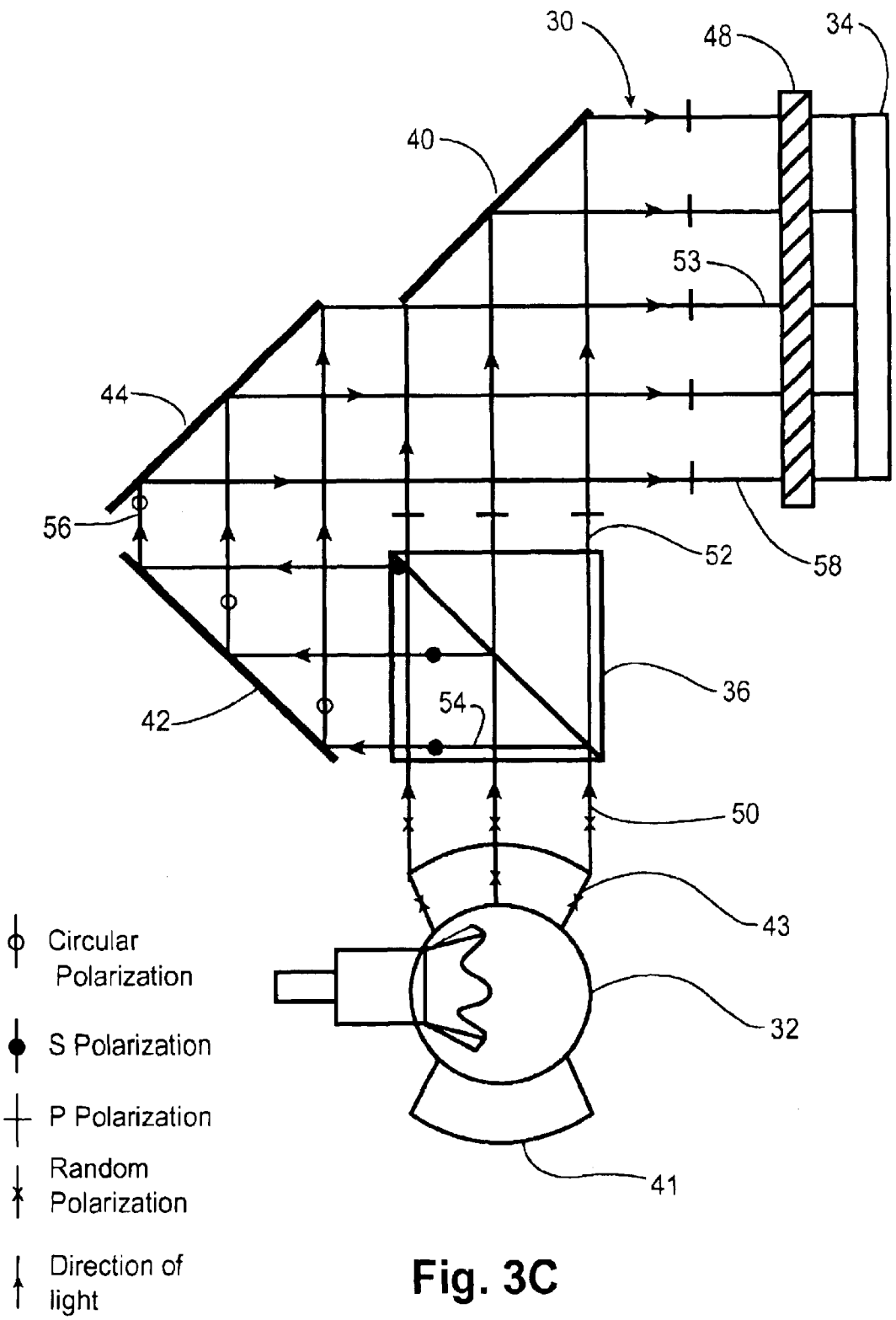

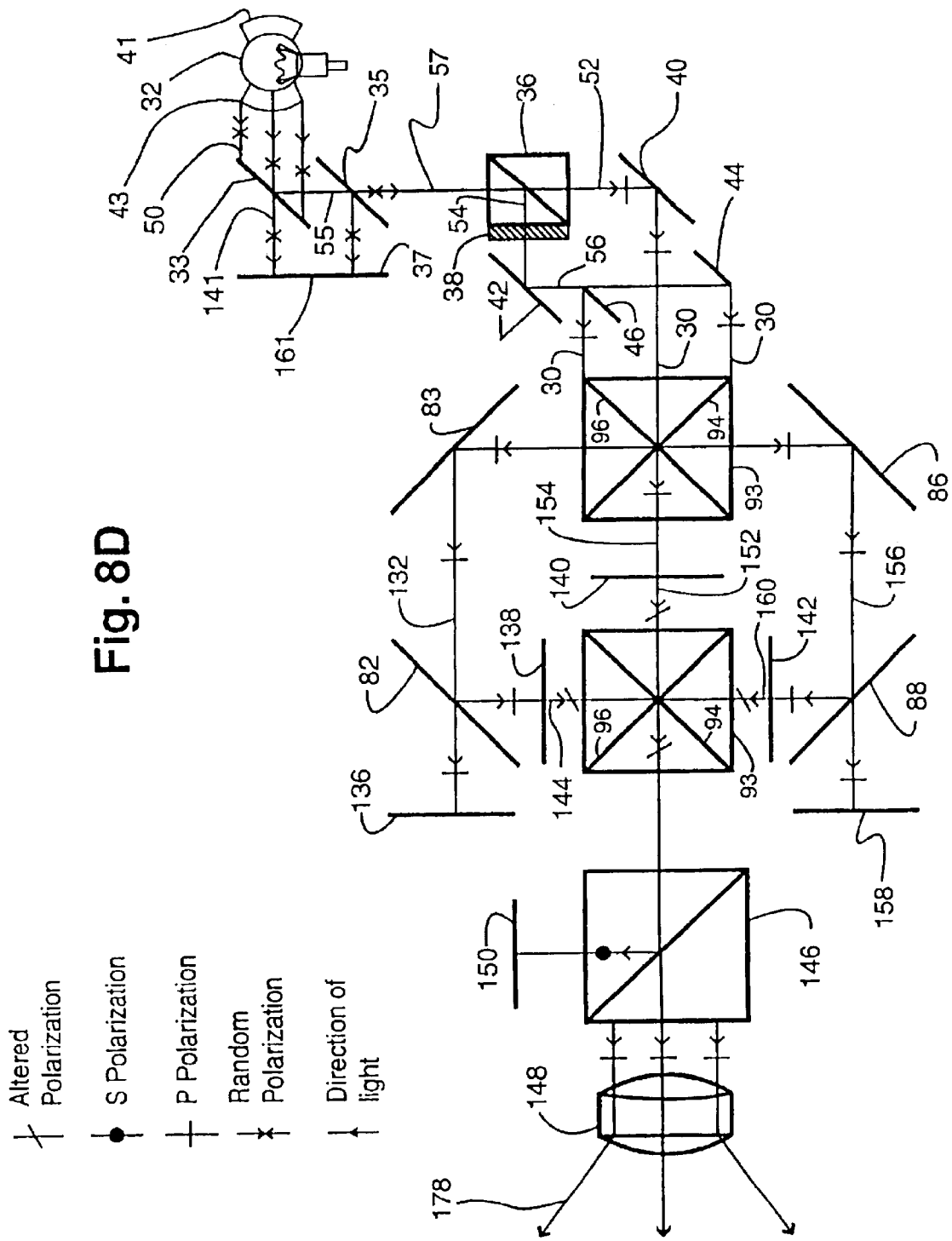

| SOURCE TYPE | LUMENS / WATT (1 PW) | APPARENT COLOR TEMP (°K) | SOURCE SIZE OR TYPE | AVERAGE LUMINANCE (cd/mm2) |
|---|---|---|---|---|
| NATURAL (observed from earth) | | | | |
| Sun | — | 5900K | — | 1600 |
| Moon | — | — | — | 0.0025 |
| Clear Sky | — | 12,000 to 25,000K | — | 0.008 |
| Overcast Sky | — | 6500K | — | 0.002 |
| Lightning Flash | — | — | — | $8 \times 10^4$ |
| COMBUSTION | | | | |
| Candle flame | — | 2000K | 5x5mm | 0.01 |
| Kerosene Flame | — | — | 8x8mm | 0.012 |
| Natural Gas Flame | — | — | 12x12mm | 0.004 |
| Acetylene Flame | — | — | 4x4mm | 0.11 |
| Photoflash Lamp | — | 3800K | varies | 160 to 400 |
| NUCLEAR | | | | |
| Atomic Fission Bomb | — | — | 30 dia | $2 \times 10^6$ |
| Self-Luminous Points | — | — | — | 2 or $3 \times 10^{-7}$ |
| CARBON ARC | | | | |
| Flame Flame | 18 | 3800K | 5x5mm | 180 |
| High Intensity | 22 | 5500-6500K | 8x8mm | 500 to 1500 |
| ENCLOSED ARC | | | | |
| Compact high Pressure | | | | |
| Mercury (100W) | 20 | 8000K | 0.25x0.2mm | 1700 |
| Mercury (200W) | 50 | 7000K | 0.6x2.2mm | 400 |
| Mercury-Xenon (1000W) | 50 | 6000K | 1.5x4.2mm | 350 |
| Xenon(150W) | 19 | 6000K | 0.5x1.9mm | 180 |
| Xenon(1600W) | 37.5 | 6000K | 1.4x4.0mm | 800 |
| Xenon(20,000W) | 57 | 6000K | 3x11mm | 4800 |
| Metal Halide | | | | |
| HMI(1200W) | 92 | 5600K | 2.5x13mm | 120 |
| CSI (1000W) | 80 | 4200K | 5x9mm | 80 |
| CID (1000W) | 62 | 5500K | 5x9mm | 65 |
| MARC 300 | 45 | 5000K | 1x3mm | 400 |
| Zirconium | 2.5 | 3200K | 1.5mm dia | 46 |
| Argon | 17 | 7000K | 3x10mm | 1400 |
| High Intensity Discharge (HID) | | | | |
| Clear Mercury (400W) | 52 | 6000K | 20x68mm | 1.5 |
| Metal Halide (400W) | 85 | 4500K | 20x40mm | 4.2 |
| High Pressure | | | | |
| Sodium (400W) | 125 | 2100K | 8.8x87mm | 6.5 |
| Low Pressure | | | | |
| Fluorescent (cool white) | | | | |
| 430 ma | 80 | 4300K | T12 Bulb | 0.008 |
| 800 ma | 82 | 4300K | T12 Bulb | 0.011 |
| 1500 ma | 70 | 4300K | T12 Bulb | 0.017 |
| Sodium | 150 | 1700K | | .1 |
| ELECTROLUMINESCENT | | | | |
| Green @ 60 Hertz Green | — | — | — | $3 \times 10^{-5}$ |
| Green @ 400 Hertz Green | — | — | — | $7 \times 10^{-5}$ |
| INCANDESCENT | | | | |
| Carbon Filament | 3 | 2000K | C6 or C8 | 0.5 |
| Tantalum filament | 6 | 2200K | C6 or C8 | 0.7 |
| Tungsten Filament | | | | |
| Vacuum Lamp | 10 | 2600K | C6 or C8 | 2.0 |
| Gas Filled Lamps | 20 | 3000K | CC6 or CC8 | 12 |
| (includes tungsten | 26 | 3200K | CC6 or CC8 | 24 |
| halogen lamps) | 33 | 4300K | CC6 or CC8 | 36 |

Fig. 9A

| PART NO. | FIG NO. | TYPE OF MIRROR | SYSTEM USEAGE | >NM TRANS -MISSION | <NM TRANS -MISSION | >NM REFLEC- TION | <NM REFLEC- TION |
|---|---|---|---|---|---|---|---|
| 33 | 12 | CUTOFF | IR FILTER | 700 | | | 700 |
| 35 | | CUTOFF | UV FILTER | 430 | | | 430 |
| 40 | | BROADBAND | MAIN BEAM REFLECTOR | | | 400 | |
| 42 | | BROADBAND | MAIN BEAM REFLECTOR | | | 400 | |
| 44 | | BROADBAND | MAIN BEAM REFLECTOR | | | 400 | |
| 46 | | BROADBAND | MAIN BEAM REFLECTOR | | | 400 | |
| 80 | 14 | BANDPASS | RED SPLITTER | | 585 | 595 | |
| 84 | 18 | BANDPASS | GREEN SPLITTER | | 490 | 500 | |
| 86 | 15 | CUTOFF | BLUE REFLECTOR | 495 | | | 490 |
| 82 | 14 | BANDPASS | RED REFLECTOR- TUNER | | 590 | 605 | |
| 92 | 16 | BANDPASS | RED-GREEN COMBINER | | 585 | 615 | |
| 90 | 17 | CUTOFF | RED -GREEN/BLUE COMBINER | 525 | | | 500 |
| 88 | 15 | CUTOFF | BLUE REFLECTOR- TUNER | 490 | | | 485 |

Fig. 26

HIGH EFFICIENCY ELECTROMAGNETIC BEAM PROJECTOR, AND SYSTEMS AND METHODS FOR IMPLEMENTATION THEREOF

RELATED APPLICATION

This is a divisional application of U.S. application Ser. No. 09/821,937 filed on Mar. 30, 2001 now U.S. Pat. No. 6,697,197, which is a continuation of application Ser. No. 09/502,889 filed on Feb. 11, 2000, now U.S. Pat. No. 6,243,198, which is a continuation of application Ser. No. 09/309,394 filed on May 10, 1999, now U.S. Pat. No. 6,034,818, which is a continuation of application Ser. No. 08/743,390 filed on Nov. 4, 1996, now U.S. Pat. No. 5,903,388, which is a continuation of application Ser. No. 08/344,899, on filed Nov. 25, 1994, now abandoned, which is a continuation of Ser. No. 07/898,952, filed on Jun. 11, 1992, now abandoned. These prior related applications are hereby incorporated by reference in their entirety for all purposes.

FIELD OF THE INVENTION

This invention relates to a method and system for producing (i) a modulated beam of electromagnetic energy, (ii) a modulated beam of light or ultraviolet light, (iii) a visual image for display, (iv) one or more collinear beams of electromagnetic energy, (v) one or more collinear beams of ultraviolet light, (vi) a modulated beam of visible light in which the brightness of the image increases as the distance from the projector. lens to the screen increases up to a distance of approximately 10 feet, (vii) a modulated beam of light for projection of video images, (viii) a collinear beam of electromagnetic energy having two constituent parts, (ix) a collinear beam of light (or ultraviolet light) having two constituent parts, (x) one or more collinear beams of electromagnetic energy, (xi) one or more collinear beams of light or ultraviolet light, (xii) a substantially collimated beam of electromagnetic energy having substantially the same selected predetermined orientation of a chosen component of electromagnetic wave field vectors and a substantially uniform flux intensity substantially across the beam of electromagnetic energy for use in the above method and systems, (xiii) a substantially collimated beam of light (or ultraviolet light) having substantially the same selected predetermined orientation of a chosen component of electric field vectors and a substantially uniform flux intensity substantially across the beam of light for use in the above method and systems, and (xiv) displaying an image in either two dimensions (2D) or three dimensions 3D). This invention also relates to projection type color display devices and projection apparatuses.

BACKGROUND OF THE INVENTION

A disturbance (change in position or state of individual particles) in the fabric of space-time causes a sphere of influence. Stated in a simplistic manner, the action of one particle influences the actions of the others near it. This sphere of influence is referred to as a "field", and this field is designated as either electric or magnetic (after the way it influences other particles). The direction of travel of the particle is called the direction of propagation. The propagation of the particle, the sphere of influence, and the way it influences other particles is called an electromagnetic wave, and is shown in FIG. 1.

As shown in FIG. 1, the electric and magnetic fields are orthogonal (at right angles) to each other and the direction of propagation. These fields can be mathematically expressed as a vector quantity (indicating the direction of influence along with strength, i.e., magnitude, of influence) at a specific point or in a given region in space. Thus, FIG. 1A is the electromagnetic wave in FIG. 1, but with the view of looking down the axis of propagation, that is, down the x axis of FIG. 1. FIG. 1A shows some possible various electric field vectors that could exist, although it should be understood that any and all possible vectors can exist around the circle, each having different magnitudes.

Vectors can be resolved into constituent components along two axes. This is done for convenience sake and for generating a frame of reference that we, as humans, can understand. By referring to FIG. 1B, it is shown that the electric field vector E, can be resolved into two constituent components, E(y) and E(x). These quantities, then, describe the orientation and the magnitude of the electric field vector along two axes, the x and y, although other axes or systems could be chosen. The same applies to magnetic fields, except that the X and Z axes would be involved.

The ways the electric and magnetic fields vary with time in intensity and direction of propagation have been determined by several notable mathematicians and physicists, culminating in a group of basic equations by James Maxwell. These equations, simply applied, state that a field vector can be of one of several different states, that is: 1) the field vector varies randomly over a period of time, or 2) the field vector can change directions in a circular manner, or 3) the field vector can change directions in a elliptical manner, or 4) the field vector can remain constant in magnitude and direction, hence, the field vector lies in one plane, and is referred to as planar.

This orientation of a field vector and the way it changes with time is called the state of polarization.

Electromagnetic waves can be resolved into separate electromagnetic waves with predetermined orientations of a field vector. The electromagnetic waves with a predetermined orientation of a field vector can then be directed through materials, such as a liquid crystal device, that is capable of changing (or altering) their orientation of the field vector upon application of an outside stimulus, as is demonstrated in FIG. 7. these devices are noted as programmable electromagnetic wave field orientation rotating devices (PEMFVORD).

An electromagnetic wave can be characterized by its frequency or wavelength. the electromagnetic spectrum (range) extends from zero, the short wavelength limit, to infinity, the long wavelength limit. Different wavelength areas have been given names over the years, such as cosmic rays, alpha rays, beta rays, gamma rays, X-rays, ultraviolet, visible light, infrared, microwaves, TV and FM radio, short wave, AM, maritime communications, etc. All of these are just short hand expressions of stating a certain range of frequencies for electromagnetic waves.

Different areas of the spectrum interact with electromagnetic influences upon them in various proportions, with the low end being more influenced by magnetic fields, and the high end being influenced by electric fields. Thus to contain a nuclear reaction, a magnetic field is used, while controlling light an electric field is used.

FIG. 2 illustrates a schematic cross section of an LCD cell. The LCD cell 100 includes a liquid crystal material 101 that is contained between two transparent plates 103, 104. Spacers 105, 106 are used to separate the transparent plates 103, 104. Sealing elements 107, 108 seal the liquid crystal material 101 between the transparent plates 103, 104. Conductive coatings 109, 110 on the transparent plates 103, 104 conduct the appropriate electrical signals to the liquid crystal material 101.

A type of liquid crystal material 101 used in most LCD cells for optical display systems is referred to as "twisted nematic." In general, with a twisted nematic LCD cell, the molecules of an LCD cell are rotated in the absence of a field through a 90° angle between the upper 103 and lower 104 transparent plates. When a field is applied, the molecules are untwisted and line up in the direction of the applied field. The change in alignment of the molecules causes a change in the birefringence of the cell. In the homogeneous ordering, the birefringence of the cell changes from large to small whereas the opposite occurs in the homeotropic case. The change in birefringence causes a change in the orientation of the electric field vector for the light being passing through the LCD. The amount of the rotation in the molecules for an individual LCD cell 100 will determine how much change in polarization (orientation of the electric field vector) of the light occurs for that pixel. The light beam is then passed through another component of the system (i.e., polarizer analyzer) and is resolved into different beams of light by the orientation of their electric field vectors, with the light that has a selected predetermined component of the electric field vector passing through to finally strike the screen used for the display.

A twisted nematic LCD cell requires the light incident at the LCD cell 100 to be polarized. The polarized light for a typical projector is generally derived from a randomly polarized light source that is collimated and then filtered by a plastic polarizer to provide a linear polarized beam. Linear polarized beams are conventionally referred to as being S-polarized and P-polarized with the P-polarized beam defined as polarized in a direction parallel to the plane of incidence and the S-polarized beam defined as polarized perpendicular to the plane of incidence.

The development of PEMFVORD technology has resulted in the development of LCD projectors which utilize one or more LCDs to alter the orientation of the electric field vector (see FIG. 7) of the light being projected. The birefringence of the individual LCD pixels is selectively altered by suitable apparatus such as cathode ray tubes, lasers, or electronic circuit means. A typical liquid crystal light valve (LCLV) projector includes a source lamp which is used to generate a light beam that is directed through a polarizer. This polarized light is directed through the LCDS to change the polarization according to the image to be displayed. The light, after exiting the LCD, passes through a plastic polarizer analyzer which stops and absorbs the unwanted portion of light. The formed image is then enlarged with a projection lens system for forming an enlarged picture on a display screen.

Color LCLV projectors typically include color separating apparatus such as a prism, beam splitters or dichroic mirrors to separate collimated white light beams from the light source into three primary color beams (i.e., red, green and blue beams). The red, green and blue beams are then individually modulated by LCDs and combined by separate optical apparatus such as combining prisms, mirrors or lenses.

In general, the quality and brightness of the projected image in any LCLV projector is a function of the brightness of the source for illuminating the LCDs and the polarizing means. Polarizing optics must be utilized to filter/separate the white light into light with a single orientation of the electric field vector. The white light emitted from the source is thus only partially utilized (i.e., one direction of polarization) in most LCLV projection systems. This requires oversized light sources to achieve a desired brightness at the viewing screen.

Typically, with a twisted nematic transmissive type LCD cell surrounded by plastic polarizers, only forty percent or less of the output of the light source is utilized. Practically, only a maximum transmission of 50% for randomly polarized light passed through could ever be achieved because of the construction and principles involved in plastic polarizers, allowing for 100% efficiency for the device for all wavelengths. Thus, it is impossible to obtain a full brightness projector. Moreover, the unused polarized component of the light source is absorbed by the plastic polarizers and generates wasted energy in the form of heat and transfers this heat to other components (i.e., LCDs, electronics, etc.) and hence is detrimental to the system (especially the plastic polarizers, LCDs, electronics, etc.). This heat must be either shielded and/or dissipated from the components of the system, or else, the light source must be reduced in light output so that the amount of light being absorbed is below the threshold of permanent damage to the components, including the plastic polarizers. Currently, this threshold for fabricated plastic polarizers is between the range of 5–10 watts of light per square inch (0.78–1.55 watts per square centimeter), depending upon the wavelength of the illuminating light. A method for improving the damage threshold is included in U.S. Pat. No. 5,071,234 to Amano, et al., although this patent does not discuss the particulars of what the damage threshold is.

Prior art systems have required relatively complicated optical systems including the use of polarizing prisms and prepolarizing prisms to ensure a unitary or single polarization at the LCD and to provide a suitable resolution and contrast of the projected image with prior art color LCLV projectors, complicated optic components and arrangements are required to combine the separated color bands at a suitable resolution and contrast.

Representative prior art LCLV projectors are disclosed in U.S. Pat. No. 5,060,058 to Goldenberg, et al., U.S. Pat. No. 5,048,949 to Sato; et al., U.S. Pat. No. 4,995,702 to Aruga, et al., U.S. Pat. No. 4,943,154 to, Miyatake, et al., U.S. Pat. No. 4,936,658 to Tanaka, et al., U.S. Pat. No. 4,936,656 to Yamashita, et al., U.S. Pat. No. 4,935,758 to Miyatake, et al., U.S. Pat. No. 4,911,547 to Ledebuhr, U.S. Pat. No. 4,909, 601 to Yajima, et al., U.S. Pat. No. 4,904,061 to Aruga, et al., U.S. Pat. No. 4,864,390 to McKechnie, U.S. Pat. No. 4,861,142 to Tanaka, et al., U.S. Pat. No. 4,850,685 to Kamakura, U.S. Pat. No. 4,842,374 to Ledebuhr, U.S. Pat. No. 4,836,649 to Ledebuhr, et al., U.S. Pat. No. 4,826,311 to Ledebuhr, U.S. Pat. No. 4,786,146 to Ledebuhr, U.S. Pat. No. 4,772,098 to Ogawa, U.S. Pat. No. 4,749,259 to Ledebuhr, U.S. Pat. No. 4,739,396 to Hyatt, U.S. Pat. No. 4,690,526 to Ledebuhr, U.S. Pat. No. 4,687,301 to Ledebuhr, U.S. Pat. No. 4,650,286 to Koda, et al., U.S. Pat. No. 4,647,966 to Phillips, et al., U.S. Pat. No. 4,544,237 to Gagnon, U.S. Pat. No. 4,500,172 to Gagnon, U.S. Pat. No. 4,464,019 to Gagnon, U.S. Pat. No. 4,464,018 to Gagnon, U.S. Pat. No. 4,461,542 to Gagnon, U.S. Pat. No. 4,425,028 to Gagnon, U.S. Pat. No. 4,191,456 to Hong, et al., U.S. Pat. No. 4,127,322 to Jacobson, et al., U.S. Pat. No. 4,588,324, to Marie, U.S. Pat. No. 4,943,155 to Cross, Jr., U.S. Pat. No. 4,936,657 to Tejima, et al., U.S. Pat. No. 4,928,123 to Takafuji, U.S. Pat. No. 4,922,336 to Morton, U.S. Pat. No. 4,875,064 to Umeda, U.S. Pat. No. 4,872,750 to Morishita, U.S. Pat. No. 4,824,210 to Shimazaki, U.S. Pat. No. 4,770, 525 to Umeda, et al., U.S. Pat. No. 4,715,684 to Gagnon, U.S. Pat. No. 4,699,498 to Naemura, et al., U.S. Pat. No. 4,693,557 to Fergason, U.S. Pat. No. 4,671,634 to Kizaki, et al., U.S. Pat. No. 4,613,207 to Fergason, U.S. Pat. No. 4,611,889 to Buzak, U.S. Pat. No. 4,295,159 to Carollo, et al.. Prior art illumination systems for overcoming problems with the brightness of LCD display illumination systems have not been completely successful.Prior art illumination systems for overcoming problems with the brightness of LCD display illumination systems have not been completely successful.

An example of an illumination system that attempts to utilize the full output of a light source for increasing the brightness of an LCD display is disclosed in U.S. Pat. No. 5,028,121 to Baur, et al. In the Baur system, the randomly polarized light source is resolved into two separate polarized beams, with one of the polarized beams passed to a dichroic color splitter that then directs the segregated color beams to a set of reflecting LCDs, while the other beam of different polarization is sent to a different set of LCDs through a different dichroic splitter. After having each respective portion of the beams electric field vector altered, the beam is then reflected back through the dichroic mirrors into the polarizing beam splitter/combiner. The picture to be represented is sent to the projection lens, while the rejected beam is sent back into the light source. This causes the light source to heat and have a shortened life span. Furthermore, each sequential field to be projected has a different brightness level illuminating each pixel, depending upon the amount of light that is rejected back into the light source.

For example, if a light source has an average output of 1000 lumens and the sequential field to be projected has an average brightness level of 30% then 700 lumens would be reflected back into the light source, making the light emitted from the source to be an effective 1700 lumens. In the next sequential field, if the average brightness level is 50% then 500 lumens would be reflected back into the light source, making the light emitted from the source to be effectively 1500 lumens. This can be alleviated by computing the average brightness level to be projected, and then modulating the brightness level of the light source when the field is changed for projection so that the illumination of a pixel is at a constant brightness. This system can further be modified by (or be a stand alone system) that would monitor the light output of the light source and change the driving circuitry of the light source to maintain a constant brightness level. This can be monitored by a light transducer that monitors the light from a beam splitter, or alternately, can be mounted directly on a LCD panel outside of the picture forming active area. However, the addition of any of the above circuitry further complicates the projector and makes the light source an active part of the system, increasing the cost and complexity of the projector.

Another example of an illumination system that attempts to utilize the full output of a light source for increasing the brightness of an LCD display is disclosed in U.S. Pat. No. 4,913,529 to Goldenberg, et al. In the Goldenberg system, a beam of light, from a light source, is split into two orthogonally linear polarized beams. One of the beams is then passed through a device that rotates one of the beams to change its direction of polarization so that there are two beams of the same polarization. The beams of the same polarization are then directed through different faces of a prism, combined by the prism and focused on the LCD devices.

A problem with such a system is that the beams are not collinear. The beams illuminate the polarizer at different angles, causing an area of usable light, and another area of unusable light. The result is that all of the light available is not used. Another obstacle is that it is difficult to align the combined beams with the use of a prism. Yet another complication is that the prism tends to separate the light into separate colors. This detracts from the clarity, brightness and limits the resolution of the projected image. Still another complication is that the performance of polarizers vary with the angle of light illuminating them, causing different polarizations and different color gradations to occur in the beam.

Other systems, such as those disclosed in U.S. Pat. No. 4,824,214 to Ledebuhr, U.S. Pat. No. 4,127,322 to Jacobson, et al., U.S. Pat. No. 4,836,649 to Ledebuhr, et al., and U.S. Pat. No. 3,512,868 to Gorklewiez, et al. also disclose optical layouts for achieving a high brightness in display systems that utilize LCD devices. In general, these systems are relatively complicated and contain numerous components that are large, expensive, and difficult to adjust.

Representative prior art flat fluorescent light sources are disclosed in U.S. Pat. No. 4,978,888 to Anandan, et al., and U.S. Pat. No. 4,920,298 to Hinotani, et al.

Representative prior art light integrators for light sources are disclosed in U.S. Pat. No. 4,918,583 to Kudo, et al., U.S. Pat. No. 4,787,013 to Sugino, et al., and U.S. Pat. No. 4,769,750 to Matsumoto, et al.

Various prior art techniques and apparatus have been heretofore proposed to present 3-D or stereographic images on a viewing screen, such as on a polarization conserving motion picture screen. See U.S. Pat. No. 4,955,718 to Jachimowicz, et al., U.S. Pat. No. 4,963,959 to Drewio, U.S. Pat. No. 4,962,422 to Ohtomo, et al., U.S. Pat. No. 4,959,641 to Bess, et al., U.S. Pat. No. 4,957,351 to Shioji, U.S. Pat. No. 4,954,890 to Park, U.S. Pat. No. 4,945,408 to Medina, U.S. Pat. No. 4,936,658 to Tanaka, et al., U.S. Pat. No. 4,933,755 to Dahl, U.S. Pat. No. 4,922,336 to Morton, U.S. Pat. No. 4,907,860 to Noble, U.S. Pat. No. 4,877,307 to Kalmanash, U.S. Pat. No. 4,872,750 to Morishita, U.S. Pat. No. 4,870,486 to Nakagawa, U.S. Pat. No. 4,853,764 to Sutter, U.S. Pat. No. 4,851,901 to Iwasaki, U.S. Pat. No. 4,834,473 to Keyes, et al., U.S. Pat. No. 4,807,024 to McLaurin, et al., U.S. Pat. No. 4,799,763 to Davis, U.S. Pat. No. 4,772,943 to Nakagawa, U.S. Pat. No. 4,736,246 to Nishikawa, U.S. Pat. No. 4,649,425 to Pund, U.S. Pat. No. 4,641,178 to Street, U.S. Pat. No. 4,541,007 to Nagata, U.S. Pat. No. 4,523,226 to Lipton, et al., U.S. Pat. No. 4,376,950 to Brown, et al., U.S. Pat. No. 4,323,920 to Collendar, U.S. Pat. No. 4,295,153 to Gibson, U.S. Pat. No. 4,151,549 to Bautzc, U.S. Pat. No. 3,697,675 to Beard, et al., In general, these techniques and apparatus involve the display of polarized or color sequential two-dimensional images which contain corresponding right eye and left eye perspective views of three-dimensional objects. These separate images can also be displayed simultaneously in different polarizations or colors. Suitable eyewear, such as glasses having different polarizing or color separating coatings, permit the separate images to be seen by one or the other eye. This type of system is relatively expensive and complicated requiring two separate projectors and is adapted mainly for stereoscopic movies for theaters. U.S. Pat. No. 4,954,890 to Park discloses a representative projector employing the technique of alternating polarization.

Another technique involves a timed sequence in which images corresponding to right-eye and left-eye perspectives are presented in timed sequence with the use of electronic light valves. U.S. Pat. No. 4,970,486 to Nakagawa, et al., and U.S. Pat. No. 4,877,307 to Kalmanash disclose representative prior art stereographic display systems of this type.

While previous time sequential light valve systems are adaptable to display arrangements for a television set, because of problems associated with color, resolution and contrast of the projected image, they have not received widespread commercial acceptance. Moreover, the systems proposed to date have also been relatively expensive and complicated.

BRIEF SUMMARY OF THE INVENTION

One object of this invention is to provide a method and system for producing a modulated beam of electromagnetic energy comprising: producing an initial beam of electromagnetic energy having a predetermined range of wavelengths and having a substantially uniform flux intensity substantially across the initial beam of electromagnetic energy; separating the initial beam of electromagnetic energy into two or more separate beams of electromagnetic energy, each of the separate beams of electromagnetic energy having a selected predetermined orientation of a chosen component of electromagnetic wave field vectors (or, in the case of a beam of light, and a beam of ultraviolet light, electric field vector); altering the selected predetermined orientation of the chosen component of the electromagnetic wave field vectors of a plurality of portions of each of the separate beams of electromagnetic energy by passing the plurality of portions of each of the separate beams of electromagnetic energy through a respective one of a plurality of altering means whereby the selected predetermined orientation of the chosen component of the electromagnetic wave field vectors of the plurality of portions of each of the separate beams of electromagnetic energy is altered in response to a stimulus means by applying a signal means to the stimulus means in a predetermined manner as the plurality of portions of each of the substantially separate beams of electromagnetic energy passes through the respective one of the plurality of means for altering the selected predetermined orientation of the chosen component of the electromagnetic wave field vectors; combining the altered separate beams of electromagnetic energy into a single collinear beam of electromagnetic energy without substantially changing the altered selected predetermined orientation of the chosen component of the electromagnetic wave field vectors of the plurality of portions of each of the separate beams of electromagnetic energy, and resolving from the single collinear beam of electromagnetic energy a first resolved beam of electromagnetic energy having substantially a first selected predetermined orientation of a chosen component of electromagnetic wave field vectors and a second resolved beam of electromagnetic energy having substantially a second selected predetermined orientation of a chosen component of electromagnetic wave field vectors, whereby the first and second selected predetermined orientation of the chosen component of the electromagnetic wave field vectors are different from one another.

Another object of this invention is to provide a method and system as aforesaid for modulating a beam of light and a beam of ultraviolet light.

Another object of this invention is to provide a method and system as aforesaid in which the step of producing a beam of electromagnetic energy includes producing a beam of electromagnetic energy having a random orientation of electromagnetic wave field vector (or, in the case of a beam of light and a beam of ultraviolet light, electric field vector) and the step of separating the beam of electromagnetic energy into two or more separate electromagnetic energy beams includes separating said beam into said separated beams whereby each of said separated beams has the same orientation of electromagnetic wave field vector (or, in the case of a beam of light or ultraviolet light, electric field vector).

Another object of this invention is to provide a method and system as aforesaid in which the step of producing a beam of electromagnetic energy includes the step of producing a beam of electromagnetic energy having the same orientation of electromagnetic wave field vector (or, in the case of a beam of light and a beam of ultraviolet light, electric field vector).

Another object of this invention is to provide a method and system as aforesaid in which the step of producing a beam of electromagnetic energy includes producing a collimated beam of electromagnetic energy.

Another object of this invention is to provide a method and system as aforesaid in which the step of producing a beam of electromagnetic energy includes producing a rectangular beam of electromagnetic energy.

Another object of this invention is to provide a method and system as aforesaid including the step of passing one of said segregated beams of electromagnetic energy to a projection means.

Another object of this invention is to provide a method and system as aforesaid including the step of adjusting the electromagnetic energy beams of at least one of separated beams. The step of adjusting the electromagnetic energy may be accomplished by adjusting the wavelengths and/or intensity of at least one of the separated beams.

Another object of this invention is to provide a method and system as aforesaid in which the step of separating a beam of electromagnetic energy includes separating the beam of electromagnetic energy into two or more separate electromagnetic energy beams, each separated beam having a different electromagnetic energy spectrum.

Another object of this invention is to provide a method and system as aforesaid in which the step for separating the initial beam of electromagnetic energy into two or more separate beams of electromagnetic energy further includes the step of separating the initial beam of electromagnetic energy into two or more separate beams of electromagnetic energy with each of the separate beams of electromagnetic energy having a predetermined range of wavelengths different from each of the other separate beams of electromagnetic energy.

Another object of this invention is to provide a method and system of producing a modulated beam of electromagnetic energy, comprising: providing a substantially collimated primary beam of electromagnetic energy having a predetermined range of wavelengths; resolving from the substantially collimated primary beam of electromagnetic energy a substantially collimated primary first resolved beam of electromagnetic energy having substantially a first selected predetermined orientation of a chosen component of the electromagnetic wave field vectors (or in the case of a beam of light and a beam of ultraviolet light, electric field vector) and a substantially collimated primary second resolved beam of electromagnetic energy having substantially a second selected predetermined orientation of a chosen component of the electromagnetic wave field vectors, whereby the first and second selected predetermined orientation of the chosen component of the electromagnetic wave field vectors are different from one another; forming from the substantially collimated primary first resolved beam of electromagnetic energy and the substantially collimated primary second resolved beam of electromagnetic energy a substantially collimated initial beam of electromagnetic energy having substantially the same selected predetermined orientation of a chosen component of electromagnetic wave field vectors substantially across the substantially collimated initial beam of electromagnetic energy and a substantially uniform flux intensity substantially across the substantially collimated initial beam of electromagnetic energy; separating the substantially collimated initial beam of electromagnetic energy into two or more substantially collimated separate beams of electromagnetic energy, each of the substantially collimated separate beams of electromagnetic energy having a selected predetermined orientation of a chosen component of electromagnetic wave field vectors; altering the selected predetermined orientation of the chosen component of the electromagnetic wave field vectors of a plurality of portions of each of the substantially collimated separate beams of electromagnetic energy by passing the plurality of portions of each of the substantially collimated separate beams of electromagnetic energy through a respective one of a plurality of altering means whereby the selected predetermined orientation of the chosen component of the electromagnetic wave field vectors of the plurality of portions of each of the substantially collimated separate beams of electromagnetic energy is altered in response to a stimulus means by applying a signal means to the stimulus means in a predetermined manner as the plurality of portions of each of the substantially collimated separate beams of electromagnetic energy passes through the respective one of the plurality of means for altering the selected predetermined orientation of the chosen component of the electromagnetic wave field vectors; combining the substantially collimated altered separate beams of electromagnetic energy into a substantially collimated single collinear beam of electromagnetic energy without substantially changing the altered selected predetermined orientation of the chosen component of the electromagnetic wave field vectors of the plurality of portions of each of the substantially collimated separate beams of electromagnetic energy; and resolving from the substantially collimated single collinear beam of electromagnetic energy a substantially collimated first resolved beam of electromagnetic energy having substantially a first selected predetermined orientation of a chosen component of electromagnetic wave field vectors and a substantially collimated second resolved beam of electromagnetic energy having substantially a second selected predetermined orientation of a chosen component of electromagnetic wave field vectors, whereby the first and second selected predetermined orientation of the chosen component of the electromagnetic wave field vectors are different from one another.

Another object of this invention is to provide a method and system as aforesaid for producing a modulated beam of light and a beam of ultraviolet light.

Another object of this invention is to provide a method and system as aforesaid in which the step of separating includes separating the substantially collimated initial beam of electromagnetic energy into two or more substantially collimated separate beams of electromagnetic energy whereby each of the substantially collimated separate beams of electromagnetic energy has substantially the same selected predetermined orientation of the chosen component of the electromagnetic wave field vectors substantially across each of the substantially collimated separate beams of electromagnetic energy as that of the other substantially collimated separate beams of electromagnetic energy.

Another object of this invention is to provide a method and system as aforesaid in which the step of forming includes forming the substantially collimated initial beam of electromagnetic energy further having a rectangular cross-sectional area.

Another object of this invention is to provide a method and system as aforesaid further comprising the step of passing one of the substantially collimated resolved beams of electromagnetic energy to a projection means.

Another object of this invention is to provide a method and system as aforesaid further comprising the step of adjusting the electromagnetic spectrum of at least one of the substantially collimated separate beams of electromagnetic energy.

Another object of this invention is to provide a method and system as aforesaid wherein the step of adjusting the electromagnetic spectrum of at least one of the substantially collimated separate beams of electromagnetic energy includes adjusting a predetermined range of wavelengths of at least one of the substantially collimated separate beams of electromagnetic energy. The step of adjusting the electromagnetic energy may be accomplished by adjusting the wavelengths and/or intensity of at least one of the separated beams.

Another object of this invention is to provide a method and system as aforesaid wherein the step of separating includes separating the substantially collimated initial beam of electromagnetic energy into two or more substantially collimated separate beams of electromagnetic energy whereby each of the substantially collimated separate beams of electromagnetic energy has a substantially different selected predetermined orientation of the chosen component of the electromagnetic wave field vectors substantially across each of the substantially collimated separate beams of electromagnetic energy from that of the other substantially collimated separate beams of electromagnetic energy.

Another object of this invention is to provide a method and system as aforesaid further comprising the step of passing one of the substantially collimated primary resolved beams of electromagnetic energy through a means for changing the selected predetermined orientation of the chosen component of the electromagnetic wave field vectors.

Another object of this invention is to provide a method and system as aforesaid wherein the step of passing one of the substantially collimated primary resolved beams of electromagnetic energy through a means for changing the selected predetermined orientation of the chosen component of the electromagnetic wave field vectors includes passing one of the substantially collimated primary resolved beams of electromagnetic energy through a liquid crystal device for changing the selected predetermined orientation of the chosen component of the electromagnetic wave field vectors.

Another object of this invention is to provide a method and system as aforesaid further comprising the step of passing one of the substantially collimated primary resolved beams of electromagnetic energy through a means for changing as elected predetermined orientation of a chosen component of electromagnetic wave field vectors and changing the selected predetermined orientation of the chosen component of the electromagnetic wave field vectors of one of the substantially collimated primary resolved beam of electromagnetic energy to match substantially the selected predetermined orientation of the chosen component of the electromagnetic wave field vectors of the other substantially collimated primary resolved beam of electromagnetic energy.

Another object of this invention is to provide a method and system as aforesaid wherein the step of forming further comprises the step of providing one or more reflecting means, each of the reflecting means having means for changing the selected predetermined orientation of the chosen component of the electromagnetic wave field vectors, and reflecting one of the substantially collimated primary resolved beams of electromagnetic energy from one or more of the reflecting means.

Another object of this invention is to provide a method and system as aforesaid wherein the step of providing one or more reflecting means, each of the reflecting means including one or more planar reflecting surface with a dielectric coating, each planar reflecting surface with a dielectric coating having means for changing the selected predetermined orientation of the chosen component of the electromagnetic wave field vectors, and reflecting one of the substantially collimated primary resolved beams of electromagnetic energy from one or more of the planar reflecting surfaces with a dielectric coating.

Another object of this invention is to provide a method and system as aforesaid wherein the step of providing one or more reflecting means, each of the reflecting means including a mirror having a thin film dielectric material, each mirror having a thin film dielectric material having means for changing the selected predetermined orientation of the chosen component of the electromagnetic wave field vectors, and reflecting one of the substantially collimated primary resolved beams of electromagnetic energy from one or more of the mirrors having a thin film dielectric material.

Another object of this invention is to provide a method and system as aforesaid wherein the step of providing a substantially collimated primary beam of electromagnetic energy further having a substantially uniform flux intensity across substantially the entire primary beam of electromagnetic energy.

Another object of this invention is to provide a method and system as aforesaid further comprising the step of removing from at least one of the beams of electromagnetic energy at least a predetermined portion of a predetermined range of wavelengths.

Another object of this invention is to provide a method and system as aforesaid further including directing the removed portions to an absorption means.

Another object of this invention is to provide a method and system as aforesaid further comprising the step of removing from the substantially collimated primary beam of electromagnetic energy at least a predetermined portion of a predetermined range of wavelengths and directing the removed portions to an absorption means.

Another object of this invention is to provide a method and system of displaying an image comprising:

[a] a method of displaying an image, comprising: providing an illumination subsystem including producing a primary beam of light having a predetermined range of wavelengths, randomly changing orientations of a chosen component of electric field vectors, and a substantially uniform flux intensity substantially across the initial beam of light;

[b] providing a modulation subsystem, including;

[i] separating the primary beam of light into two or more primary color beams of light, each of the primary color beams having the same selected predetermined orientation of a chosen component of electric field vectors as that of the other primary color beams;

[ii] providing two or more altering means for changing the selected predetermined orientation of a chosen component of electric field vectors;

[iii] altering the selected predetermined orientation of the chosen component of the electric field vectors of a plurality of portions of each of the separate primary color beams of light by passing the plurality of portions of each of the separate primary color beam or beams of light through a respective one of a plurality of altering means whereby the selected predetermined orientation of the chosen component of the electric field vectors of the plurality of portions of each of the separate primary color beams of light is altered in response to a stimulus means by applying a signal means to the stimulus means in a predetermined manner as the plurality of portions of each of the separate primary color beams of light passes through the respective one of the plurality of means for altering the selected predetermined orientation of the chosen component of the electric field vectors;

[iv] combining the altered separate primary color beams of light into a single collinear beam of light without substantially changing the altered selected predetermined orientation of the chosen component of the electric field vectors of the plurality of portions of each of the separate beams of light;

[v] resolving from the single collinear beam of light a first resolved beam of light having substantially a first selected predetermined orientation of a chosen component of electric field vectors and a second resolved beam of light having substantially a second selected predetermined orientation of a chosen component of electric field vectors, whereby the first and second selected predetermined orientation of the chosen component of the electric field vectors are different from one another;

[c] providing a projection subsystem and passing at least one of the resolved beams of light thereto; and

[d]

[i] forming a first light path from the illumination subsystem to the altering means in which the first light path is equal for all altering means; and

[ii] forming a second light path from each of the altering means to the projection subsystem in which the second light path is equal for all altering means.

Another object of this invention is to provide a method and system for displaying an image projected from a liquid crystal device which includes means for a first liquid crystal light valve, a second liquid crystal light valve and a third liquid crystal light valve, comprising: means for producing a primary beam of light having a predetermined range of wavelengths, randomly changing orientations of a chosen component of electric field vectors, and a substantially uniform flux intensity substantially across the initial beam of light; means for separating the primary beam of light into two or more primary color beams of light, each of the primary color beams having the same selected predetermined orientation of a chosen component of electric field vectors as that of the other primary color beams; means for forming the optical light paths between the light source and the three liquid crystal light valves which are unequal in length and based on luminous intensity of the primary colors associated with respective light valve produced by the light source; means for altering the selected predetermined orientation of the chosen component of the electric field vectors of a plurality of portions of each of the separate primary color beams of light by passing the plurality of portions of each of the separate primary color beams of light through a respective one of the liquid crystal light valves whereby the selected predetermined orientation of the chosen component of the electric field vectors of the plurality of portions of each of the separate primary color beams of light is altered in response to a stimulus means by applying a signal means to the stimulus means in a predetermined manner as the plurality of portions of each of the separate primary color beams of light passes through the respective one of the liquid crystal light valves altering the selected predetermined orientation of the chosen component of the electric field vectors; means for combining the altered separate primary color beams of light into a single collinear beam of light without substantially changing the altered selected predetermined orientation of the chosen component of the electric field vectors of the plurality of portions of each of the separate beams of light; means for resolving from the single collinear beam of light a first resolved beam of light having substantially a first selected predetermined orientation of a chosen component of electric field vectors and a second resolved beam of light having substantially a second selected predetermined orientation of a chosen component of electric field vectors, whereby the first and second selected predetermined orientation of the chosen component of the electric field vectors are different from one another; and means for passing at least one of the resolved beams to a projection means.

Another object of this invention is to provide a projection-type color display device, comprising: means for producing a collimated primary beam of light having a predetermined range of wavelengths, randomly changing orientations of a chosen component of electric field vectors, a substantially uniform flux intensity substantially across the initial beam of light, and a rectangular cross sectional area; means for separating the collimated primary beam of light into the primary color beams of red, blue and green, each of the primary color beams having the same selected predetermined orientation of a chosen component of electric field vectors as that of the other primary color beams; means for altering the selected predetermined orientation of the chosen component of the electric field vectors of a plurality of portions of each of the separate primary color beams of red, blue and green by passing the plurality of portions of each of the separate primary color beams of red, blue and green through a respective one of a plurality of liquid crystal light valves whereby the selected predetermined orientation of the chosen component of the electric field vectors of the plurality of portions of each of the separate primary color beams of red, blue and green is altered in response to a stimulus means by applying a signal means to the stimulus means in a predetermined manner as the plurality of portions of each of the separate primary color beams of light passes through the respective one of the liquid crystal light valves altering the selected predetermined orientation of the chosen component of the electric field vectors; means for combining the altered separate primary color beams into a single collinear beam of light without substantially changing the altered selected predetermined orientation of the chosen component of the electric field vectors of the plurality of portions of each of the separate beams of red, blue and green by passing the altered separate primary color beams through a color synthesis cube having a reflecting surface for synthesizing the red, blue and green beams into a single collinear beam of light; means for resolving from the single collinear beam of light a first resolved beam of light having substantially a first selected predetermined orientation of a chosen component of electric field vectors and a second resolved beam of light having substantially a second selected predetermined orientation of a chosen component of electric field vectors, whereby the first and second selected predetermined orientation of the chosen component of the electric field vectors are different from one another; and means for passing at least one of the resolved beams to a projection means.

Another object of this invention is to provide a projection apparatus, comprising: means for producing a primary beam of light having a predetermined range of wavelengths, randomly changing orientations of a chosen component of electric field vectors, a substantially uniform flux intensity substantially across the initial beam of light, and a rectangular cross sectional area; means for separating the primary beam of light into three primary color beams of light, each of the primary color beams having the same selected predetermined orientation of a chosen component of electric field vectors as that of the other primary color beams; three means for altering the selected predetermined orientation of the chosen component of the electric field vectors of a plurality of portions of each of the separate primary color beams of light by passing the plurality of portions of each of the separate primary color beams of light through a respective one of the altering means whereby the selected predetermined orientation of the chosen component of the electric field vectors of the plurality of portions of each of the separate primary color beams of light is altered in response to a stimulus means by applying a signal means to the stimulus means in a predetermined manner as the plurality of portions of each of the separate primary color beams of light passes through the respective one of the means for altering the selected predetermined orientation of the chosen component of the electric field vectors; means for combining the altered separate primary color beams of light into a single collinear beam of light without substantially changing the altered selected predetermined orientation of the chosen component of the electric field vectors of the plurality of portions of each of the separate beams of light by dichroic reflection surfaces intersecting in X-letter form; means for resolving from the single collinear beam of light a first resolved beam of light having substantially a first selected predetermined orientation of a chosen component of electric field vectors and a second resolved beam of light having substantially a second selected predetermined orientation of a chosen component of electric field vectors, whereby the first and second selected predetermined orientation of the chosen component of the electric field vectors are different from one another; means for passing at least one of the resolved beams from the single collinear beam of light to a projection means; a driving circuit for driving each of the three altering means according to the signal means; wherein the color separating means comprises a first flat-plate type dichroic mirror and a second flat-plate type dichroic mirror intersecting in X-letter form, light paths from the intersecting part to each of the altering means having lengths such that the path of the color light which advances straightly through the color separating means is the shortest, the second dichroic mirror being constructed by two dichroic mirrors separated at the intersecting part so that the dichroic reflecting surfaces of the two dichroic mirrors are placed on mutually different planes to allow two-edge surfaces of the two dichroic mirrors forming the intersecting part to be seen as being at least partially overlapping when the color-separating means is observed from the output light side in a direction along its input light.

Another object of this invention is to provide a method and system of producing one or more collinear beams of electromagnetic energy, comprising: producing two or more separate beams of electromagnetic energy, each of the separate beams of electromagnetic energy having the same selected predetermined orientation of a chosen component of electromagnetic wave field vectors substantially across each beam, a predetermined range of wavelengths and a substantially uniform flux intensity substantially across the beam of electromagnetic energy; altering the selected predetermined orientation of the chosen component of the electromagnetic wave field vectors of a plurality of portions of each of the separate beams of electromagnetic energy by passing the plurality of portions of each of the separate beams of electromagnetic energy through a respective one of a plurality of altering means whereby the selected predetermined orientation of the chosen component of the electromagnetic wave field vectors of the plurality of portions of each of the separate beams of electromagnetic energy is altered in response to a stimulus means by applying a signal means to the stimulus means in a predetermined manner as the plurality of portions of each of the separate beams of electromagnetic energy passes through the respective one of the plurality of means for altering the selected predetermined orientation of the chosen component of the electromagnetic wave field vectors; combining the altered separate beams of electromagnetic energy into a single collinear beam of electromagnetic energy without substantially changing the altered selected predetermined orientation of the chosen component of the electromagnetic wave field vectors of the plurality of portions of each of the separate beams of electromagnetic energy; and resolving from the single collinear beam of electromagnetic energy a first resolved beam of electromagnetic energy having substantially a first selected predetermined orientation of a chosen component of electromagnetic wave field vectors and a second resolved beam of electromagnetic energy having substantially a second selected predetermined orientation of a chosen component of electromagnetic wave field vectors, whereby the first and second selected predetermined orientation of the chosen component of the electromagnetic wave field vectors are different from one another.

Another object of this invention is to provide a method and system as aforesaid for producing one or more collinear beams of light and a beam of ultraviolet light.

Another object of this invention is to provide a method and system as aforesaid in which the step of producing includes producing each separate beam of electromagnetic energy further having a rectangular cross-sectional area.

Another object of this invention is to provide a method and system as aforesaid further comprising the step of passing one of the resolved beams of electromagnetic energy to a projection means.

Another object of this invention is to provide a method and system as aforesaid further comprising the step of adjusting the electromagnetic spectrum of at least one of the separate beams of electromagnetic energy.

Another object of this invention is to provide a method and system as aforesaid wherein the step of adjusting the electromagnetic spectrum of at least one of the separate beams of electromagnetic energy includes adjusting a predetermined range of wavelengths of at least one of the separate beams of electromagnetic energy. The step of adjusting the electromagnetic energy may be accomplished by adjusting the wavelengths and/or intensity of at least one of the separate beams.

Another object of this invention is to provide a method of producing a modulated beam of electromagnetic energy in which the brightness of the image increases as the distance from the projector lens to a screen increases up to a distance of approximately 10 feet, comprising: producing a beam of electromagnetic energy having a substantially uniform flux intensity substantially across the entire beam; separating the beam of electromagnetic energy into two or more separate electromagnetic energy beams, each of the electromagnetic energy beams having a predetermined orientation of electromagnetic wave field vector; passing a plurality of portions of each separated electromagnetic energy beam through a respective one of a plurality of means for changing the orientation of the electromagnetic wave field vector whereby the orientation of electromagnetic wave field vector of the plurality of portions of the electromagnetic energy beams is altered as same passes through the respective one of the plurality of means for changing the orientation of electromagnetic wave field vector; combining the separated electromagnetic energy beams into a single collinear beam of electromagnetic energy without changing the altered orientation of the electromagnetic wave field vector of the plurality of portions of the electromagnetic energy beams; producing two segregated electromagnetic energy beams from the collinear beam, each segregated electromagnetic energy beam having an orientation of electromagnetic wave field vector different from the other electromagnetic energy beam; locating a projection means such that the distance of the light path between the projection means and each of the plurality of means for changing the orientation of the electromagnetic wave field vector is substantially equal; passing one of the segregated beams of electromagnetic beams of electromagnetic energy to the projection means; locating a surface means up to approximately 10 feet of the projection means; and passing the one of the segregated beams of electromagnetic energy from the projection means to the surface means.

Another object of this invention is to provide a method and system of producing a modulated beam of light suitable for projection of video images, comprising: producing an initial beam of light; separating the initial beam of light into two or more separate beams of colors whereby each separate beam of color has the same single selected predetermined orientation of a chosen component of the electric field vectors as that of the other separate beams of color and each separate beam of color having a color different from the other separate beams of colors; altering the single selected predetermined orientation of the chosen component of the electric field vectors of a plurality of portions of each separate beam of color by passing a plurality of portions of each separate beam of color through a respective one of a plurality of altering means whereby the single selected predetermined orientation of the chosen component of the electric field vectors of the plurality of portions of each separate beam of color is altered in response to a stimulus means by applying a signal means to the stimulus means in a predetermined manner as the plurality of portions of each of the substantially separate beams of electromagnetic energy passes through the respective one of the plurality of means for altering the single selected predetermined orientation of a chosen component of the electric field vectors; combining altered separate beams of color into a single collinear color beam without substantially changing the altered selected predetermined orientation of the chosen component of the electric field vectors of the plurality of portions of each of the separate beam of color; and resolving from the single collinear color beam a first resolved color beam having substantially a first single selected predetermined orientation of a chosen component of the electric field vectors and second resolved color beam having substantially a second single selected predetermined orientation of a chosen component of the electric field vectors, whereby the first and second single selected predetermined orientation of the chosen component of the electric field vectors are different from one another.

Another object of this invention is to provide a method and system as aforesaid which further comprises the step of passing one of the resolved color beams to a projection means.

Another object of this invention is to provide a method and system as aforesaid in which the step of producing includes producing an initial collimated beam of light having a substantially uniform flux intensity across substantially the entire initial collimated beam of light and substantially the same single selected predetermined orientation of a chosen component of the electric field vectors across substantially the entire initial collimated beam of light.

Another object of this invention is to provide a method and system as aforesaid which further includes the step of removing from the initial collimated beam of light at least a portion of ultraviolet and at least a portion of infrared to produce an initial collimated beam of white light and directing the removed portions to a beam stop whereby the removed ultraviolet and infrared is absorbed.

Another object of this invention is to provide a method and system in which the step of separating further includes the step of adjusting by removing at least a predetermined portion of color of at least one of the separate collimated beams of color and directing the removed portion to a beam stop whereby the removed portion is absorbed.

Another object of this invention is to provide a method and system as aforesaid in which the step of producing includes producing an initial collimated rectangular beam of light having a substantially uniform flux intensity across substantially the entire initial collimated rectangular beam of light and having substantially the same single selected predetermined orientation of a chosen component of the electric field vectors across substantially the entire initial collimated rectangular beam of light.

Another object of this invention is to provide a method and system of producing a modulated beam of light suitable for projection of video images, comprising: providing a first initial beam of light having randomly changing orientations of the selected component of the electric field vectors; integrating the first initial beam of light to form a second initial beam of light having a substantially uniform flux intensity across substantially the entire second initial beam of light; collimating the second initial beam of light into an initial collimated beam of light having randomly changing orientations of the selected component of the electric field vectors and a substantially uniform flux intensity across substantially the entire second initial beam of light removing from the initial collimated beam of light at least a portion of ultraviolet and infrared to produce an initial collimated beam of white light and directing the removed portions to a beam stop whereby the removed portion is absorbed; resolving from the initial collimated beam of white light an initial collimated first resolved beam of white light having substantially a first single selected predetermined orientation of a chosen component of the electric field vectors and an initial collimated second resolved beam of white light having substantially a second single selected predetermined orientation of a chosen component of the electric field vectors, whereby the first and second single selected predetermined orientation of the chosen component of the electric field vectors are different from one another; forming from the initial collimated first resolved beam of white light and initial collimated second resolved beam of white light a substantially collimated rectangular initial single beam of white light having substantially the same single selected predetermined orientation of a chosen component of the electric field vectors across substantially the entire beam of light and a substantially uniform flux intensity across substantially the entire initial collimated single beam of white light; separating the collimated rectangular initial single beam of white light into two or more separate collimated rectangular beams of color whereby each of the separate collimated rectangular beam of color has the same single selected predetermined orientation of a chosen component of the electric field vectors as that of the other separate collimated rectangular beams of colors and each separate collimated rectangular beam of color having a different color from the other separate collimated rectangular beams of colors; adjusting the color by removing at least a predetermined portion of color of at least one of the separate collimated rectangular beam of colors and directing the removed portion to a beam stop whereby the removed portion is absorbed; altering the single selected predetermined orientation of the chosen component of the electric field vectors of a plurality of portions of each separate collimated rectangular beam of color by passing a plurality of portions of each separate collimated rectangular beam of color through a respective one of a plurality of altering means whereby the single selected predetermined orientation of the chosen component of the electric field vectors of the plurality of portions of each separate beam of color is altered in response to a stimulus means by applying a signal means to the stimulus means in a predetermined manner as the plurality of portions of each of the substantially collimated separate beams of electromagnetic energy passes through the respective one of the plurality of altering the single selected predetermined orientation of a chosen component of the electric field vectors; combining the altered separate collimated rectangular beams of color into a single collimated rectangular collinear color beam without substantially changing the altered selected predetermined orientation of the chosen component of the electric field vectors of the plurality of portions of each separate collimated rectangular beam of color; resolving from the single collimated rectangular collinear color beam a first collimated rectangular resolved color beam having substantially a first single selected predetermined orientation of a chosen component of the electric field vectors and second collimated rectangular resolved color beam having substantially a second single selected predetermined orientation of a chosen component of the electric field vectors, whereby the first and second single selected predetermined orientation of the chosen component of the electric field vectors are different from one another; and passing one of the first collimated rectangular or second collimated rectangular resolved color beam to a projection means.

Another object of this invention is to provide a method and system of producing a collinear beam of electromagnetic energy having two constituent parts, comprising:

[a] providing a substantially collimated primary beam of electromagnetic energy having a predetermined range of wavelengths and randomly changing orientations of a chosen component of electromagnetic wave field vectors;

[b] resolving the substantially collimated primary beam of electromagnetic energy into a substantially collimated primary first resolved beam of electromagnetic energy having substantially a first selected predetermined orientation of a chosen component of the electromagnetic wave field vectors and a substantially collimated primary second resolved beam of electromagnetic energy having substantially a second selected predetermined orientation of a chosen component of the electromagnetic wave field vectors;

[c] separating each of the substantially collimated primary resolved beams of electromagnetic energy into two or more substantially collimated separate beams of electromagnetic energy, each of the substantially collimated separate beams of electromagnetic energy having a selected predetermined orientation of a chosen component of electromagnetic wave field vectors;

[d] altering the selected predetermined orientation of the chosen component of the electromagnetic wave field vectors of a plurality of portions of each of the substantially collimated separate beams of electromagnetic energy by passing the plurality of portions of each of the substantially collimated separate beams of electromagnetic energy through a respective one of a plurality of altering means whereby the selected predetermined orientation of the chosen component of the electromagnetic wave field vectors of the plurality of portions of each of the substantially collimated separate beams of electromagnetic energy is altered in response to a stimulus means by applying a signal means to the stimulus means in a predetermined manner as the plurality of portions of each of the substantially collimated separate beams of electromagnetic energy passes through the respective one of the plurality of means for altering the selected predetermined orientation of the chosen component of the electromagnetic wave field vectors;

[e]

[i] combining the substantially collimated altered separate beams of electromagnetic energy of the primary first resolved beam of electromagnetic energy into a first substantially collimated single collinear beam of electromagnetic energy without substantially changing the altered selected predetermined orientation of the chosen component of the electromagnetic wave field vectors of the plurality of portions of each of the substantially collimated separate beams of electromagnetic energy, and

[ii] combining the substantially collimated altered separate beams of electromagnetic energy of the primary second resolved beam of electromagnetic energy into a second substantially collimated single collinear beam of electromagnetic energy without substantially changing the altered selected predetermined orientation of the chosen component of the electromagnetic wave field vectors of the plurality of portions of each of the substantially collimated separate beams of electromagnetic energy;

[f]

[i] resolving from the first substantially collimated single collinear beam of electromagnetic energy a substantially collimated first resolved beam of electromagnetic energy having substantially the first selected predetermined orientation of a chosen component of electromagnetic wave field vectors and a substantially collimated second resolved beam of electromagnetic energy having substantially the second selected predetermined orientation of a chosen component of electromagnetic wave field vectors, and

[ii] resolving from the second substantially collimated single collinear beam of electromagnetic energy a substantially collimated first resolved beam of electromagnetic energy having substantially the first selected predetermined orientation of a chosen component of electromagnetic wave field vectors and a substantially collimated second resolved beam of electromagnetic energy having substantially the second selected predetermined orientation of a chosen component of electromagnetic wave field vectors; and

[g] merging one of the resolved beams of electromagnetic energy from the first substantially collimated single collinear beam of electromagnetic energy with one of the other resolved beams of electromagnetic energy from the second substantially collimated single collinear beam of electromagnetic energy into a substantially collimated third single collinear beam of electromagnetic energy.

Another object of this invention is to provide a method and system as aforesaid for producing a collinear beam as aforesaid for producing a collinear beam of light having two constituent parts and a beam of ultraviolet light having two constituent parts.

Another object of this invention is to provide a method and system as aforesaid wherein the step of resolving further includes resolving the primary beam into first and second resolved beams in which the first selected predetermined orientation of the chosen component of the electromagnetic wave field vectors has the same selected predetermined orientation of the chosen component of the electromagnetic wave field vectors as that of the second selected predetermined orientation of the chosen component of the electromagnetic wave field vectors.

Another object of this invention is to provide a method and system as aforesaid wherein the step of resolving further includes resolving the primary beam into first and second resolved beams in which the first selected predetermined orientation of the chosen component of the electromagnetic wave field vectors has the selected predetermined orientation of the chosen component of the electromagnetic wave field vectors different from the second selected predetermined orientation of the chosen component of the electromagnetic wave field vectors.

Another object of this invention is to provide a method and system as aforesaid wherein the step of merging further includes the merging of the resolved beams in which the plurality of portions of one of the merged beams has a different selected predetermined orientation of a chosen component of electromagnetic wave field vectors as that of the plurality of portions of the other merged beam.

Another object of this invention is to provide a method and system as aforesaid wherein the step of merging further includes merging of the resolved beams in which each merged beam has its plurality of portions parallel and noncoincident to the plurality of portions as that of the other merged beam.

Another object of this invention is to provide a method and system as aforesaid wherein the step of merging further includes merging of the resolved beams in which each merged beam has its plurality of portions parallel and partially coincident to the plurality of portions as that of the other merged beam.

Another object of this invention is to provide a method and system as aforesaid wherein the step of merging further includes merging of the resolved beams in which each merged beam has its plurality of portions parallel and simultaneous to the plurality of portions as that of the other merged beam.

Another object of this invention is to provide a method and system as aforesaid wherein the step of merging further includes merging of the resolved beams in which each merged beam has its plurality of portions parallel, noncoincident and simultaneous to the plurality of portions as that of the other merged beam.

Another object of this invention is to provide a method and system as aforesaid wherein the step of merging further includes merging of the resolved beams in which each merged beam has its plurality of portions parallel, partially coincident and simultaneous to the plurality of portions as that of the other merged beam.

Another object of this invention is to provide a method and system as aforesaid wherein the step of merging further includes merging of the resolved beams in which the plurality of portions of one of the merged beams has the substantially same selected predetermined orientation of a chosen component of electromagnetic wave field vectors as that of the plurality of portions of the other merged beam.

Another object of this invention is to provide a method and system as aforesaid wherein the step of merging further includes merging of the resolved beams in which the plurality of portions of one of the merged beams has the substantially same selected predetermined orientation of a chosen component of electromagnetic wave field vectors as that of the plurality of portions of the other merged beam and further includes each merged beam having its plurality of portions parallel and noncoincident to the plurality of portions as that of the other merged beam.

Another object of this invention is to provide a method and system as aforesaid wherein the step of merging further includes merging of the resolved beams in which the plurality of portions of one of the merged beams has the substantially same selected predetermined orientation of a chosen component of electromagnetic wave field vectors as that of the plurality of portions of the other merged beam and further includes each merged beam having its plurality of portions parallel and partially coincident to the plurality of portions as that of the other merged beam.

Another object of this invention is to provide a method and system as aforesaid wherein the step of merging further includes merging of the resolved beams in which the plurality of portions of one of the merged beams has the substantially same selected predetermined orientation of a chosen component of electromagnetic wave field vectors as that of the plurality of portions of the other merged beam and further includes each merged beam having its plurality of portions parallel and simultaneous to the plurality of portions as that of the other merged beam.

Another object of this invention is to provide a method and system further comprising the step of passing the substantially collimated third single collinear beam of electromagnetic energy to a projection means.

Another object of this invention is to provide a method and system of producing a modulated beam of electromagnetic energy, comprising:

[a] providing a primary beam of electromagnetic energy having a predetermined range of wavelengths and randomly changing orientations of a chosen component of electromagnetic wave field vectors;

[b] resolving the primary beam of electromagnetic energy into a primary first resolved beam of electromagnetic energy having substantially a first selected predetermined orientation of a chosen component of the electromagnetic wave field vectors and a primary second resolved beam of electromagnetic energy having substantially a second selected predetermined orientation of a chosen component of the electromagnetic wave field vectors;

[c] separating each of the primary resolved beams of electromagnetic energy into two or more separate beams of electromagnetic energy, each of the separate beams of electromagnetic energy having a selected predetermined orientation of a chosen component of electromagnetic wave field vectors;

[d] altering the selected predetermined orientation of the chosen component of the electromagnetic wave field vectors of a plurality of portions of each of the separate beams of electromagnetic energy by passing the plurality of portions of each of the separate beams of electromagnetic energy through a respective one of a plurality of altering means whereby the selected predetermined orientation of the chosen component of the electromagnetic wave field vectors of the plurality of portions of each of the separate beams of electromagnetic energy is altered in response to a stimulus means by applying a signal means to the stimulus means in a predetermined manner as the plurality of portions of each of the separate beams of electromagnetic energy passes through the respective one of the plurality of means for altering the selected predetermined orientation of the chosen component of the electromagnetic wave field vectors;

[e]

[i] combining the altered separate beams of electromagnetic energy of the primary first resolved beam of electromagnetic energy into a first single collinear beam of electromagnetic energy without substantially changing the altered selected predetermined orientation of the chosen component of the electromagnetic wave field vectors of the plurality of portions of each of the separate beams of electromagnetic energy, and

[ii] combining the altered separate beams of electromagnetic energy of the primary second resolved beam of electromagnetic energy into a second single collinear beam of electromagnetic energy without substantially changing the altered selected predetermined orientation of the chosen component of the electromagnetic wave field vectors of the plurality of portions of each of the separate beams of electromagnetic energy; and

[f]

[i] resolving from the first single collinear beam of electromagnetic energy a first resolved beam of electromagnetic energy having substantially a first selected predetermined orientation of a chosen component of electromagnetic wave field vectors and a second resolved beam of electromagnetic energy having substantially a second selected predetermined orientation of a chosen component of electromagnetic wave field vectors, and

[ii] resolving from the second single collinear beam of electromagnetic energy a first resolved beam of electromagnetic energy having substantially a first selected predetermined orientation of a chosen component of electromagnetic wave field vectors and a second resolved beam of electromagnetic energy having substantially a second selected predetermined orientation of a chosen component of electromagnetic wave field vectors.

Another object of this invention is to provide a method and system as aforesaid of producing a modulated beam of light and a beam of ultraviolet light.

Another object of this invention is to provide a method and system as aforesaid wherein the step of providing includes providing a substantially collimated primary beam of electromagnetic energy.

Another object of this invention is to provide a method and system as aforesaid wherein the step of providing includes providing a primary beam of electromagnetic energy having a rectangular cross sectional area.

Another object of this invention is to provide a method and system as aforesaid wherein the step of providing includes providing a primary initial beam of electromagnetic energy having substantially the same selected predetermined orientation for the chosen component of the electromagnetic wave field vectors substantially across the beam.

Another object of this invention is to provide a method and system as aforesaid wherein the step of resolving includes resolving the primary beam into primary first and second resolved beams in which each of the resolved beams of electromagnetic energy has the substantially same selected predetermined orientation of the chosen component of the electromagnetic wave field vectors substantially across each of the resolved beams of electromagnetic energy as that of the other resolved beams of electromagnetic energy.

Another object of this invention is to provide a method and system as aforesaid wherein the step of resolving includes resolving the primary beam into primary first and second resolved beams in which the first selected predetermined orientation of the chosen component of the electromagnetic wave field vectors has the same selected predetermined orientation of the chosen component of the electromagnetic wave field vectors of the second selected predetermined orientation of the chosen component of the electromagnetic wave field vectors.

Another object of this invention is to provide a method and system as aforesaid further comprising the step of passing at least one of the beams resolved from the first or second single collinear beam of electromagnetic energy to a projection means.

Another object of this invention is to provide a method and system as aforesaid further comprising the step of passing one of the first or second resolved beams of electromagnetic energy obtained from resolving from the first single collinear beam of electromagnetic energy to a projection means and passing one of the first or second resolved beams of electromagnetic energy obtained from resolving from the second single collinear beam of electromagnetic energy to a projection means.

Another object of this invention is to provide a method and system as aforesaid further comprising the step of adjusting the electromagnetic spectrum of at least one of the separate beams of electromagnetic energy. The step of adjusting the electromagnetic energy may be accomplished by adjusting the wavelengths and/or intensity of at least one of the separated beams.

Another object of this invention is to provide a method and system as aforesaid wherein the step of separating includes separating each of the primary resolved beams into two or more separate beams in which each of the separate beams of electromagnetic energy has a predetermined range of wavelengths different from the other separate beams of electromagnetic energy.

Another object of this invention is to provide a method and system as aforesaid further comprising the step of adjusting the magnitude of at least one of the separate beams of electromagnetic energy obtained from the step of separating each of the primary resolved beams of electromagnetic energy into two or more separate beams of electromagnetic energy.

Another object of this invention is to provide a method and system of producing a collinear beam of electromagnetic energy having two constituent parts, comprising:

[a] providing a primary beam of electromagnetic energy having a predetermined range of wavelengths, randomly changing orientations of a chosen component of electromagnetic wave field vectors, and a substantially uniform flux intensity substantially across the initial beam of electromagnetic energy;

[b] resolving the primary beam of electromagnetic energy into a primary first resolved beam of electromagnetic energy having substantially a first selected predetermined orientation of a chosen component of the electromagnetic wave field vectors and a primary second resolved beam of electromagnetic energy having substantially a second selected predetermined orientation of a chosen component of the electromagnetic wave field vectors;

[c] altering the selected predetermined orientation of the chosen component of the electromagnetic wave field vectors of a plurality of portions of each of the primary resolved beams of electromagnetic energy bypassing the plurality of portions of each of the primary resolved beams of electromagnetic energy through a respective one of a plurality of altering means whereby the selected predetermined orientation of the chosen component of the electromagnetic wave field vectors of the plurality of portions of each of the primary resolved beams of electromagnetic energy is altered in response to a stimulus means by applying a signal means to the stimulus means in a predetermined manner as the plurality of portions of each of the primary resolved beams of electromagnetic energy passes through the respective one of the plurality of means for altering the selected predetermined orientation of the chosen component of the electromagnetic wave field vectors;

[d]

[i] resolving from the first altered primary first resolved beam of electromagnetic energy a first resolved beam of electromagnetic energy having substantially a first selected predetermined orientation of a chosen component of electromagnetic wave field vectors and a second resolved beam of electromagnetic energy having substantially a second selected predetermined orientation of a chosen component of electromagnetic wave field vectors, and

[ii] resolving from the second altered primary first resolved beam of electromagnetic energy a first resolved beam of electromagnetic energy having substantially a first selected predetermined orientation of a chosen component of electromagnetic wave field vectors and a second resolved beam of electromagnetic energy having substantially a second selected predetermined orientation of a chosen component of electromagnetic wave field vectors; and

[e] merging one of the resolved beams of electromagnetic energy from the altered primary first resolved beam of electromagnetic energy with one of the resolved beams of electromagnetic energy from the second altered primary resolved beam of electromagnetic energy into a first single collinear beam of electromagnetic energy.

Another object of this invention is to provide a method and system as aforesaid of producing a collinear beam of light having two constituent parts and a beam of ultraviolet light having two constituent parts.

Another object of this invention is to provide a method and system as aforesaid wherein the step of resolving includes resolving. The primary beam into primary first and second resolved beams in which the first selected predetermined orientation of the chosen component of the electromagnetic wave field vectors has the same selected predetermined orientation of the chosen component of the electromagnetic wave field vectors of the second selected predetermined orientation of the chosen component of the electromagnetic wave field vectors.

Another object of this invention is to provide a method and system as aforesaid wherein the step of resolving includes resolving the primary beam into primary first and second resolved beams in which the first selected predetermined orientation of the chosen component of the electromagnetic wave field vectors has a selected predetermined orientation of the chosen component of the electromagnetic wave field vectors different from the second selected predetermined orientation of the chosen component of the electromagnetic wave field vectors.

Another object of this invention is to provide a method and system as aforesaid wherein the step of merging includes merging said resolved beams in which the plurality of portions of one of the merged resolved beams has a different selected predetermined orientation of a chosen component of electromagnetic wave field vectors from the plurality of portions of the other merged resolved beam.

Another object of this invention is to provide a method and system as aforesaid wherein the step of merging includes merging said resolved beams in which each merged beam has its plurality of portions parallel and noncoincident to the plurality of portions of the other merged beam.

Another object of this invention is to provide a method and system as aforesaid wherein the step of merging includes merging said resolved beams in which each merged beam has its plurality of portions parallel and partially coincident to the plurality of portions of the other merged beam.

Another object of this invention is to provide a method and system as aforesaid in which the step of merging includes merging said resolved beams in which each merged beam has its plurality of portions parallel and simultaneous to the plurality of portions of the other merged beam.

Another object of this invention is to provide a method and system as aforesaid in which the step of merging includes merging said resolved beams in which each merged beam has its plurality of portions parallel, noncoincident and simultaneous to the plurality of portions of the other merged beam.

Another object of this invention is to provide a method and system as aforesaid in which the step of merging includes merging said resolved beams in which each merged beam has its plurality of portions parallel, partially coincident and simultaneous to the plurality of portions of the other merged beam.

Another object of this invention is to provide a method and system as aforesaid in which the step of merging includes merging said resolved beams in which the plurality of portions of one of the merged beams has the substantially same selected predetermined orientation of a chosen component of electromagnetic wave field vectors as the plurality of portions of the other merged beam.

Another object of this invention is to provide a method and system as aforesaid in which the step of merging includes merging said resolved beams in which the plurality of portions of one of the merged beams has the substantially same selected predetermined orientation of a chosen component of electromagnetic wave field vectors as the plurality of portions of the other merged beam and each merged beam has its plurality of portions parallel and noncoincident to the plurality of portions of the other merged beam.

Another object of this invention is to provide a method and system as aforesaid in which the step of merging includes merging said resolved beams in which the plurality of portions of one of the merged beams has the substantially same selected predetermined orientation of a chosen component of electromagnetic wave field vectors as the plurality of portions of the other merged beam and each merged beam has its plurality of portions parallel and partially coincident to the plurality of portions of the other merged beam.

Another object of this invention is to provide a method and system as aforesaid in which the step of merging includes merging said resolved beams in which the plurality of portions of one of the merged beams has the substantially same selected predetermined orientation of a chosen component of electromagnetic wave field vectors as that of the plurality of portions of the other merged beam and each merged beam having its plurality of portions parallel and simultaneous to the plurality of portions of the other merged beam.

Another object of this invention is to provide a method and system as aforesaid further comprising the step of passing the first single collinear beam of electromagnetic energy to a projection means.

Another object of this invention is to provide a method and system of producing one or more collinear beams of electromagnetic energy, comprising:

[a] producing four or more separate beams of electromagnetic energy, each of the separate beams of electromagnetic energy having the same selected predetermined orientation of a chosen component of electromagnetic wave field vectors substantially across each beam, a predetermined range of wavelengths and a substantially uniform flux intensity substantially across each beam of electromagnetic energy;

[b] altering the selected predetermined orientation of the chosen component of the electromagnetic wave field vectors of a plurality of portions of each of the separate beams of electromagnetic energy by passing the plurality of portions of each of the separate beams of electromagnetic energy through a respective one of a plurality of altering means whereby the selected predetermined orientation of the chosen component of the electromagnetic wave field vectors of the plurality of portions of each of the separate beams of electromagnetic energy is altered in response to a stimulus means by applying a signal means to the stimulus means in a predetermined manner as the plurality of portions of each of the separate beams of electromagnetic energy passes through the respective one of the plurality of means for altering the selected predetermined orientation of the chosen component of the electromagnetic wave field vectors;

[c]

[i] combining at least one of the altered separate beams of electromagnetic energy with at least one of the other altered separate beams of electromagnetic energy into a first single collinear beam of electromagnetic energy without substantially changing the altered selected predetermined orientation of the chosen component of the electromagnetic wave field vectors of the plurality of portions of each of the combined separate beams of electromagnetic energy, and

[ii] combining at least one of the altered separate beams of electromagnetic energy with at least one of the other altered separate beams of electromagnetic energy into a second single collinear beam of electromagnetic energy without substantially changing the altered selected predetermined orientation of the chosen component of the electromagnetic wave field vectors of the plurality of portions of each of the combined separate beams of electromagnetic energy;

[d]

[i] resolving from the first single collinear beam of electromagnetic energy a first resolved beam of electromagnetic energy having substantially a first selected predetermined orientation of a chosen component of electromagnetic wave field vectors and a second resolved beam of electromagnetic energy having substantially a second selected predetermined orientation of a chosen component of electromagnetic wave field vectors, and

[ii] resolving from the second single collinear beam of electromagnetic energy a first resolved beam of electromagnetic energy having substantially a first selected predetermined orientation of a chosen component of electromagnetic wave field vectors and a second resolved beam of electromagnetic energy having substantially a second selected predetermined orientation of a chosen component of electromagnetic wave field vectors; and

[e] merging one of the resolved beams of electromagnetic energy from the first single collinear beam of electromagnetic energy with one of the other resolved beams of electromagnetic energy from the second single collinear beam of electromagnetic energy into a third single collinear beam of electromagnetic energy.

Another object of this invention is to provide a method and system as aforesaid producing one or more collinear beams of light and beams of ultraviolet light.

Another object of this invention is to provide a method and system as aforesaid in which the step of producing includes producing each separate beam of electromagnetic energy further having a rectangular cross sectional area.

Another object of this invention is to provide a method and system as aforesaid further comprising the step of passing the third single collinear beam of electromagnetic energy to a projection means.

Another object of this invention is to provide a method and system as aforesaid further comprising the step of adjusting the electromagnetic spectrum of at least one of the separate beams of electromagnetic energy. The step of adjusting the electromagnetic energy may be accomplished by adjusting the wavelengths and/or intensity of at least one of the separated beams.

Another object of this invention is to provide a method and system of producing a modulated beam of electromagnetic energy comprising: producing an initial beam of electromagnetic energy having a predetermined range of wavelengths and having a substantially uniform flux intensity substantially across the initial beam of electromagnetic energy; separating the initial beam of electromagnetic energy into two or more separate beams of electromagnetic energy, each of the separate beams of electromagnetic energy having a selected predetermined orientation of a chosen component of electromagnetic wave field vectors; altering the selected predetermined orientation of the chosen component of the electromagnetic wave field vectors of a plurality of portions of each of the separate beams of electromagnetic energy by passing the plurality of portions of each of the separate beams of electromagnetic energy through a respective one of a plurality of altering means whereby the selected predetermined orientation of the chosen component of the electromagnetic wave field vectors of the plurality of portions of each of the separate beams of electromagnetic energy is altered in response to a stimulus means by applying a signal means to the stimulus means in a predetermined manner as the plurality of portions of each of the substantially separate beams of electromagnetic energy passes through the respective one of the plurality of means for altering the selected predetermined orientation of the chosen component of the electromagnetic wave field vectors; combining the altered separate beams of electromagnetic energy into a single collinear beam of electromagnetic energy without substantially changing the altered selected predetermined orientation of the chosen component of the electromagnetic wave field vectors of the plurality of portions of each of the separate beams of electromagnetic energy; resolving from the single collinear beam of electromagnetic energy a first resolved beam of electromagnetic energy having substantially a first selected predetermined orientation of a chosen component of electromagnetic wave field vectors and a second resolved beam of electromagnetic energy having substantially a second selected predetermined orientation of a chosen component of electromagnetic wave field vectors, whereby the first and second selected predetermined orientation of the chosen component of the electromagnetic wave field vectors are different from one another; and altering the selected predetermined orientation of the chosen component of the electromagnetic wave field vectors of a plurality of portions of the resolved beam of electromagnetic energy by passing the plurality of portions of the resolved beam of electromagnetic energy through a altering means whereby the selected predetermined orientation of the chosen component of the electromagnetic wave field vectors of the plurality of portions of the resolved beam of electromagnetic energy is altered in response to a stimulus means by applying a signal means to the stimulus means in a predetermined manner as the plurality of portions of the resolved beam of electromagnetic energy passes through the plurality of means for altering the selected predetermined orientation of the chosen component of the electromagnetic wave field vectors.

Another object of this invention is to provide a method as aforesaid of producing a modulated beam of light.

Another object of this invention is to provide a method and system as aforesaid in which the step of producing a substantially collimated beam of electromagnetic energy having substantially the same selected predetermined orientation of a chosen component of electromagnetic wave field vectors and a substantially uniform flux intensity substantially across the beam of electromagnetic energy, comprising: providing a substantially collimated beam of electromagnetic energy having a predetermined range of wavelengths; resolving from the substantially collimated beam of electromagnetic energy a substantially collimated first resolved beam of electromagnetic energy having substantially a first selected predetermined orientation of a chosen component of the electromagnetic wave field vectors and a substantially collimated second resolved beam of electromagnetic energy having substantially a second selected predetermined orientation of a chosen component of the electromagnetic wave field vectors, whereby the first and second selected predetermined orientation of the chosen component of the electromagnetic wave field vectors are different from one another; and forming from the substantially collimated first resolved beam of electromagnetic energy and the substantially collimated second resolved beam of electromagnetic energy a substantially collimated single beam of electromagnetic energy having substantially the same selected predetermined orientation of a chosen component of electromagnetic wave field vectors substantially across the substantially collimated single beam of electromagnetic energy and a substantially uniform flux intensity substantially across the substantially collimated single beam of electromagnetic energy.

Another object of this invention is to provide a method and system as aforesaid of producing a substantially collimated beam of light and a beam of ultraviolet light.

Another object of this invention is to provide a method and system as aforesaid wherein the step of forming includes forming the single beam of electromagnetic energy further having a rectangular cross sectional area.

Another object of this invention is to provide a method and system as aforesaid further comprising the steps of resolving and forming the step of producing from the substantially collimated first and second resolved beam of electromagnetic energy a substantially collimated first and second resolved beam of electromagnetic energy having substantially the same selected predetermined orientation of the chosen component of the electromagnetic wave field vectors.

Another object of this invention is to provide a method and system as aforesaid wherein the step of resolving includes resolving from the substantially collimated beam of electromagnetic energy a substantially collimated first resolved beam of electromagnetic energy and substantially collimated second resolved beam of electromagnetic energy further having substantially uniform flux intensity substantially across the beam of electromagnetic energy, and step

[c] further includes forming the substantially collimated single beam of electromagnetic energy further having substantially the same uniform flux intensity substantially across the beam of electromagnetic energy as that of each of the resolved beams of electromagnetic energy.

Another object of this invention is to provide a method and system as aforesaid further comprising between the steps of resolving and forming the step of producing from the substantially collimated first and second resolved beam of electromagnetic energy a substantially collimated first and second resolved beam of electromagnetic energy having substantially the same selected predetermined orientation of the chosen component of the electromagnetic wave field vectors, whereby the substantially collimated first and second resolved beam of electromagnetic energy are parallel and noncollinear.

Another object of this invention is to provide a method and system as aforesaid further comprising the step of passing one of the substantially collimated resolved beams of electromagnetic energy through a means for changing the selected predetermined orientation of the chosen component of the electromagnetic wave field vectors.

Another object of this invention is to provide a method and system as aforesaid wherein the step of passing one of the substantially collimated resolved beams of electromagnetic energy through a means for changing the selected predetermined orientation of the chosen component of the electromagnetic wave field vectors includes passing one of the substantially collimated resolved beams of electromagnetic energy through a liquid crystal device for changing the selected predetermined orientation of the chosen component of the electromagnetic wave field vectors.

Another object of this invention is to provide a method and system as aforesaid further comprising the step of passing one of the substantially collimated resolved beams of electromagnetic energy through a means for changing the selected predetermined orientation of a chosen component of electromagnetic wave field vectors and changing the selected predetermined orientation of the chosen component of the electromagnetic wave field vectors of one of the substantially collimated resolved beam of electromagnetic energy to match substantially the selected predetermined orientation of the chosen component of the electromagnetic wave field vectors of the other substantially collimated resolved beam of electromagnetic energy.

Another object of this invention is to provide a method and system as aforesaid wherein the step of forming further comprises the step of reflecting one of the substantially collimated resolved beams of electromagnetic energy from one or more reflecting means, each of the reflecting means having means for changing the selected predetermined orientation of the chosen component of the electromagnetic wave field vectors.

Another object of this invention is to provide a method and system as aforesaid wherein the step of reflecting one of the substantially collimated resolved beams of electromagnetic energy from one or more reflecting means, each of the reflecting means having means for changing the selected predetermined orientation of the chosen component of the electromagnetic wave field vectors includes reflecting one of the substantially collimated resolved beams of electromagnetic energy from one or more planar reflecting surface having a dielectric coating, each planar reflecting surface having a dielectric coating including means for changing the selected predetermined orientation of the chosen component of the electromagnetic wave field vectors.

Another object of this invention is to provide a method and system as aforesaid wherein the step of reflecting one of the substantially collimated resolved beams of electromagnetic energy from one or more reflecting means, each of the reflecting means having means for changing the selected predetermined orientation of the chosen component of the electromagnetic wave field vectors includes reflecting one of the substantially collimated resolved beams of electromagnetic energy from one or more mirrors having a thin film dielectric material, each mirrors having a thin film dielectric material including means for changing the selected predetermined orientation of the chosen component of the electromagnetic wave field vectors.

Another object of this invention is to provide a method and system as aforesaid wherein the step of providing includes providing a substantially collimated beam of electromagnetic energy further having randomly changing orientations of a chosen component of electromagnetic wave field vectors.

Another object of this invention is to provide a method and system as aforesaid further comprising the step of removing from at least one of the beams of electromagnetic energy at least a predetermined portion of a predetermined range of wavelengths.

Another object of this invention is to provide a method and system as aforesaid further including directing the removed portions to an absorption means.

Another object of this invention is to provide a method and system of producing a modulated beam of electromagnetic energy comprising: providing an initial collimated beam of electromagnetic energy having randomly changing orientations of the selected component of the electromagnetic wave field vectors and having a substantially uniform flux intensity across substantially the entire beam; resolving from the initial collimated beam of electromagnetic energy an initial collimated first resolved beam of electromagnetic energy having substantially a first single selected predetermined orientation of a chosen component of the electromagnetic wave field vectors and an initial collimated second resolved beam of electromagnetic energy having substantially a second single selected predetermined orientation of a chosen component of the electromagnetic wave field vectors, whereby the first and second single selected predetermined orientation of the chosen component of the electromagnetic wave field vectors are different from one another; forming from the initial collimated first resolved beam of electromagnetic energy and the initial collimated second resolved beam of electromagnetic energy a substantially collimated rectangular initial single beam of electromagnetic energy having substantially the same single selected predetermined orientation of a chosen component of the electromagnetic wave field vectors across substantially the entire beam of electromagnetic energy and a substantially uniform flux intensity across substantially the entire initial collimated single beam of electromagnetic energy, separating the collimated rectangular initial single beam of electromagnetic energy into two or more separate collimated rectangular beams of electromagnetic energy whereby each of the separate collimated rectangular beams of electromagnetic energy has the same single selected predetermined orientation of a chosen component of the electromagnetic wave field vectors as that of the other separate collimated rectangular beams of electromagnetic energy and each separate collimated rectangular beam of electromagnetic energy having a different electromagnetic energy from the other separate collimated rectangular beams of electromagnetic energy; adjusting the electromagnetic energy by removing at least a predetermined portion of electromagnetic energy of at least one of the separate collimated rectangular beams of electromagnetic energy and directing the removed portion to a beam stop whereby the removed portion is removed; altering the single selected predetermined orientation of the chosen component of the electromagnetic wave field vectors of a plurality of portions of each separate collimated rectangular beam of electromagnetic energy by passing a plurality of portions of each separate collimated rectangular beam of electromagnetic energy through a respective one of a plurality of altering means whereby the single selected predetermined orientation of the chosen component of the electromagnetic wave field vectors of the plurality of portions of each separate beam of electromagnetic energy is altered in response to a stimulus means by applying a signal means to the stimulus means in a predetermined manner as the plurality of portions of each of the substantially collimated separate beams of electromagnetic energy passes through the respective one of the plurality of altering the single selected predetermined orientation of a chosen component of the electromagnetic wave field vectors; combining the altered separate collimated rectangular beams of electromagnetic energy into a single collimated rectangular collinear electromagnetic energy beam without substantially changing the altered selected predetermined orientation of the chosen component of the electromagnetic wave field vectors of the plurality of portions of each separate collimated rectangular beam of electromagnetic energy; resolving from the single collimated rectangular collinear electromagnetic energy beam a first collimated rectangular resolved electromagnetic energy beam having substantially a first single selected predetermined orientation of a chosen component of the electromagnetic wave field vectors and second collimated rectangular resolved electromagnetic energy beam having substantially a second single selected predetermined orientation of a chosen component of the electromagnetic wave field vectors, whereby the first and second single selected predetermined orientation of the chosen component of the electromagnetic wave field vectors are different from one another; and passing one of the first collimated rectangular or second collimated rectangular resolved electromagnetic energy beams to a projection means.

Another object of this invention is to provide a method and system as aforesaid for modulating a beam of light.

One illustrative embodiment of the invention comprises: a light source for producing a collimated unpolarized beam of light; a polarizing beam splitter for splitting the unpolarized source beam into separate orthogonal linear P-polarized and S-polarized light beams; a half-wave retarded for converting the S-polarized light beam back to a second polarized-polarized light beam; and an arrangement of mirrors that combines the P-polarized light beams into a rectangular shaped beam of a unitary polarization.

The light beam, at this point, is separated into a red component and into a blue-green component using a first dichroic mirror selected to reflect light having red wavelengths greater than 600 nanometers. The blue-green component is then separated into a blue beam and a green beam using a second dichroic mirror selected to reflect light having green wavelengths between 500 nanometers and 600 nanometers. As an option, the red beam and the blue beam can be further filtered in order to provide an optimum of color balance in visual effect and the rejected portions of the beams that are filtered out from the red and blue can then be absorbed. At this point, the separate red, green and blue beams are passed through liquid crystal display devices and have their electric field vectors altered according to the input signal. The separate red and green beams are combined into a red-green beam using a dichroic mirror selected to pass the green beam wavelengths less than 595 nanometers and reflect the red beam. This red-green beam is then combined with a separate blue beam utilizing another dichroic mirror selected to pass the red-green beam wavelengths greater than 515 nanometers and reflect the blue beam to form a collinear beam. This collinear beam is then passed through a polarizer analyzer to segregate the beam according its electric field vector. One of the segregated beams can be passed to an absorbing beam block. the selected segregated modulated polarized beam is passed onto a projection lens that projects it onto a viewing screen. The system and method of the invention can be adapted for projecting a large image of high brightness, resolution and contrast onto a screen.

It should be further understood that, while certain particular wavelength numbers have been given for red, blue and green, they are for illustrative purposes only and can be changed or shifted due to the type of light source used. The changing or shifting of the particular range of wavelengths of the colors is due to the final color balance that is desired.

In use of one system disclosed, collimated light from the light source is directed through the polarizing beam splitter. The polarizing beam splitter separates the randomly polarized beam into a linear P-polarized beam and S-polarized beam and deflects the orthogonal polarized beams at right angles to one another. The P-polarized beam passes through the polarizing beam splitter and is reflected through an angle of 90° by a first mirror and into the projector beam path. The S-polarized beam exits from the polarizing beam splitter at an angle of 90° to the P-polarization beam and passes through the half-wave retarder. The half-wave retarder changes the polarization of the S-polarized beam back to P-polarization. A second mirror then reflects this P-polarized beam through an angle of 90° onto a third and a fourth mirror. The third and fourth mirrors split the reflected P-polarization beam and again reflect the P-polarized light beam from the second mirror through an angle of 90° and onto the LCD. The four mirrors are mounted along an optic path with respect to one another such that the separate P-polarized beams are combined in a generally rectangular shaped beam that corresponds to the rectangular light aperture of a LCD.

The system of the invention permits virtually all the light from the light source to be directed at the LCD. Moreover, the light beam at the LCD has a shape that corresponds to the generally rectangular outer peripheral configuration of most LCDs. The advantages of the rectangular beam allow the utilized light to strike the useful portions of the LCD, thereby not overheating the other elements surrounding the LCD causing reflection and/or heating problems.

Furthermore, another embodiment of the system of the invention directs a collimated source beam into a polarizer and divides the source beam into a right side beam and a left side beam, each having the same direction of polarization. The left side beam and the right side beam are then filtered into separate primary color beams (red, green and blue). Each separate primary color beam has the pixels of the respective portions of the beam changed in regards to the electric field vector by separate LCDs responsive to left and right side input images. The respective images of the right and left side primary color beams are then combined into a single right and left side images. The left and right side images are then combined, resolved into different polarized light beams according to the electric field vector by a polarizer analyzer and then one of said polarized beams is projected onto a display screen.

In yet another embodiment, a high resolution image is obtained by the method and system as described above. The left side beam is offset on the display screen from the right side beam (or vice versa) by a small amount in either the horizontal or the vertical direction (i.e., one pixel). In this mode, the driving electronics of the liquid LCDs must split an input image and provide that every other pixel is sent to the right or to the left side.

In order to project a three-dimensional image, separate input images corresponding to the left and right eyes of the viewer (i.e., different spatial perspectives) are input into the separate left and right side LCDs. A viewer has the choice of putting on a set of glasses over his eyes, such that the lens over the right eye is for viewing images polarized in a first direction and the lens over the left eye is for viewing images polarized in a different direction. The viewer will see a three-dimensional image if the signal provided to the driving electronics for the left/right side provide for a different signal corresponding to the different angular spatial mode of the left and right eye, i.e., the left side is a left side camera and the right side is a right side camera. These separate left side or right side images may also be viewed in three dimensions by a timed sequence for achieving the 3-D effect without glasses.

As an example, the system is configured such that a viewer's glasses contain a lens for viewing different orthogonally or different circularly polarized images. A left eye lens is configured for viewing P-polarized light while the right eye lens is configured for viewing S-polarized light. Alternately, as an example, the left eye lens is configured for viewing right circularly polarized light while the right eye lens is configured for viewing left circularly polarized light.

As an alternate example, the system is configured such that, in place of the viewer's glasses, a polarized screen is used. This screen is formed of a transparent material that has two or more different polarization coatings or layers. Each coating or layer reflects a certain orientation of an electric field vector and passes all other orientations of electric field vectors. Each successive layer or coating is different from the other layers. This allows certain portions of the image to be seen in depth or in actual 3-D. These types of layers or coatings are available from OCLI. For a general discussion, see "*Optical Thin Films User's Handbook*", by James D. Rancourt, McGraw-Hill Optical and Electro-optical Engineering Series, 1987.

In alternate embodiments of the invention, 3-D high-resolution, 3-D black and white or color high-resolution projectors are provided.

BRIEF DESCRIPTION OF THE DRAWINGS

FIG. 3C is a schematic illustration of a system for illuminating an LCD display or LCLV projector similar to that shown in FIGS. 3, 3A & 3B but in accordance with an alternate embodiment of the invention for such a display or projector;

FIG. 8D is a schematic illustration of a preferred embodiment of a system for a LCLV projector in accordance with the invention using unequal light pathways from the light source to the LCDs and a dichroic beam splitter and combiner;

FIG. 9A is a table showing the performance data of common optical sources;

FIG. 26 is a table of the characteristics of mirrors used in this invention;

DETAILED DESCRIPTION OF THE DRAWINGS

For purposes of simplicity, the same number has been used in the various figures to identify the same part.

Light Path and Rectangular Beam

Figure 3:
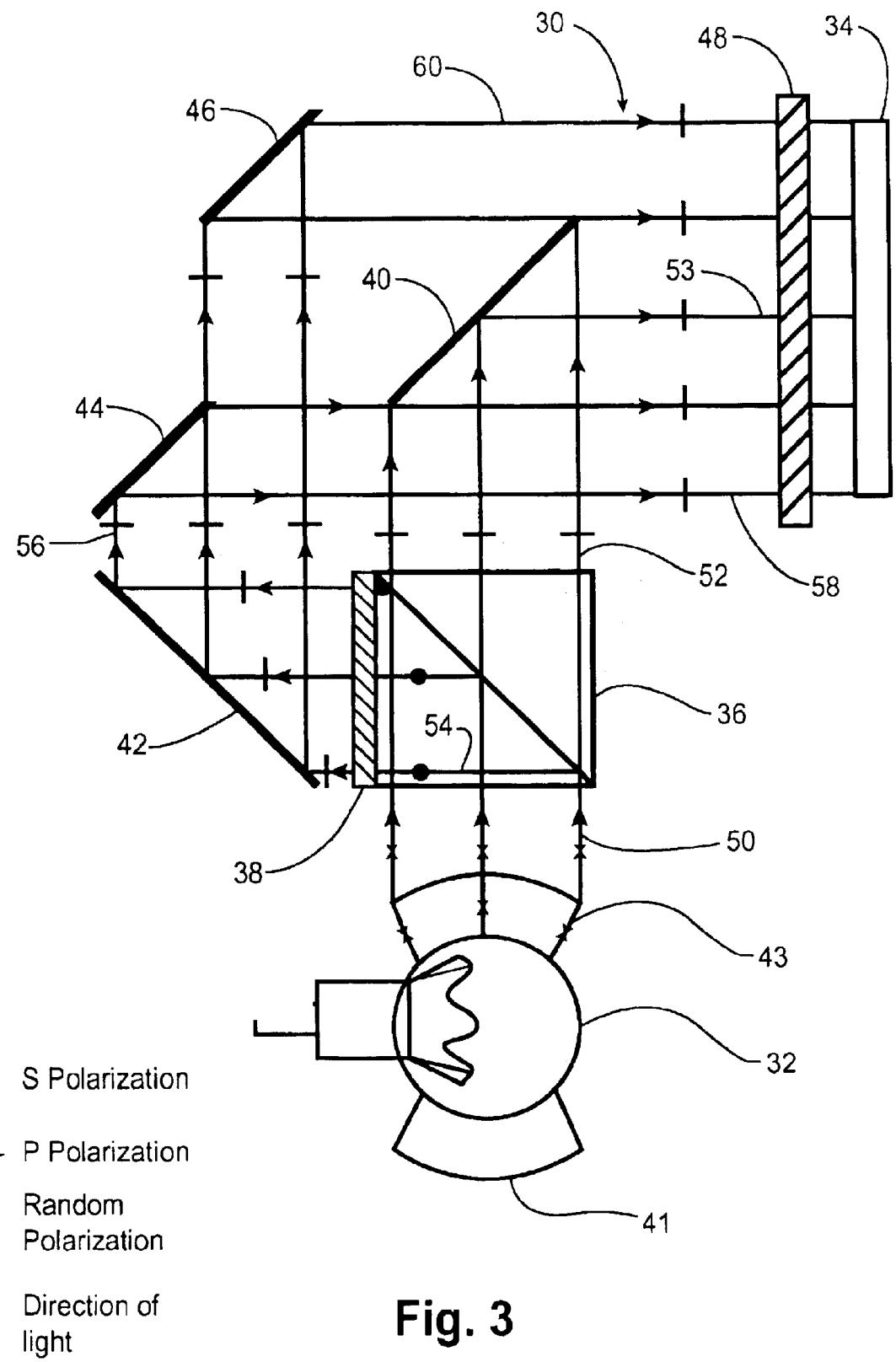
FIG. 3 is a schematic illustration of a system for illuminating an LCD display or LCDs in a LCLV projector in accordance with an illustrative embodiment of the invention.

Referring now to FIG. 3, a collimated light beam 50 from a light source 32 is converted into a unitary polarized beam 30 having a cross-sectional configuration or shape (see FIG. 5) that matches an outer peripheral cross-sectional configuration or shape of the LCD display 34. As an example, the LCD 34 display is a LCD having a light aperture of a generally rectangular outer peripheral configuration.

This aspect of the invention includes in an optically aligned path: a polarizing beam splitter 36, a half-wave retarder 38, and an arrangement of a first mirror 40, a second mirror 42, a third mirror 44, and a fourth mirror 46, that combine the separate beams exiting from the polarizing beam splitter 36 into a combined beam of single polarization 30 having a cross sectional configuration or shape that matches the cross sectional shape of the LCD display 34. Suitable color filters 48 may be placed between the LCD display 34 and the combined beam.

Figure 27:
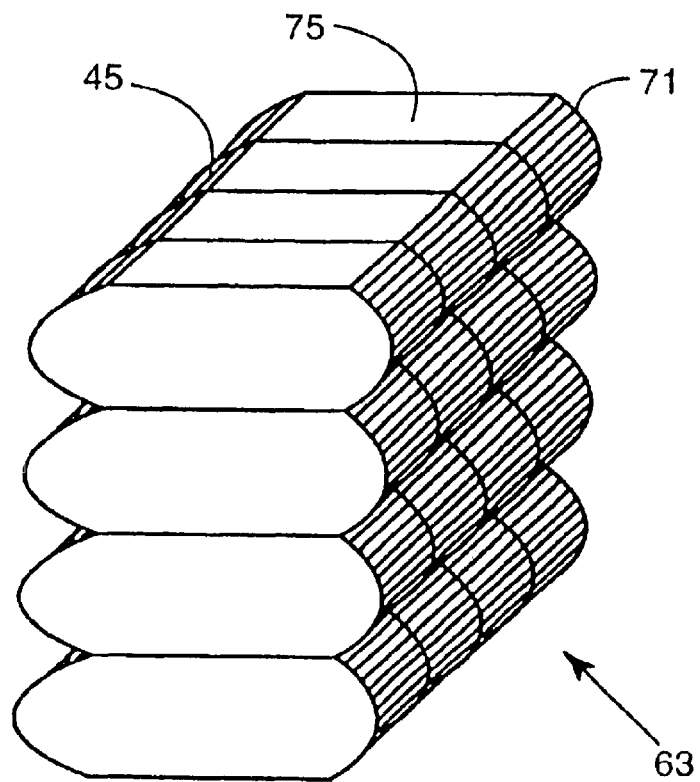
FIG. 27 is a preferred embodiment of an illustrative drawing of a system for producing a collimated beam of light known as an optical integrator.

The manner in which the collimated beam 50 is formed is now described. Light source 32 and reflecting optics or means 41 produce an unpolarized beam of light 50 which is then collimated by collimation optics, such as lens 43 or light integrator means 63, as shown in FIG. 27.

Figure 27A:
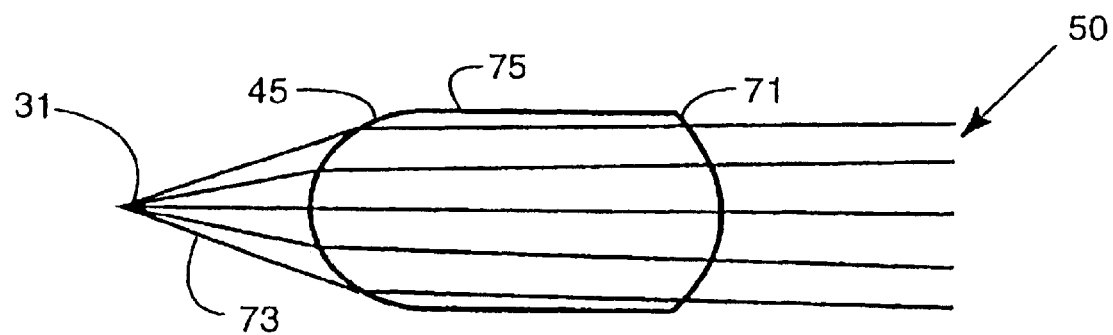
FIG. 27A is a preferred embodiment of an illustrative drawing of a single light pipe of the optical integrator for producing a collimated beam of light, and also shows the optical path of light rays through it.

The light or optical integrator means is made of a plurality of light pipes such as those shown in FIG. 27A, each light pipe being adjacent and in contact with one or more other light pipes. Each light pipe consists of a first lens surface 45, a body 75, and a second lens surface 71. A light source 31 emits rays 73 towards the surface of body 75 which is ground to the predetermined shape required. This first lens surface 45 functions to bend light rays 73 towards a more collimated alignment one to the other. Body 75 carries the light rays to the second lens surface 71 and has the same index of refraction as the first lens surface 45 and second lens surface 71. This minimizes the number of interfaces the light ray 73 must pass through. Continuing on, light ray 73 strikes the second lens surface 71 which is ground to a predetermined shape, and is again bent more normal; thus, the light rays exiting surface 71 are substantially collimated. Lens surfaces 45 and 71 may or may not be of the same shape or form and are dependent upon several factors, including, but not limited to, the size of the light source, the shape of the light source, the type of light source, the distance from the light source to the first lens surface 45, the length and size of body 75, the distance of the integrator second lens surface 71 to the target, and other factors known in the trade.

Referring again to FIG. 3, alternately, the light source 32 and its reflecting optics or means 41 form an unpolarized collimated beam of light 50. The unpolarized collimated beam of light 50 is split by the polarizing beam splitter 36 into separate orthogonal polarized beams, a P-polarized beam 52, and an S-polarized beam 54. The P-polarized beam passes through the polarizing beam splitter 36 and is directed onto the first mirror 40 and reflected through an angle of 90° as a reflected beam 53 and onto the LCD display 34. The S-polarized beam 54 is deflected by the polarizing beam splitter 36 through an angle of 90° and is passed through the half-wave retarder 38. the half-wave retarder 38 changes the orientation of the electric field vector of the S-polarized beam 54 to form a second P-polarized beam 56. This second P-polarized beam 56 is reflected through an angle of 90° by the second mirror 42. The third mirror 44 and fourth mirror 46 are situated to intercept the reflected second P-polarized beam 56 and split the beam into two separate reflected beams 58 and 60 emanating in the same direction as reflected beam 53. The three separate reflected beams 53, 58, and 60 are then combined (see FIG. 5) into a single beam 30 having a single orientation of the electric field vector (P-polarized) and is directed through suitable color filters 48 to the LCD display 34.

Figure 4:
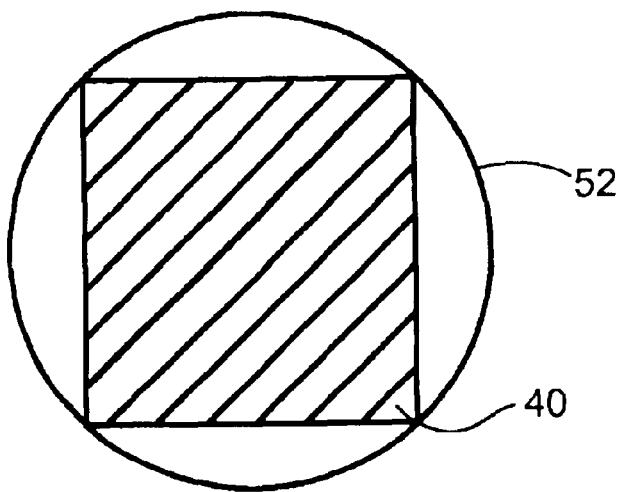
FIG. 4 is a schematic of a collimated light beam from a light source superimposed upon a mirror used in a system constructed in accordance with the invention.
Figure 5:
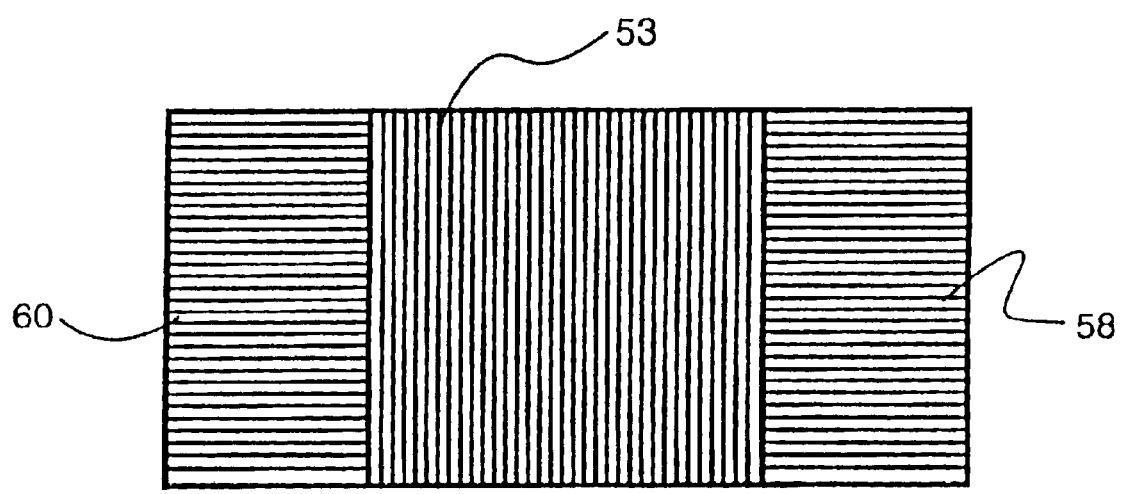
FIG. 5 is a schematic showing the shape of a light beam of a unitary polarization formed in accordance with the invention superimposed upon an LCD display.

With reference to FIG. 4, each mirror such as first mirror 40, may be configured with a preferred geometrical shape such as a generally rectangular or square (i.e., a square shape is a subset of a rectangular shape) outer peripheral configuration to intercept a generally circular shaped or collimated light beam (i.e. 52) such that the reflected beam (i.e., 53) from the mirror is also of a square or rectangular configuration. This arrangement will produce a reflected beam that is geometrically similar to the sizes and shapes of the mirrors used, as the geometry of the mirrors will be duplicated by the reflected beams. As shown in FIG. 5, this allows a square-shaped reflected beam 53 from a first mirror 40, a rectangular shaped reflected beam 60 from fourth mirror 46, and a rectangular shape reflected beam 58 from third mirror 44 to be aligned to produce a unitary beam at the LCD display 34 having a generally rectangular outer peripheral configuration. This rectangular configuration of the unitary beam 30 matches the rectangular outer peripheral configuration of the LCD display 34 and in particular to the light aperture of the LCD display 34.

The method and system for the invention with reference to FIGS. 3 & 4 can be summarized as follows: producing an unpolarized collimated beam of light 50 with a light source 32; splitting the unpolarized beam of light 50 with a polarizing beam splitter 36 into separate orthogonal polarized beams 52, 54 (i.e., a first P-polarized beam 52 and an S-polarized beam 54); directing a first orthogonal beam 52 (first P-polarized beam 52) onto a first mirror 40 to produce a first reflected beam 53; directing the second orthogonal beam 54 (S-polarized beam 54) through a half-wave retarder 38 in order to convert the direction of polarization of the second orthogonal beam 54 (S-polarized beam) to become a second reflected beam 56 having the same polarization as the first orthogonal beam 52 (a second P-polarized beam); directing the second orthogonal beam 56 (second P-polarized beam) onto a second mirror 42 and reflecting the beam through an angle of 90°; directing the second reflected beam 56 onto third and fourth mirrors 44, 46 that reflect the second reflected beam 56 through a second 90° angle and split the second reflected beam 56 into a third reflected beam 58 and a fourth reflected beam 60; and combining the separate reflected beams, i.e., first reflected (P-polarized) beam 53, third reflected (P-polarized) beam 58 and fourth reflected (P-polarized) beam 60, into a unitary beam 30 of a single polarization and having a rectangular outer peripheral shape that matches the rectangular outer peripheral shape of an LCD display 34.

Figure 3A:
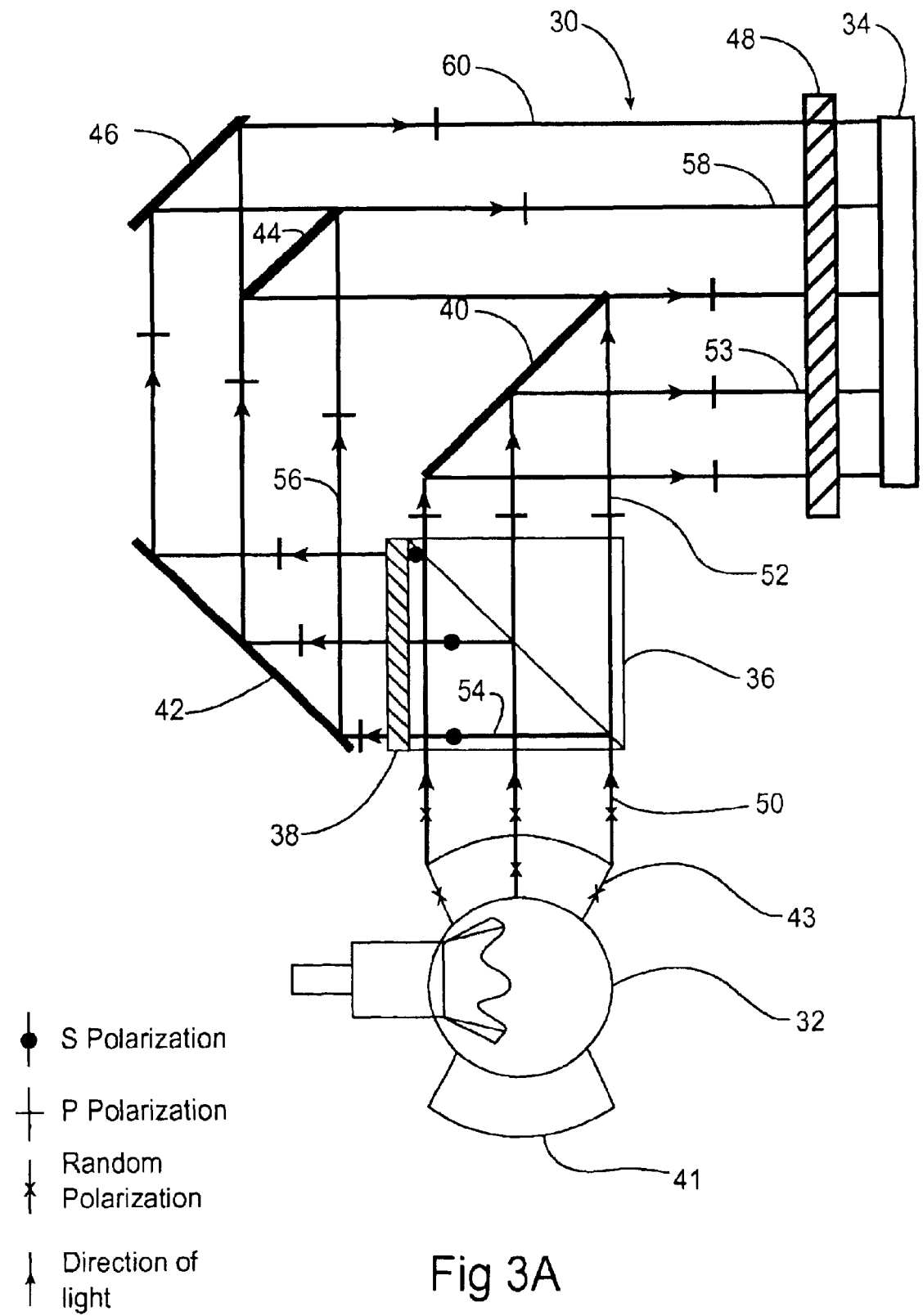
FIG. 3A is a schematic illustration of a system for illuminating an LCD display or LCLV projector similar to that shown in FIG. 3 but in accordance with an alternate embodiment of the invention.
Figure 3B:
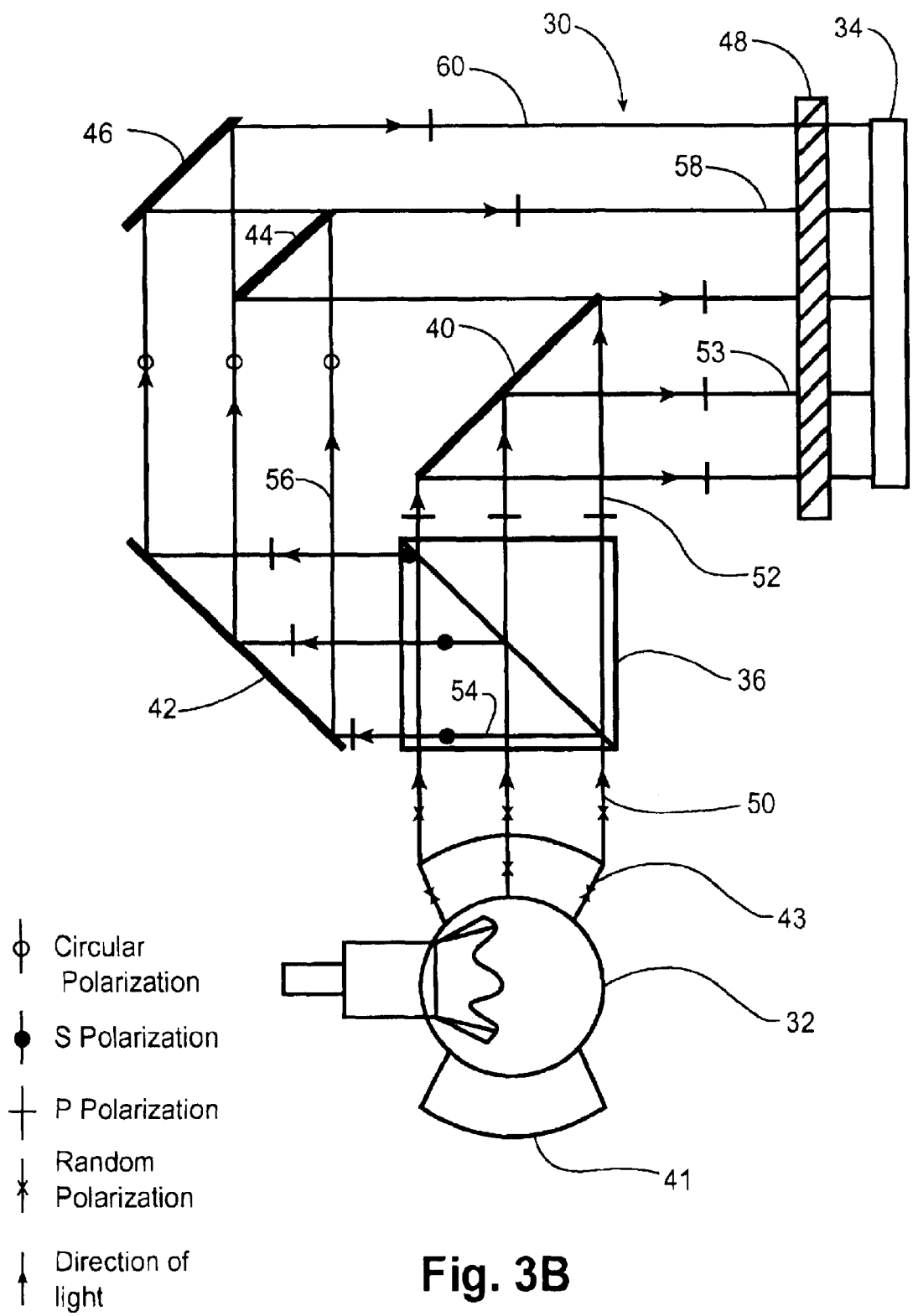
FIG. 3B is a schematic illustration of a system for illuminating an LCD display or LCLV projector similar to that shown in FIGS. 3 & 3A but in accordance with a preferred embodiment of the invention for such a display or projector.

Mirrors 40, 42, 44, 46 or other reflecting means are to be aligned to intersect the path of the orthogonal light beams 52, 56 to produce a unitary light beam by the combination of separate reflected beams 53, 58, 60 at the LCD display 34. FIG. 3 illustrates just one such alignment pattern for the mirrors 40, 42, 44, 46 with their planar surfaces. In the embodiment illustrated by FIG. 3, third mirror 44 and fourth mirror 46 are located on either side of first mirror 40. FIG. 3A illustrates another possible alignment of the mirrors 40, 44 and 46 to intersect the path of the orthogonal light beams 52, 56. In the embodiment of FIG. 3A, the third mirror 44 and fourth mirror 46. are both aligned on one side of the first mirror 40. However the resultant unitary beam at the LCD display 34 is functionally the same. Arrangements of the mirrors 40, 44, 46 other than those shown in FIGS. 3, 3A, & 3C are also possible. The arrangement of mirrors in FIGS. 3A & 3B are the same. Moreover, the mirrors 40, 44, 46 may be shaped and arranged to produce a square shaped beam at the LCD display 34.

Figure 4A:
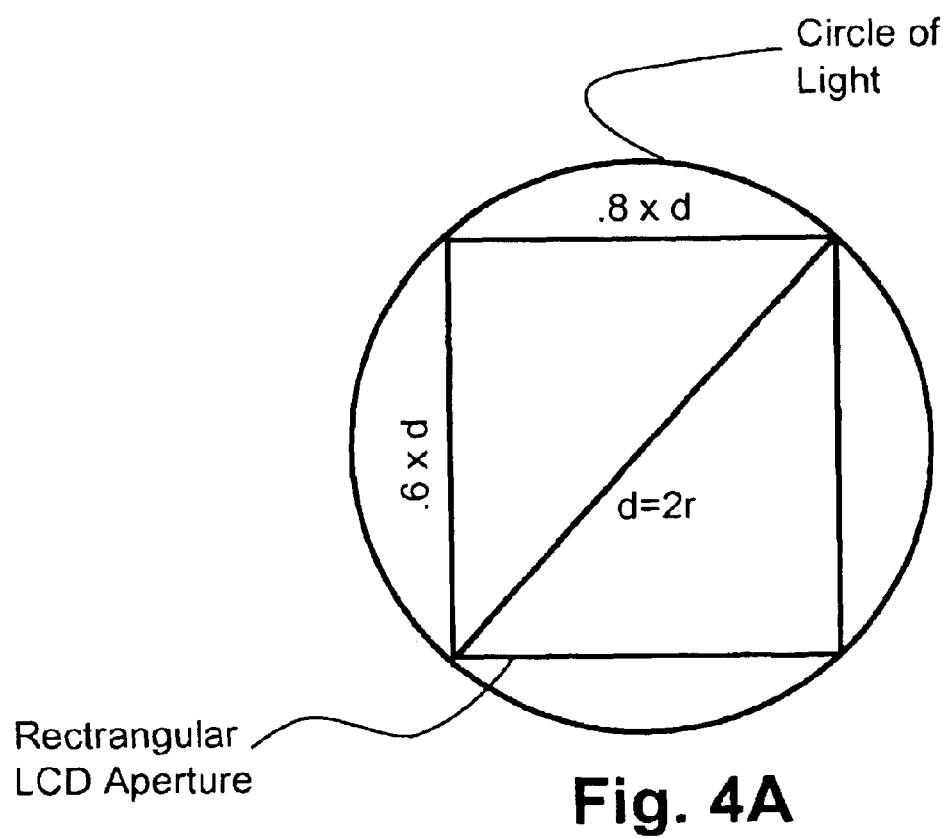
FIG. 4A is a diagrammatic representation used in an analysis of the geometry of an LCD light aperture and a light beam.

Beam 30 allows substantially of the light produced by the light source 32 to be utilized for illuminating the LCD display 34 taking into consideration the form factor of the light source as shown in FIG. 4A and described below. With beam 30, the minimal number of components (i.e., polarizing beam splitter 36, half-wave retarder 38, mirrors 40, 42, 44, 46) allow these components to be easily adjusted to achieve a resultant unitary beam at the LCD display 34 that is of the desired shape and of a single polarization (i.e., single orientation of the electric field vector). The polarization of the resultant beam in the illustrative embodiments is in a P-polarized direction. Alternately, the beam 30 can be configured to produce an S-polarized beam at the LCD display 34, or whatever else predetermined polarization direction is chosen.

In addition, the half-wave retarder 38 may be rotated to tune the polarization of the resultant beam 56 exiting from the half-wave retarder 38 to exactly match the polarization of the first P-polarized beam 52 exiting the polarizing beam splitter 36. Additionally, the positions of the mirrors (40, 42, 44, 46) may be easily adjusted or rearranged to achieve a predetermined resultant beam of a desire outer peripheral configuration at the LCD display 34.

In FIG. 3B, half-wave retardation of the beam is realized by means other than the half-wave retarder 38 as used in FIG. 3A. This is-accomplished by reflecting the beam 54 (S-polarized) from the second mirror 42, resulting in a quarter-wave retardation. Each half of the beam is then reflected from the respective mirrors 44, 46 and further retarded by a quarter-wave. This results in half-wave retardation of S-polarized beam 54 changing it into P-polarized beams 58, 60. The system shown in FIG. 3B is preferred to those systems shown in FIGS. 3 & 3A because less components are required. Such mirrors are available from OCLI Corporation, Santa Rosa, Calif. as part numbers 777-QWM001, through 777-QWM002.

The mirrors 42, 44, 46 as shown in FIG. 3B can be constructed with a coating formed thereon through thin film coating techniques. Each mirror 42, 44, 46 can act as a quarter wave retarder, besides being a broadband reflector.

Figure 6:
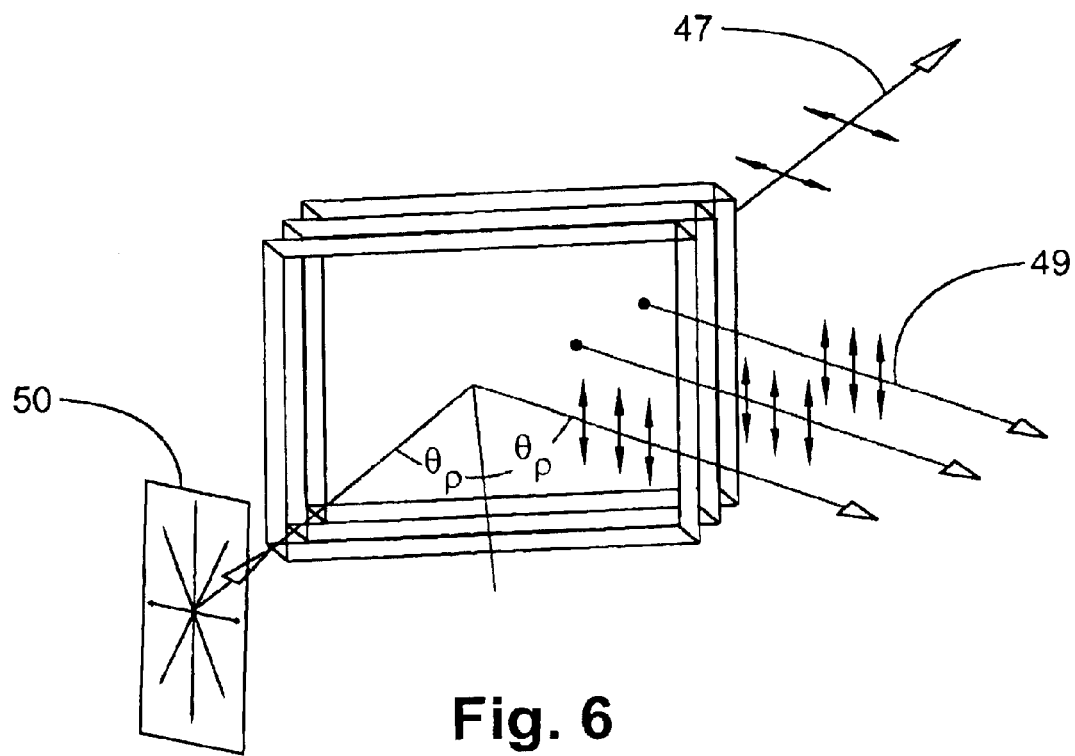
FIG. 6 is an illustrative drawing showing several layers of a thin film coating being illuminated by a non-polarized wave source and the resulting polarized beam.
Figure 7:
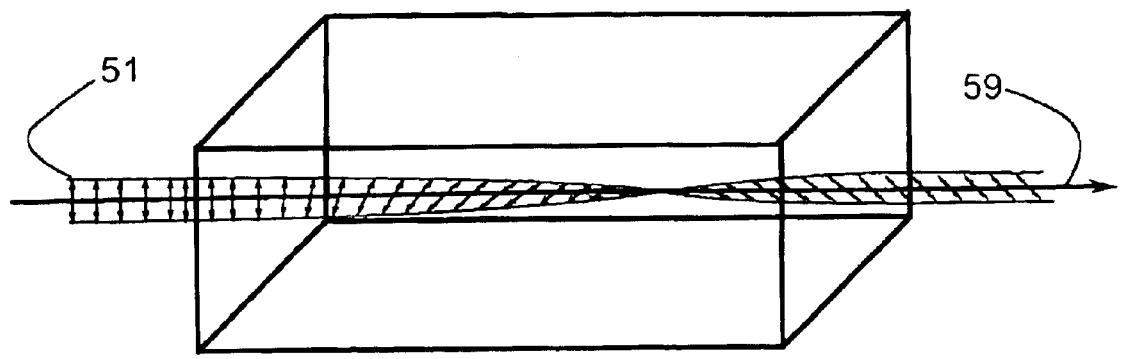
FIG. 7 is an illustrative drawing depicting a polarized beam impinging upon a LCD cell and the resulting retardation (changing, altering, or twisting) of the electric field vector.

Thin film coatings are also referred to as dielectric films, i.e., they are films made of materials composed of atoms whose electrons are so tightly bound to the atomic nuclei that electric currents are negligible even under applied high electric fields. The individual film thicknesses or layers vary over a very broad range, but they are referred to as a thin film when the thickness of the film is on the order of that wavelength. These films are built up in many layers, one on top of another, and are referred to as a multilayer thin film, as schematically illustrated in FIG. 6. Each layer then reflects the appropriate wavelength or orientation of the electric field vector according to its individually designed construction. These layers are typically deposited on top of a receiving substrate by vacuum deposition. This includes vaporizing a material and causing the vapor atoms to strike the substrate in a predetermined manner and rate. Some typical materials are $MgF_2$ $SiO_2$ $Al_2$ $O_3$ C (diamond), ZnS, $TiO_2$, CdS, CdTe, GaAs, Ge, Si, Ag, Au, PbS, along with many other materials.

Because dielectric materials are used, the index of refraction for each layer is different from each adjacent layer, although in some cases they might be the same.

Light is reflected from, and transmitted through each layer (see FIG. 6) and interface. These light wave fields that are transmitted and reflected from each interface interact with one another. Depending upon the material chosen for the thin film and the optical thickness of the thin film, different results are achieved. A device made in this fashion can have from one to several hundred film layers on a substrate. In one instance, by proper design, a coating can change the phase of incident linearly polarized light. In effect, this functions as a relative quarter wave plate. Several papers on this subject have been published, but in particular: "*Phase Retardance of Periodic Multilayer Mirrors*," Appl. Opt., 21(4):733 (1982), Joseph H. Appl, "*Graphical Method to Design internal Reflection Phase Retarders,*" Appl. Opt., 23(8):1178 (1984), "*Mulitlayer Coating Design Achieving a Broadband 90° Phase Shift*", Appl. Opt., 19(16):2688, (1980), William H. Southwell.

In another design, the coating reflects the incident polarized light wave, and thus reinforces the P-polarized reflection. This design reflects the entire light spectrum and functions as a broadband mirror.

Figure 9:
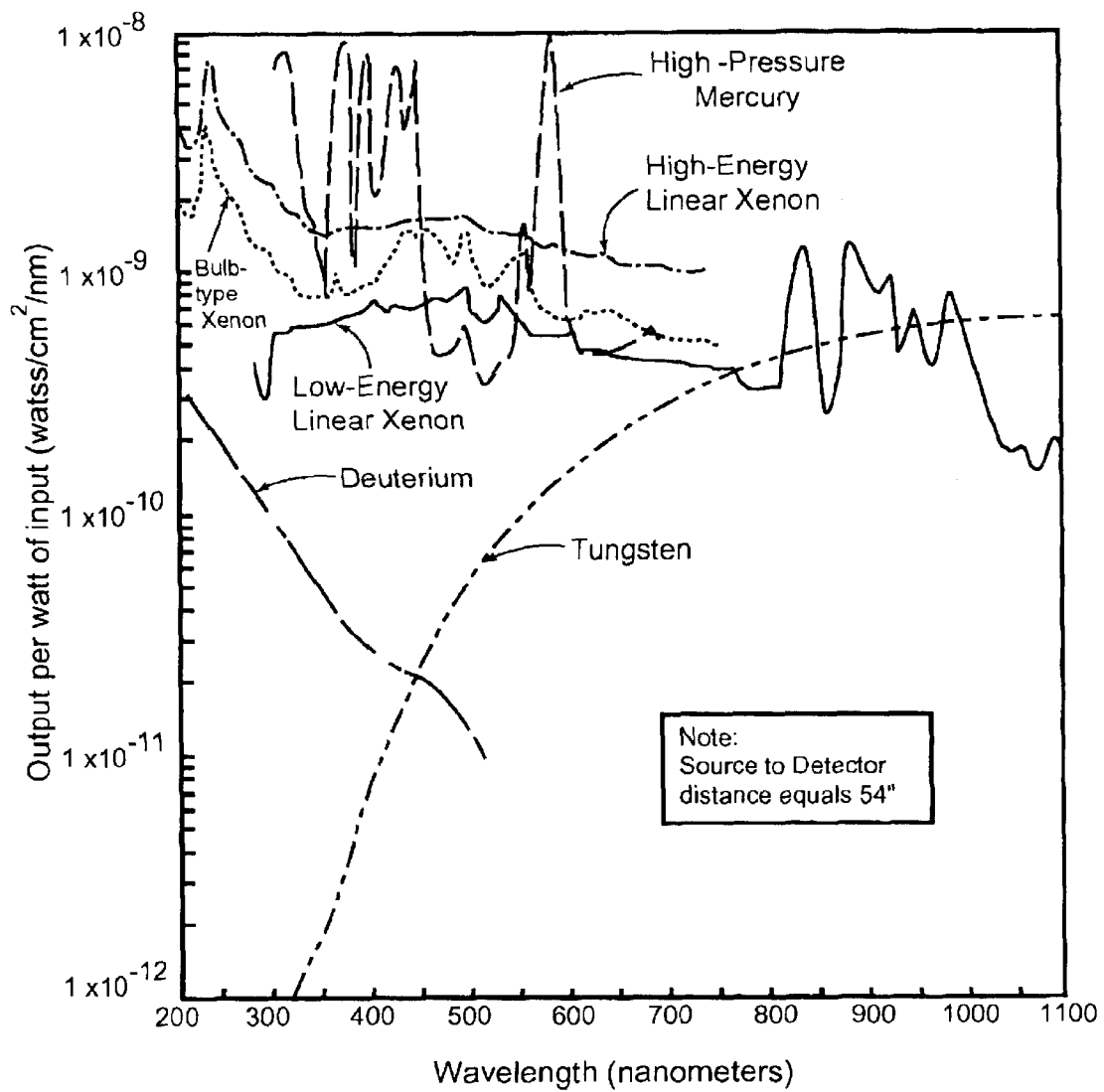
FIG. 9 is a graph showing the spectral characteristics of commonly used optical sources.

The components of the system producing unitary beam 30 may be fabricated from commercially available parts. Light source 32 can be any suitable lamp such as a short arc lamp, a quartz-halogen lamp, a mercury vapor/xenon long arc lamp, etc. In general, such lamps efficiently produce a high intensity point source of light. They are available in various sizes and with varying spectral qualities. Suitable commercial embodiments of high brightness light sources (greater than 15,000 lumens) are manufactured by many manufacturers, including but not limited to Optical Radiation Corporation, Azusa, Calif. Other light sources that produce desired wavelengths and different output lumens (spectra or spectrum distribution) may also be utilized as shown in FIG. 9A. Most light sources contain a spectrum of visible, infrared, and ultraviolet light that are contained in different proportions respective to each other. Lasers can also be used as light sources.

Polarizing beam splitter 36 may be any of the known devices. It may be, for example, composed of a dielectric thin film stack disposed on a suitable substrate (such as glass). The stack may be fabricated by alternating layers of high and low refractive index films each with a quarterwave optical thickness, with the center of the wavelength design for visible light at approximately 550 nanometers. At each film/film interface, light is incident at Brewsters angle which transmits P-polarized light and reflects S-polarized light. The number of layers are dependent upon the final outcome desired, and can be tailored for the cost/performance tradeoff desired. It may be fashioned in the shape of a cube of glass with the layers deposited on the diagonal, or alternatively, the multilayers can be deposited on a piece of glass, and optionally, another piece of glass can then be cemented to the front, forming a sandwich of which the multilayers are deposed in between the two pieces of glass. The purpose of this is to protect the layer stack from abrasion or contact with the air. The arrangement of a single piece of glass or two pieces of glass would yield a polarizing beam splitter that is less costly to produce and weigh less than a cube polarizer.

Figure 10:
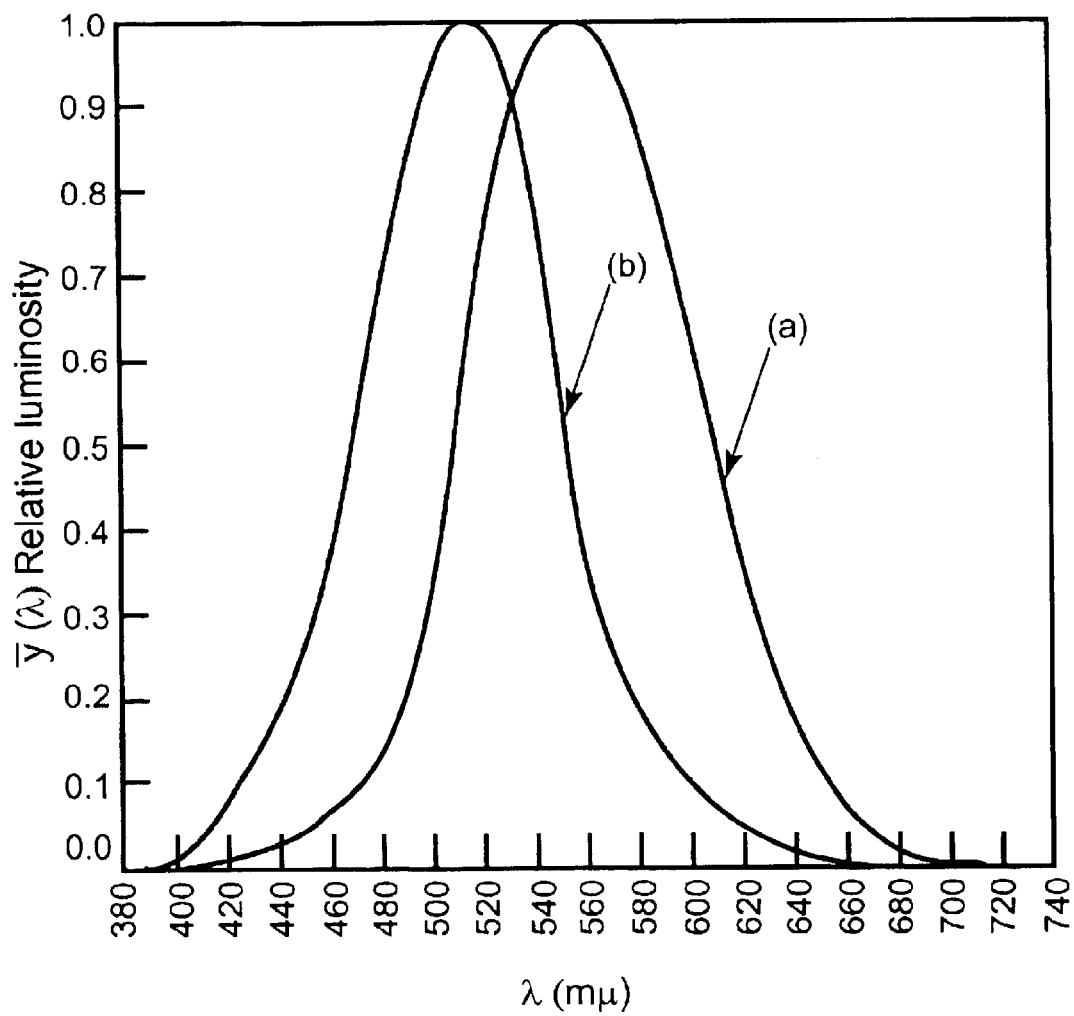
FIG. 10 is a graph illustrating the scotopic and photopic response characteristics for the human eye of visible light.

It is desirable that the light striking the surface of the layers do so at a 45° angle, with a small deviation from the normal of the rays, thus the incidence angle between the layers and the beam of light should be well controlled. Such a polarizing beam splitter is described in U.S. Pat. No. 2,403,731 to MacNeille or U.S. Pat. No. 2,449,287 to Flood and is termed a MacNeille polarizer. A commercial embodiment of such a polarizing beam splitter suitable for use herein can be obtained from the Perkin Elmer Corporation, Electro-Optical Division, Norwalk, Conn. or OCLI Corporation, Santa Rosa, Calif. A wavelength response for a polarizing beam splitter is shown in FIG. 10.

Typically, such coatings of thin film stacks on the diagonal of the polarizers and polarizing beam splitters can be coatings capable of handling high energy beams such as laser beams. They are capable of handling high wattage of incident energy per centimeter squared.

The mirror 40 (OCLI Corporation, Santa Rosa, Calif., part no. 777BEM001) must be selected to be an efficient reflector of the P-polarized light at the particular wavelength required. Mirrors 42, 44, 46 are selected to be either quarter wave retarders or broadband reflective mirrors, depending upon how the system is configured. If used as a quarter wave mirror, their part numbers are 777QWM001 and 777-QWM002. if used as a broadband mirror, their part numbers are 777-BBM002 and 777-BBM003. These mirror numbers are available from OCLI Corporation, Santa Rosa, Calif. As an example, the mirrors can be formed of a thin film coated onto a substrate. The thin film is formed with a broadband coating for visible light. It is known that metal film mirrors reflect P-polarized waves more efficiently than S-polarized waves because of the nature of metal reflections. Because of this known efficiency factor, the conversion of S-polarized waves to P-polarized is utilized by this invention.

Such thin film mirrors that are acceptable for use herein can be obtained from the OCLI Corporation, Santa Rosa, Calif. Thin film coatings are known as laser coatings and are capable of handling high energy beams (watts divided by centimeters squared).

The half-wave retarder 38 (shown in FIG. 3A) maybe one of a class of optical elements known as retarders, which serve to change the polarization of an incident wave. With a retarder, the light exiting has the orientation of the electric field vector lagged in phase behind the input light by a predetermined amount. Upon emerging from the retarder, the relative phase is different than it was initially and thus the polarization state (orientation of the electric field vector) is different as well. A retardation plate that introduces a relative phase difference of 90° is known as a half-wave retarder.

A half-wave retarder can be made from a biaxial crystal material such as mica. Suitable retarders can also be made from sheets of plastic material that have been stretched to align long chain organic molecules, thin film dielectrics (such as that made by OCLI Corporation, Santa Rosa, Calif.), LCDs, reflection from mirrors coated with a thin film dielectric, a combination of a LCD and a mirror coated with a thin film dielectric, and quartz crystal. The half-wave retarder 38 used in the illustrative embodiment of the invention can preferably be adjusted (i.e., by rotation of the crystal) to exactly match the polarization state of a P-polarized light beam 56 exiting the retarder 38 (see FIG. 3A) with the P-polarization state of P-polarized light beam 52 exiting the polarizer cube 36. Other means of changing or converting the polarization direction of a light beam other than a half-wave retarder can be employed in this application. By way of example and not limitation, a system and method constructed in accordance with the invention offers the following results and advantages over prior art illumination systems: a rectangular singularity polarized beam is created that will efficiently fill the aperture of an LCD display; and the divergence of the resultant beam at the LCD display is smaller than with other methods of combination, i.e., U.S. Pat. No. 4,913,529 to Goldenberg.

Light Projector

Figure 8:
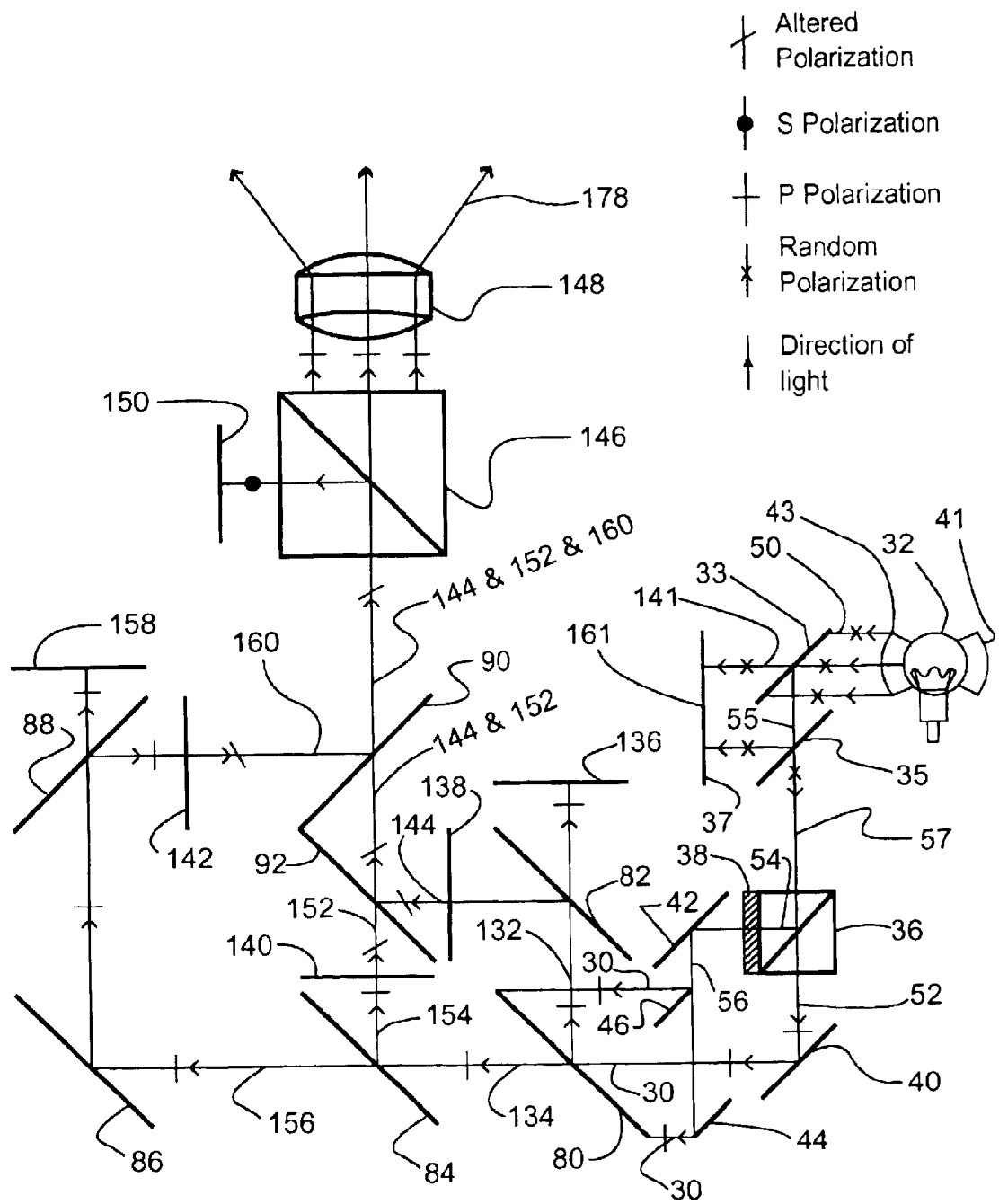
FIG. 8 is a diagrammatic representation of a color LCLV projector constructed in accordance with a preferred embodiment of the invention.

Referring now to FIG. 8, a projector constructed in accordance with an illustrative embodiment of the invention is shown. FIG. 8 is labeled with locative directions illustrating an optic path for convenience sake only and does not necessarily resemble what the actual layout may be. Other arrangements of the illustrative components connected in different optic paths may also be suitable.

A light source 32 (i.e., a xenon short arc lamp, a quartz-halogen lamp, a mercury vapor/xenon long arm lamp, etc.) emits light which is collimated into a source beam 50 traveling toward the left that contains a wavelength spectrum of visible, infrared and ultraviolet light. (Most light sources contain all of the above wavelengths of light; however, they are contained in different proportions respective to each other. See FIGS. 9 & 9A for different types of light sources). Depending on the application, the lamp source can be any suitable means for producing a collimated beam of light. The characteristics of the light source may be tailored to a particular application.

The visible region of light that a typical person can see is between 400 and 700 nanometers in wavelength (this is well understood and can be found in standard reference books or college level text books (see also photopic response curve in FIG. 10). The non-visible wavelengths between 200 nanometers to 400 nanometers are named the ultraviolet region and the non-visible wavelengths between 700 nanometers and 1500 nanometers are named the infrared region.

Figure 12:
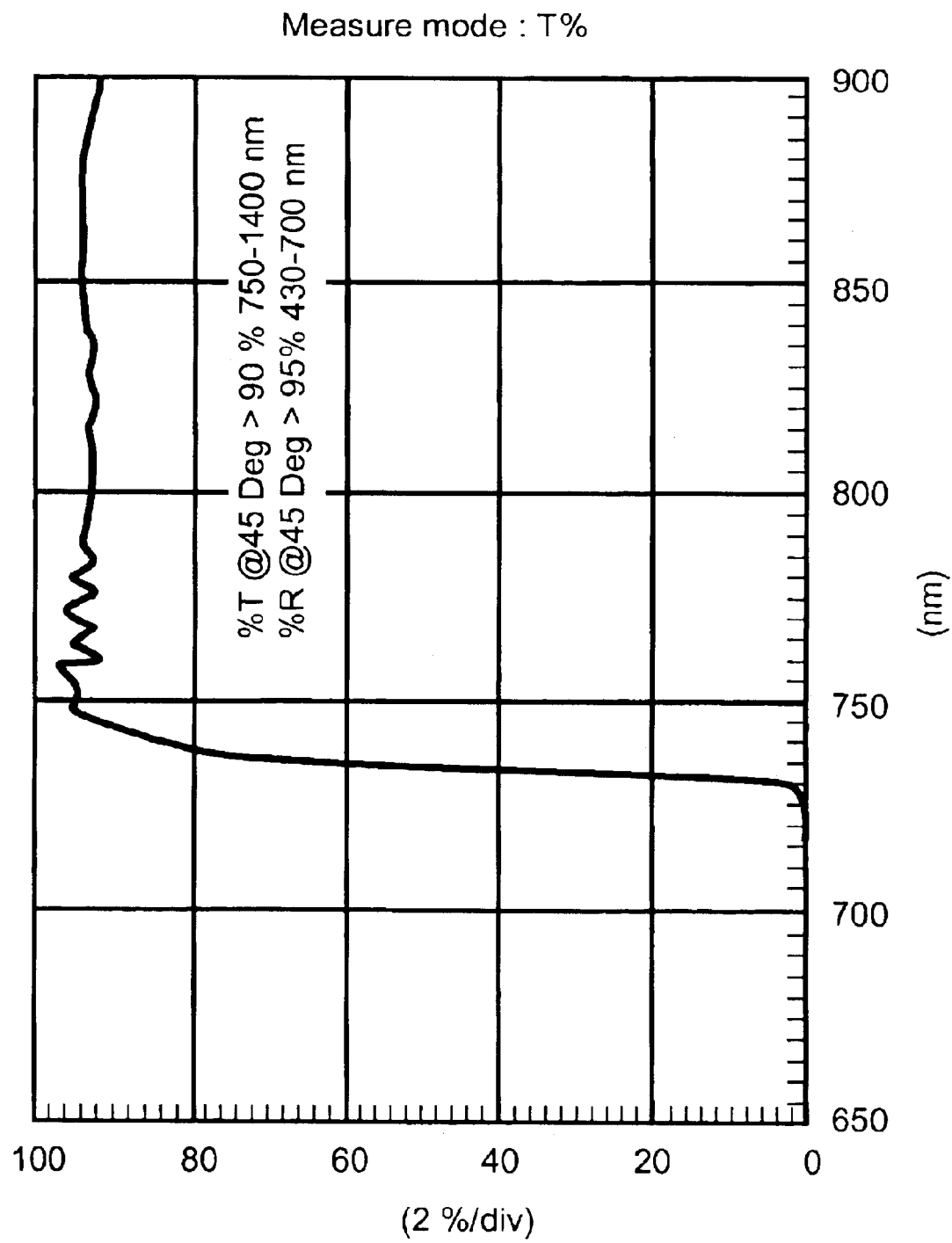
FIG. 12 is a graph of the transmissive and reflective characteristics of a mirror (33) used in an illustrative embodiment of the invention for separating an infrared component of a source beam.

The infrared wavelength region (greater than 700 nanometers) and the ultraviolet wavelength region (less than 400 nanometers) each contribute watts of radiant light energy which are detrimental to the optics of the system but does not contribute to normal human eyesight (see photopic response curves in FIG. 10). Because of this fact, the collimated source beam 50 from the light source 32 is directed to the left toward mirror 33 which is a dichroic/thin film dielectric mirror. Dichroic/thin film dielectric mirrors are able to function as wavelength filters. In general, these type of mirrors are constructed to transmit (i.e., pass through) all light having wavelengths longer (or shorter) than a reference wavelength and reflect the non-transmitted light. The reflective and transmissive characteristics of mirror 33 are shown in FIG. 12.

The light wavelengths less than 700 nanometers which strike the coating on the front surface are reflected downward (as viewed in FIG. 8) by an angle of 90° toward mirror 35. The infrared portions 141 of the source beam 50 (wavelengths greater than 700 nanometers) are transmitted through mirror 33 and strike a beam block absorber shown schematically as 161. The beam block absorber 161 can be constructed of a black piece of aluminum (preferably with fins to radiate the heat, not shown) that absorbs the infrared wavelengths from the source beam 50 and re-emits the absorbed energy as heat, which can be carried away from the system and not introduced into the vital components which it might otherwise strike. Alternately, in place of a black piece of aluminum, other suitable means for absorbing infrared wavelengths may be utilized. Additionally, suitable means of separating or filtering the infrared component of the source beam 50 other than dichroic/thin film mirror 33 may be utilized.

Figure 13:
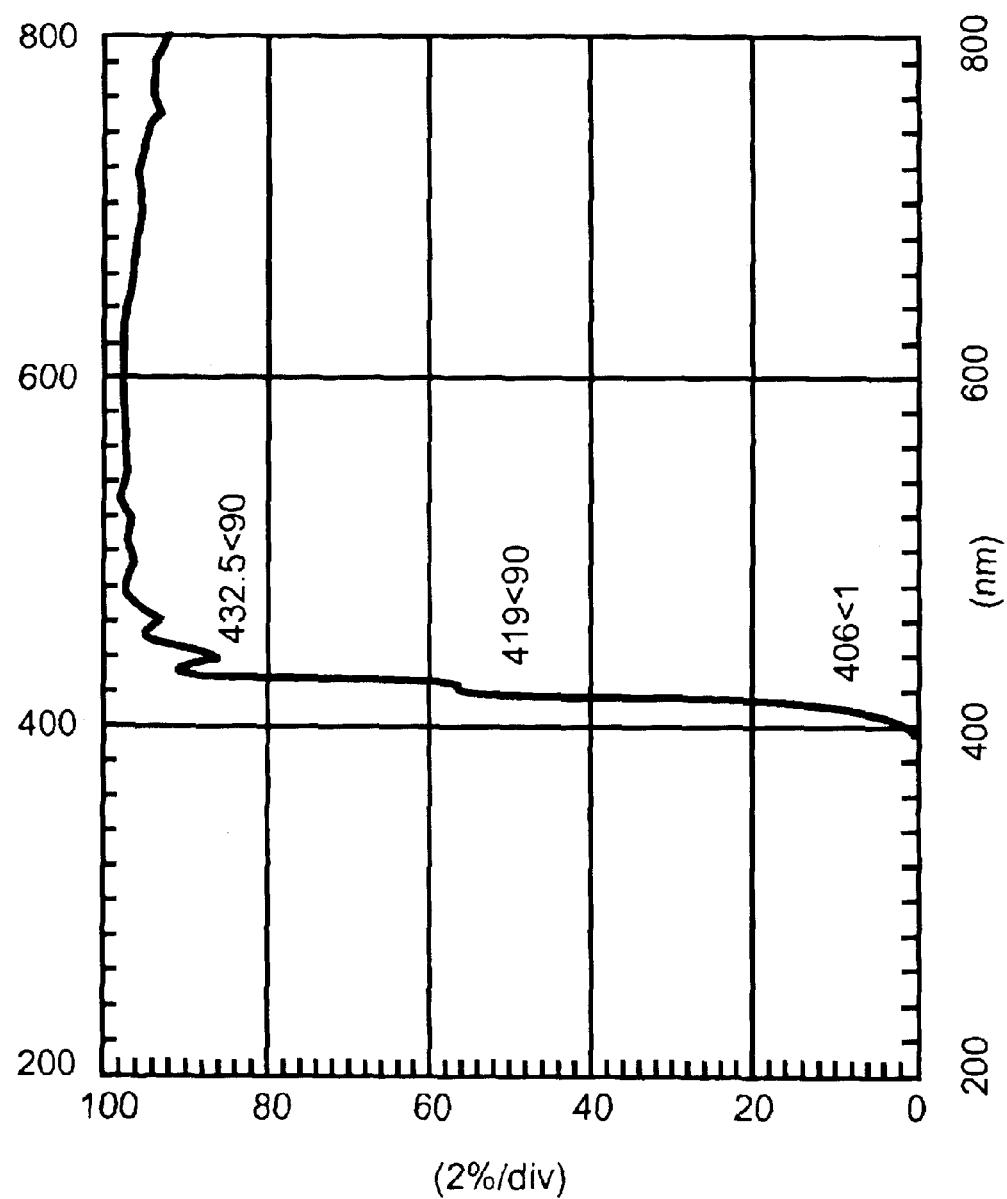
FIG. 13 is a graph of the transmissive and reflective characteristics of a mirror (35) used in an illustrative embodiment of the invention for separating an ultraviolet component of the source beam.

The remaining wavelengths of the source beam 50 resulting in a new source beam 55 are reflected from mirror 33 downward (as viewed in FIG. 8) by an angle of 90° and strike the front surface of mirror 35. As with mirror 33, mirror 35 is formed as a wavelength filter so that the visible portion (430–700 nanometers in wavelength, see FIG. 13A) of the source beam 55 resulting in a new source beam 57 is transmitted toward a polarizer cube 36 located in an optic path with mirror 35. The ultraviolet portion 37 of the source beam 55 (wavelengths less than 439 nanometers) is reflected by an angle of 90° toward the beam block absorber 161 on the left. (The characteristics of the mirrors 33 and 35 are outlined in FIGS. 12 & 13. Alternately, in place of dichroic/thin film mirror 35 and beam block absorber 161, other means for separating and absorbing the ultraviolet components of the source beam may be provided.

The source beam 57 is next directed toward a means 36 for polarizing the source beam 57 into two orthogonally polarized beams. In the illustrative embodiment in FIG. 8 of the invention, a polarizer cube 36 is utilized to separate the source beam 57 into a P-polarized beam 52 and an S-polarized beam 54. It should be further understood that when a polarizer cube is mentioned, that a polarizing plate or a piece of glass with a thin film polarizing coating deposited upon it, or a sandwich of glass, with the thin film polarizing layers deposed in between the glasses, can also be used for construction of the system.

A suitable polarizer cube 36, in an illustrative embodiment of the invention, is known in the art as a birefringent polarizer. In particular, one useful for this application is called a MacNeille Polarizer and is described in U.S. Pat. Nos. 2,403,731 and 2,449,287, with a general discussion having previously been set forth above.

Figure 11:
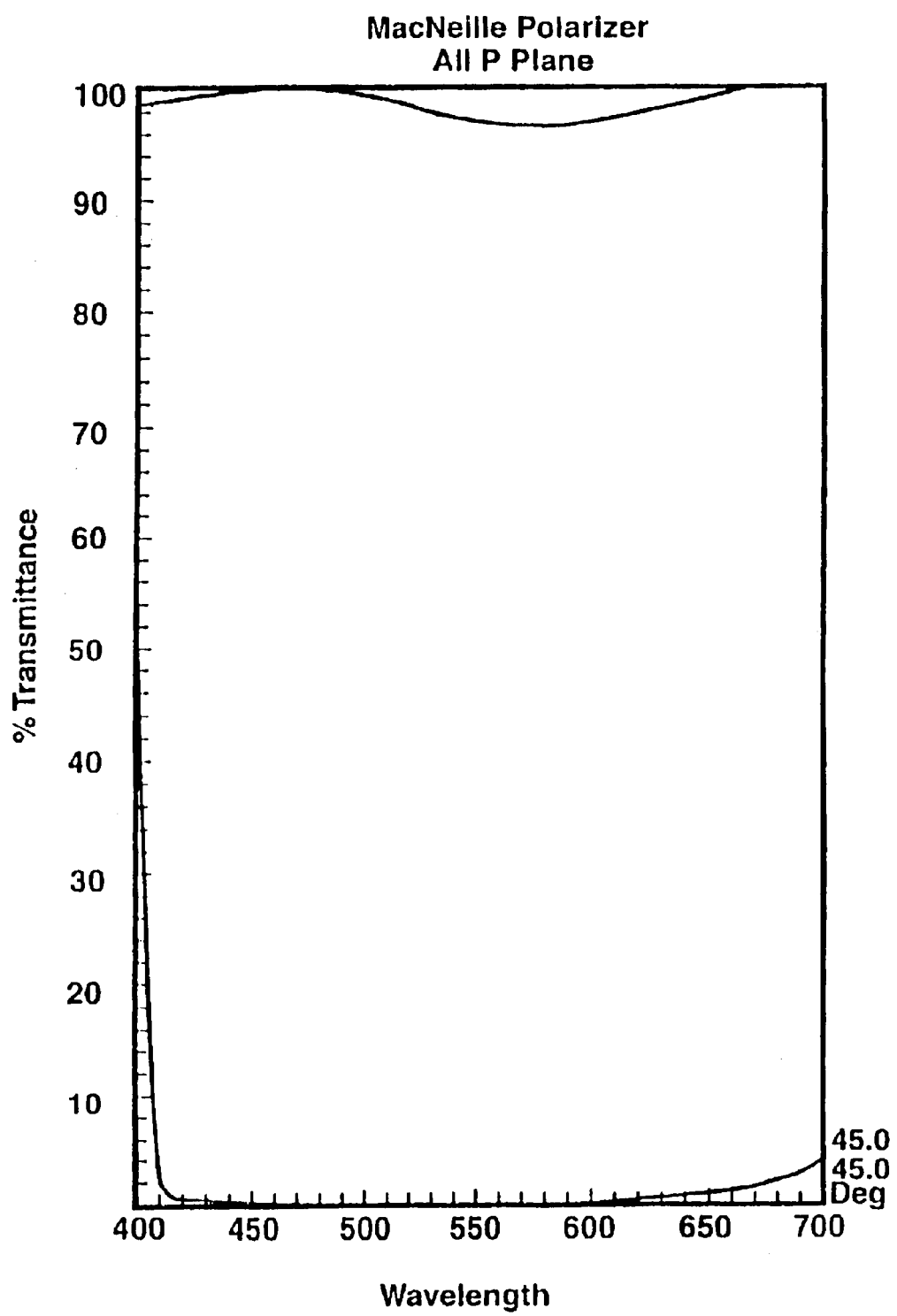
FIG. 11 is a graph showing a wavelength response of polarizing cube component used in an illustrative embodiment of the invention.

The polarizer 36, if constructed as a thin film Macneille polarizer, is sensitive to ultraviolet and infrared portions of the light spectrum because of the thin film coatings; thus, the wavelength filtering by mirrors 33 and 35 that occurs before the beam enters the polarizer cube 36 is advantageous. This is because the ultraviolet light causes degradation of the internal coatings and the infrared light causes excessive heat buildup in the polarizer 36. The polarizer coatings start to absorb energy below 425 nanometer which will destroy their effectiveness. (see FIG. 11 for wavelength response of a suitable polarizer cube 36). The polarizer 36 polarizes the source beam 57 into two orthogonally polarized beams, beam 52 and beam 54, of equal cross-sectional areas but with different polarizations. The P-polarized beam 52 is propagated straight through to strike mirror 40 where it is deflected by a 90° angle toward the left. The other polarization component of the source beam cube 36, the S portion of the source beam, i.e., beam 54, is deflected left through a 450 angle from the diagonal plane of the polarizing coating of the polarizer cube 36. This S-polarized beam 54 is converted or changed into a P-polarization direction by a suitable polarization converter such as a half-wave polarization retarder 38, or, alternately, by reflections from coated mirrors 42, 44, and 46.

A general discussion of half-wave retarder 38 requirements and specifications or reflections from mirrors 42, 44, 46 have been previously furnished above.

The half-wave retarder 38 thus produces a second P-polarized beam 56. Second P-polarized beam 56 strikes mirror 42 and it is deflected by a 90° angle downward where it is deflected toward the left by mirrors 44 and 46. Mirrors 40, 42, 44 and 46 are front surfaced broadband mirrors that will maintain the P-polarization of the beam. Moreover, the reflective surfaces of these mirrors 40, 42, 44 and 46 can be generally rectangular in shape such that the beams reflected therefrom are also generally rectangular in shape. This allows a resultant unitary polarized beam to be formed with a generally rectangular outer peripheral configuration to match the light aperture of an LCD. The resultant unitary polarized beam 30 is thus doubled in its original size and has the same rectangular area of the LCDs that it is going to strike and is of one state of polarization, that is, a P-polarization.

Alternately, in place of the polarizer cube 36, any other suitable means for producing orthogonally polarized beams (52, 54) can be utilized. Additionally, means for converting (or changing) the polarization of one of the beams 54 other than the half-wave retarder 38 can be provided, such as reflection from coated mirrors 42, 44, 46. Moreover, other means than mirrors 40, 42, 44, 46 for combining the polarized beams 52 and 56 can be utilized. Finally the mirrors 40, 42, 44 and 46 can be placed in other arrangements for producing a resultant unitary polarized beam 30 having a shape that matches the rectangular peripheral shape of an LCD or LCD light aperture.

Figure 14:
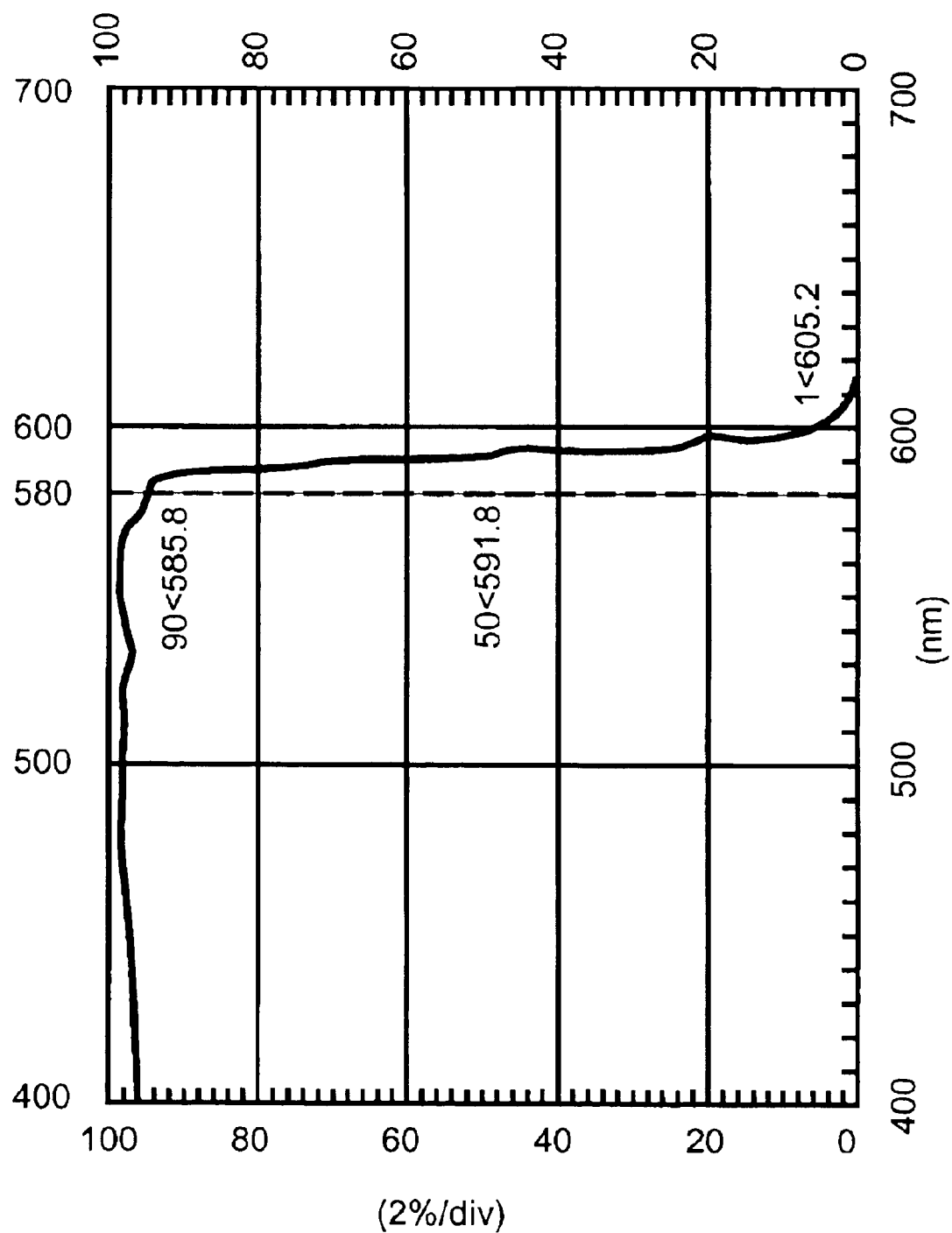
FIG. 14 is a graph of the transmissive and reflective characteristics of mirrors (80 & 82) used in an illustrative embodiment of the invention for separating and further filtering a red light component of the source beam.

The rectangular polarized light beam 30 now encounters the coating surface of mirror 80 (which functions as a filtering means) where it is split into two beams 132, 134; beam 132 is deflected upward (as viewed in FIG. 8) at an angle of 90° and beam 134 continues on through 80 to the left. Deflected beam 132, traveling upward, is a beam containing wavelengths between 600 nanometers and 700 nanometers (the red portion of the visible spectrum) or, alternately, other predetermined portions of the light spectrum, and of the P-polarization state. At this time, the beam 132 strikes mirror 82 which functions as a second filtering means. FIG. 14 illustrates the reflectance characteristics of mirrors 80 and 82. As is apparent, these mirrors are selected to reflect the red portion of the visible spectrum and to allow wavelengths of less than 600 nanometers or, alternately, other predetermined portions of the light spectrum to pass through. Mirror 82 further filters the deflected beam 132 so that it will match the CIE response needed for a good color balance (see FIGS. 10A & 10B). As an example, the mirror curve (FIG. 14) of mirror 82 can be shifted toward the right so that it will pass wavelengths below 615 nanometers or, alternately, other predetermined portions of the light spectrum and cause a deflected beam to appear deeper red to the human eye. Any "unwanted" wavelengths will pass through 82 and strike a red beam block 136 while the wanted wavelengths are deflected at an angle of 90° toward the left where they pass through a first LCD, which is termed as a red LCD 138. Beam block 136 can be fabricated in the same manner as beam block absorber 161 previously described.

Figure 2:
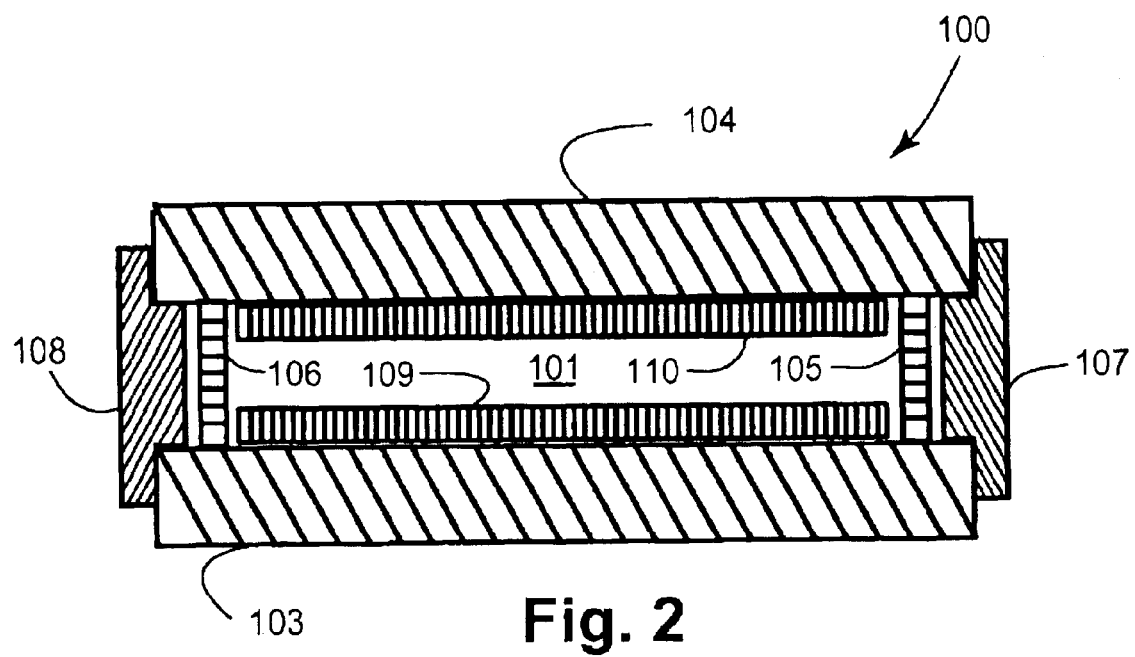
FIG. 2 is a cross-section of an LCD cell as is known in the art.
Figure 2A:
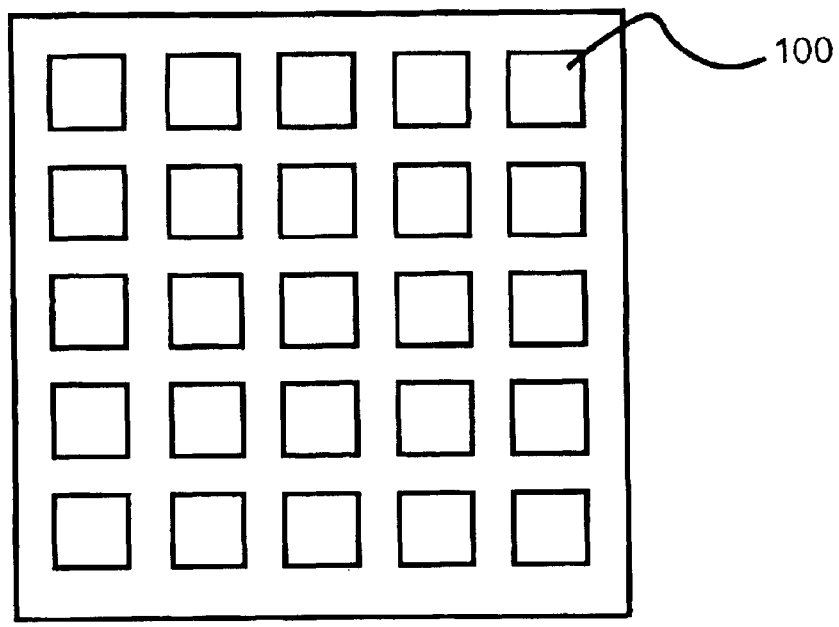
FIG. 2A is a schematic drawing of an LCD component showing the pixels used in the invention.
Figure 16:
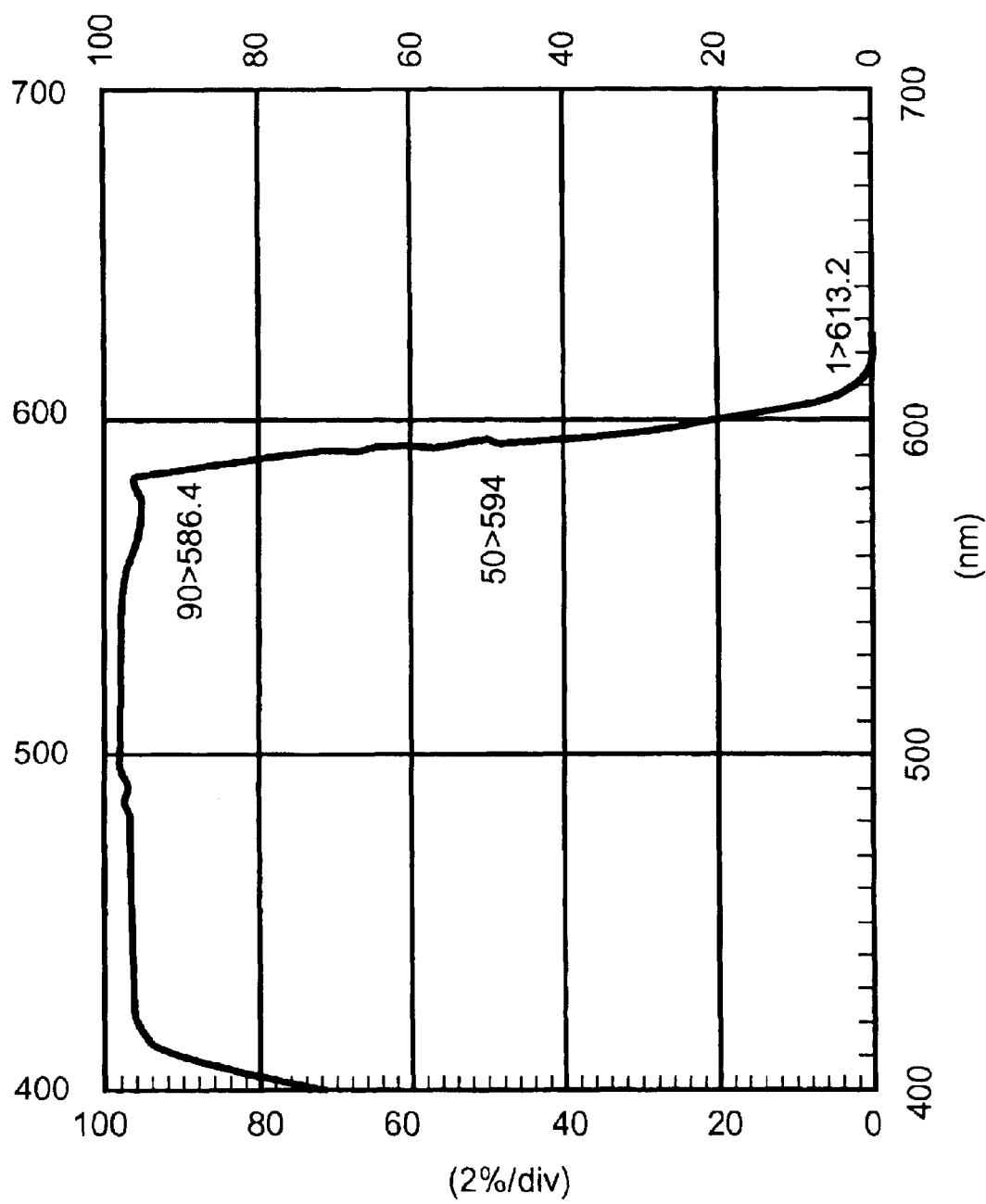
FIG. 16 is an analysis of the reflective and transmissive characteristics of mirror (92) used in an illustrative embodiment of the invention for combining an altered red beam and an altered green beam.

The red LCD 138 (as well as a green LCD 140 and a blue LCD 142 to follow) is of a type that can be caused to change its birefringence, thereby altering the orientation of the electric field vector of light passing through it, formed in a checkerboard arrangement with individual pixels 100 (see FIG. 2A). The red LCD 138 is driven by electronics in which each cell alters the respective light portion by rotating the vector of the electric field according to the image that is desired to be displayed (change by "twisting" or rotating the polarization state, see FIG. 2A, by application of a voltage). The resolution of the projected image will depend upon the number of cells in the LCD. A display of 320 horizontal pixels by 240 vertical pixels will yield a display of 76,800 pixels. A typical television set is 115,000 pixels. Thus, the deflected red beam 132, having now passed through the red LCD 138, is now an altered red beam 144 comprising a combination of polarizations for the individual pixels of a display, each pixel having a predetermined orientation of electric field vector by the driving electronics. As will hereinafter be more fully explained, the amount of the rotation in the polarization state for an individual pixel will eventually decide how much of the light for that pixel will be passed all the way through to finally strike the screen used for display. At this point, the altered red beam 144 strikes mirror 92 and is deflected upward at an angle of 90°. The purpose of mirror 92 is to combine the altered red beam 144 and altered green beam 152 (as viewed in FIG. 8). Mirror 92 thus functions as a combining means. The response curve for mirror 92 is shown in FIG. 16. It is best that mirror 92 does not change the state of polarization of the altered red beam 144 or any other beam striking it (i.e., altered green beam 152). The deflected (from mirror 92) altered red beam 144 then continues on through mirror 90 which is constructed to pass any wavelengths greater than 515 nanometers (see FIG.

Figure 1:
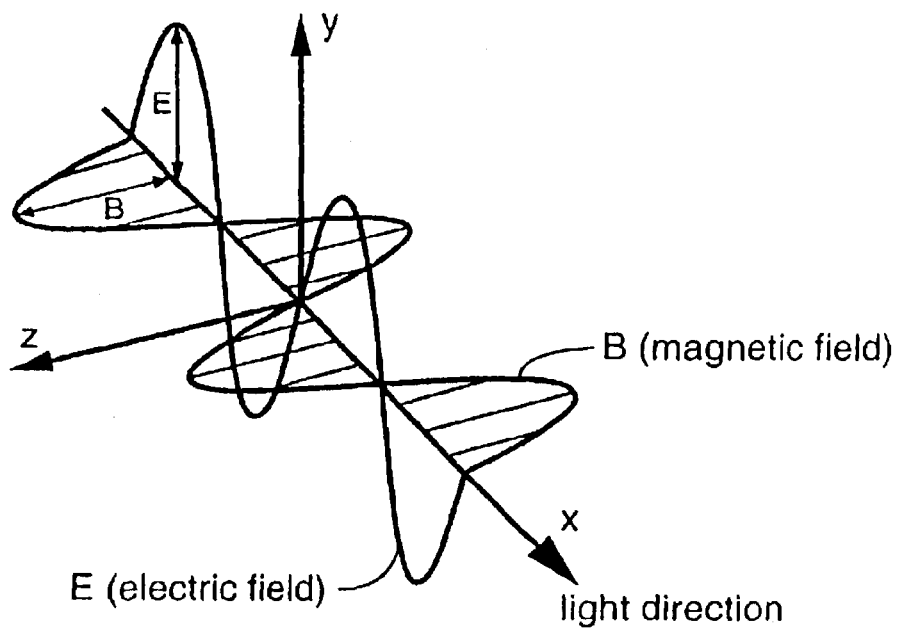
FIG. 1 is an illustrative drawing of an electromagnetic wave with the direction of propagation, electric and magnetic fields shown.
Figure 1A:
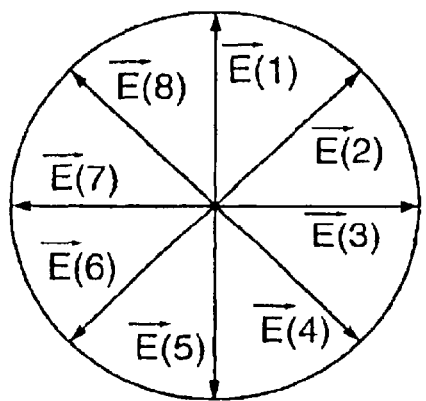
FIG. 1A is an illustrative drawing of an electromagnetic wave looking down the axis of propagation, showing various directions of possible different orientations of the electric field vector for illustrative purposes.
Figure 1B:
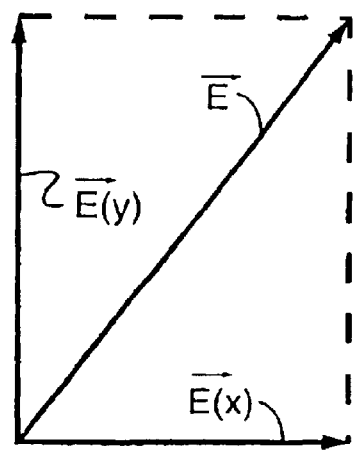
FIG. 1B is an illustrative drawing of the resolution of an electric field vector into two components, along an x and y axis.

17) or, alternatively, other predetermined portions of the light spectrum. The purpose of mirror 90 is to combine the combined altered red 144 and altered green 152 beams with an altered blue beam 160. Mirror 90 thus also functions as a combining means. It is best that mirror 90 does not change the state of polarization (orientation of the electric field vector) of any beam impingent upon it. The altered red beam 144 after passing through mirror 90 will continue on to a final polarizer called the polarizer analyzer 146. Polarizer analyzer 146 may also be a polarizer cube constructed as a MacNeille polarizer, or alternatively, as described above, on a single piece of glass or sandwiched between two pieces of glass. The vector component of the individual pixel light beams that is a P orientation of the electric field vector will pass through the polarizer analyzer 146 into a projection lens 148 and be projected as a part of beam 178 toward a screen (not shown in FIG. 8) according to the magnification of the projection lens 148. The vector component of the altered red beam 144 that is not a P vector component (S-polarization) will be deflected by the polarizer analyzer 146 toward the left and be absorbed by beam block 150. See FIG. 1B for a pictorial illustration showing how a particular vector component is resolved into two components, each having a different orientation of the electric field vector. Beam block 150 may be fabricated in the same manner as beam block absorber 161 previously described. Thus, the intensity of the red light at the viewing surface is directly proportional to the amount of rotation of the altered red beam's electric field vector.

Figure 18:
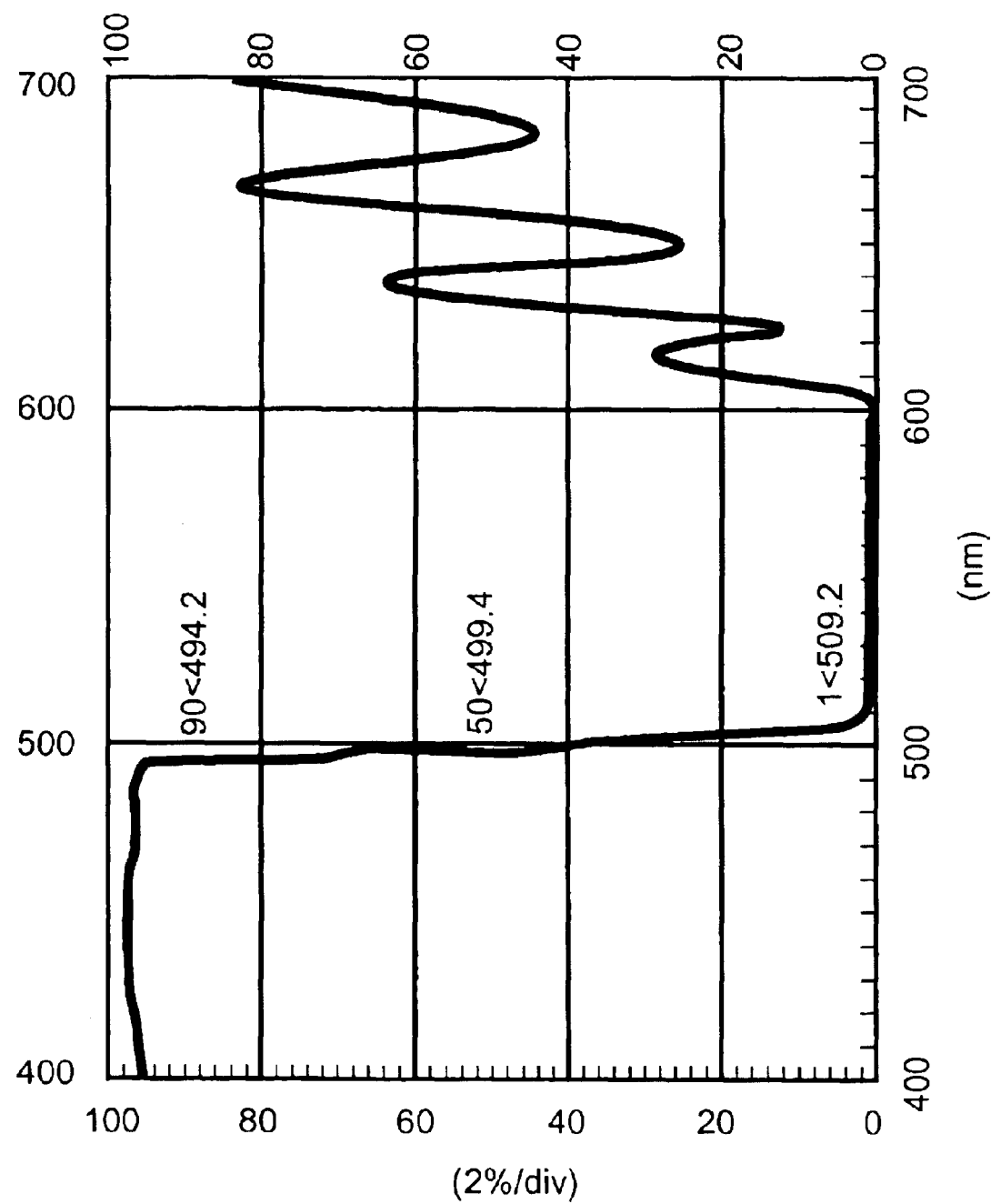
FIG. 18 is an analysis of the reflective and transmissive characteristics of a mirror (84) used in an illustrative embodiment of the invention for further filtering a blue beam.

Returning now to the single state of polarization rectangular light beam 30, it encounters the coating of mirror 80 where it is split into two beams 132, 134. A red beam 132 is deflected upward and the other beam, blue-green beam 134, passes through mirror 80 and continues on to the left. The blue-green beam 134 traveling through mirror 80 and toward the left is a beam containing wavelengths between 415 nanometers and 600 nanometers (the blue-green portion of the visible spectrum) or, alternatively, other predetermined portions of the light spectrum, and of the P-polarization state. The response curve for mirror 80 is shown in FIG. 14. Next, the blue-green beam 134 strikes the surface coating of mirror 84 and the green portion 154 of the beam (500–600 nanometers or, alternatively, other predetermined portions of the light spectrum) is deflected by a 90° angle upward toward the green LCD 140, while the blue portion 156 of the beam (425–500 nanometers or, alternatively, other predetermined portions of the light spectrum) continues on through mirror 84 and toward mirror 86 at the left. Mirror 84 functions as a filtering means, and its response curve is shown in FIG. 18.

Figure 17:
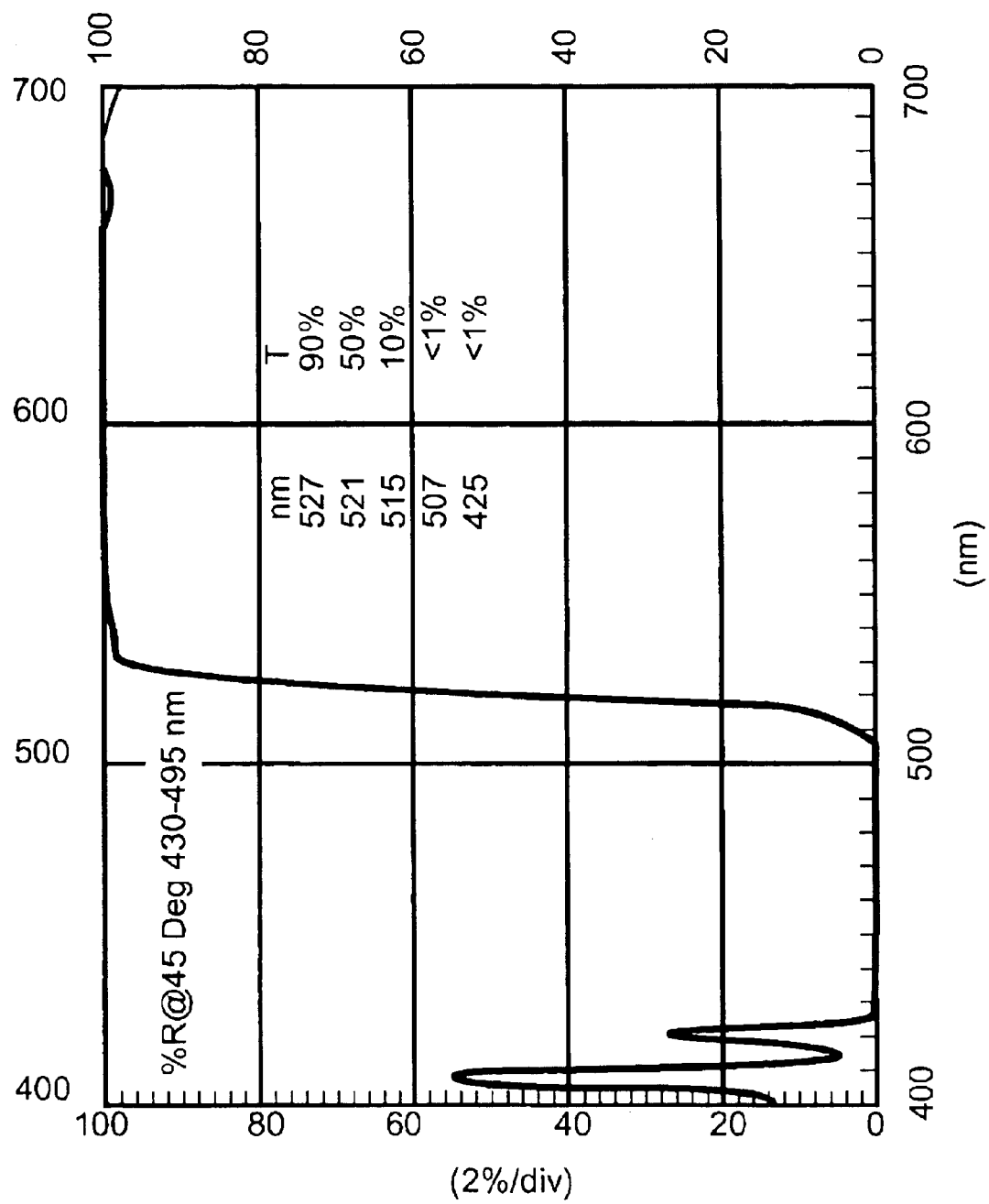
FIG. 17 is an analysis of the reflective and transmissive characteristics of mirrors (86 & 88) used in an illustrative embodiment of the invention for further filtering a blue beam.

The green beam 154 passes through the green LCD 140. Each cell alters its respective portion of the green beam by rotating the orientation of the vector of the electric field according to the image that is desired to be displayed. Thus, the altered green beam 152, having now passed through the green LCD 140, is an altered green beam 152 comprising of a combination of polarizations for the individual pixels of a display, each pixel having a predetermined orientation of electric field vector by the driving electronics. The amount of the rotation in the polarization state for an individual pixel will eventually decide how much of the light for that pixel will be passed all the way through the polarizer analyzer 146 to finally strike the screen (not shown in FIG. 8) used for display. At this point, the altered green beam 152 strikes mirror 92. As previously stated, the purpose of mirror 92 is to combine the altered green beam 152 with the altered red beam 144 (see FIG. 17). The altered green beam 152 passes through mirror 92 and propagates upwardly. Mirror 92 does not change the state of polarization of the altered green beam 152 or any other beam (altered red beam 144) striking it.

The altered green beam 152 then continues on through mirror 90 because mirror 90 will pass any wavelength greater than 501 nanometers (see FIG. 17) or, alternatively, other predetermined portions of the light spectrum. As previously stated, the purpose of mirror 90 is to combine the altered blue beam 160 (see FIG. 16 for response curve of mirror 92) with the combined, altered beams 144 and 152. It is also preferable that mirror 90 does not change the state of polarization of any beam impingent upon or passing through it. After passing through mirror 90, the altered green beam 152 now continues on through the polarizer analyzer 146. Any portion of the light of the individual pixels of altered green beam 152 that is of a P-polarized orientation will pass through the polarizer analyzer 146 into the projection lens 148 and be projected as part of beam 178 toward the screen (not shown) according to the magnification of the projection lens. The vector component of the altered green beam 152 that is not a P vector component (S component) will be deflected by the polarizer analyzer 146 toward the left and be absorbed by the beam block 150. Thus, the intensity of the green light at the viewing surface is directly proportional to the amount of rotation of the green beam's electric field vector.

Figure 15:
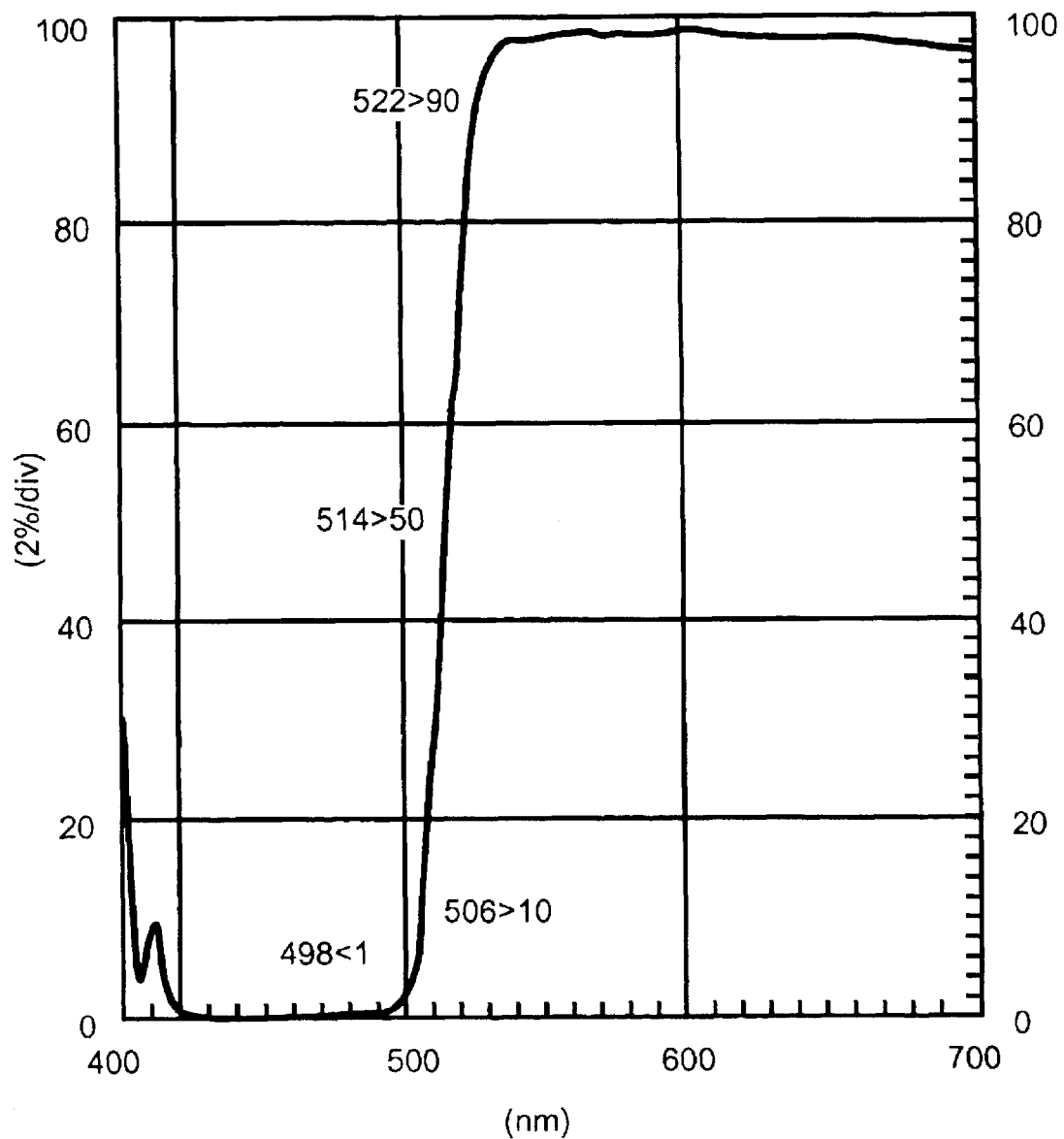
FIG. 15 is a graph of the reflective and transmissive characteristics of mirror (90) used in an illustrative embodiment of the invention for combining an altered blue beam and an altered red-green beam.

Returning now to the blue-green light beam striking the coating surface of mirror 84 where it is split into two beams 154, 156, a green beam 154 is deflected upwardly at an angle of 90° and a blue beam 156 continues through mirror 84 to the left. The blue beam 156 traveling through 84 toward the left is a beam containing wavelengths between 415 nanometers and 500 nanometers (the blue portion of the visible spectrum) or, alternatively, other predetermined portions of the light spectrum, of the P-polarization state. The blue beam 156 continues on toward the left and strikes the surface coating of mirror 86 (mirror 86 may be a front surface broadband mirror, however, it must retain the P state of polarization for the blue beam) and the blue beam (415–500 nanometers or, alternatively, other predetermined portions of the light spectrum) is deflected at an angle of 90° upward toward the mirror 88. A wave response for mirror 84 is shown in FIG. 15.

At this time, the reflected blue beam 156 from mirror 86 strikes mirror 88 for further filtering. Further filtering can be done by mirror 88 on the blue beam 156 so that it will match the CIE response needed for a good color balance (see FIGS. 10A, 10B). For instance, mirror 88 can be constructed with a mirror curve as shown in FIG. 18 which is shifted toward the left so that it will transmit wavelengths above 495 nanometers or, alternatively, other predetermined portions of the light spectrum, and cause the beam to appear deeper blue to the human eye. Any "unwanted" wavelengths will pass through mirror 88 and strike a blue beam block 158 while the wanted wavelengths are deflected at an angle of 90° toward the right where they pass through the blue LCD 142. Blue beam block 158 may be constructed in the same manner as beam block absorber 161 previously described. As before, it is important that mirror 88 does not change the state of polarization of the blue beam 156. The blue portion of the blue beam 156 passes through the blue LCD 142. Each cell alters the respective light portion by rotating the vector of the electric field according to the image that is desired to be displayed. Thus, an altered blue beam 160, having now passed through the blue LCD 142, is now an altered blue beam comprising a combination of polarizations for the individual pixels of a display, each pixel having a predetermined orientation of electric field vector by the driving electronics. The amount of the rotation in the polarization state for an individual pixel will eventually decide how much of the light for that pixel passes all the way through to finally strike the screen (not shown in FIG. 8) used for display. At this point, the altered blue beam 160 strikes mirror 90 and is reflected upward at an angle of 90° (as viewed in FIG. 8) for combining with altered red beam 144 and altered green beam 152. Mirror 90 will allow any wavelengths less than 500 nanometers, to be reflected (see FIG. 17) or, alternately, other predetermined portions of the light spectrum. It is important that mirror 90 does not change the state of polarization of the altered blue beam 160, or any other beam striking it. The altered blue beam 160 now continues on to the polarizer analyzer 146. The vector component of the individual pixel light beams that is of a P-polarized component will pass through the polarizer analyzer 146 into the projection lens 148 and be projected as a part of beam 178 toward the screen according to the magnification of the projection lens. The vector component of the altered blue beam 160 that is not a P vector component (S vector component) will be deflected by the polarizer analyzer 146 toward the left and be absorbed by the beam block 150. Beam block 150 can be fabricated in the same manner as beam block absorber 161 previously described. Thus, the intensity of the blue light at the viewing surface is directly proportional to the amount of rotation of the blue beam's electric field vector.

At this point, all of the colors of the display (red, green and blue) have passed through the system and the projection lens 148 to be projected 178 onto the screen (not shown in FIG. 8). They are combined on top of each other to produce a pixelized image that has the correct color balance.

The projection lens 148 is either a single lens or a combination of lenses that produces a good focused image on the screen. It has a back focal point of the distance equal to the distance from the rear of the lens to each one of the LCDs 138, 140, 142 in the system. This distance is made the same for all of the three LCDs.

Thus, to focus and align the system, it is necessary to first project one of the individual colors without the others. When this is done and the image is focused, then the second color is projected along with the first color and the second color LCD is moved spatially to produce a sharp image or pixel on top of the first color pixel. The entire image of the second color is then aligned to the image of the first color to make a perfect match with regard to size, focus and alignment.

Next, the second color is then turned off or blocked and then the third color is projected along with the first color and the third color LCD is moved spatially to produce a sharp image or pixel on top of the first color pixel. The entire image of the third color is then aligned to the image of the first color to make a perfect match with regard to size, focus and alignment.

The image is then projected as beam 178 with all colors turned on and a final adjustment can then be made at this time.

Figure 10A:
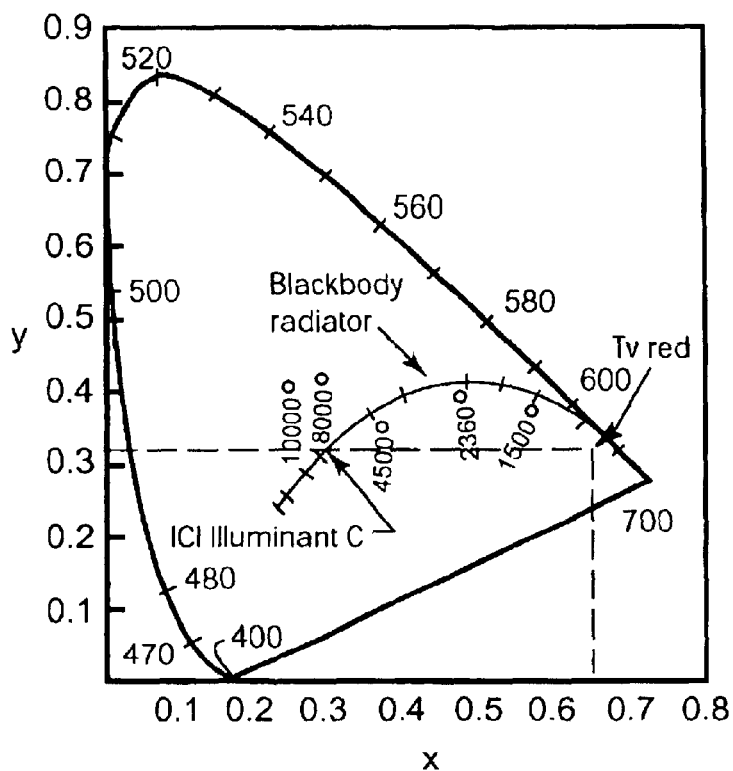
FIG. 10A is an illustration showing the CIE color diagram.
Figure 10B:
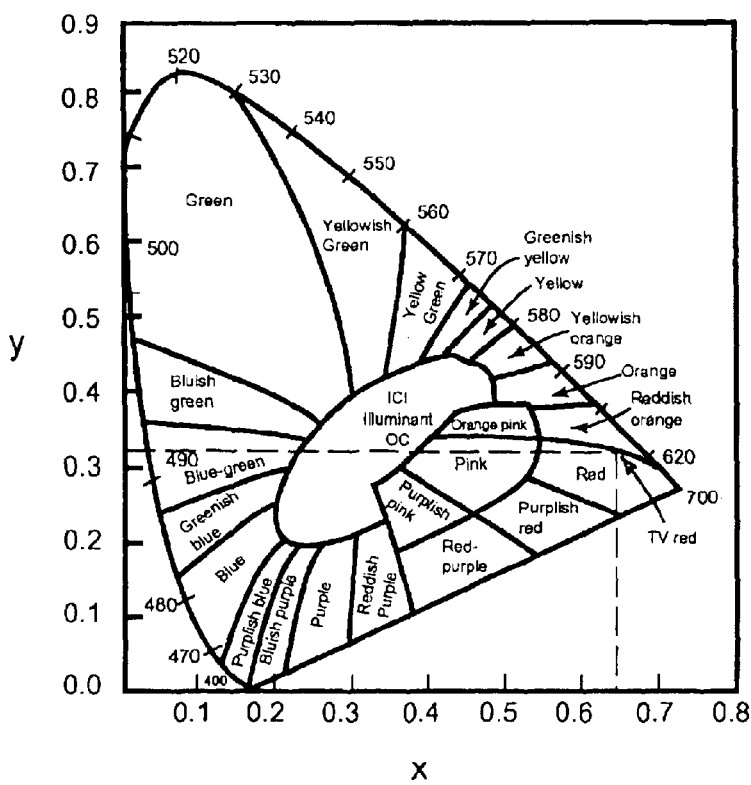
FIG. 10B is the same as FIG. 10A but shows the different colors given to the various regions.

The selection of the wavelengths applicable to mirrors 82 and 88 can be judicially applied so that the color balances of different lamps can be adjusted for color balance of the final output without the redesign of the entire optical system (see FIGS. 10A & 10B).

When the image was projected, it was noted unexpectedly that the brightness of the image was increased as the distance from the projector lens to the screen increased up to a distance of approximately 10 feet (about 305 cm.). Within this range of approximately 10 feet (about 305 cm.), the picture became brighter as it enlarged rather than dimmer as had occurred in the past. When this phenomena was discovered, it was noted that the length of the optical path between the projector lens 148 and each of the LCDs 138, 140 and 142 was approximately 13.5 in (about 34 cm). The component parts shown in FIG. 8 were arranged in plan view as shown in FIG. 8 and were encompassed with a rectangle approximately 24 inches by 36 inches (about 61 cm. by 92 cm.)

While this phenomenon is not fully understood, it is believed that this unique effect was due to the polarized nature of the light and destructive interference of the projected light waves. It is thought at this time that, when the picture is smaller, more wave nodes interfere in a smaller area, thus the light reaching the screen is reduced. As the picture is enlarged, the wave nodes are spaced further apart and less interference occurs. At a certain size, no interference takes place, and, thus, as the distance increases, the picture brightness (as measured in lumens/sq. ft. or lumens/sq. meter) then diminishes with greater enlargement.

It is thought at this time that the reason this phenomena occurs in this projector and not in previous projectors is the unitary polarization of the projected beam 178. This projector uses the same polarization for the entire beam path with the same polarizers, with the previous projectors using individual polarizers for each of the LCDs, of which different alignment of the electric field vectors occur.

An analysis of the efficiency of the system constructed in accordance with the invention versus a prior art system that utilizes an absorbing type of polarizer for illuminating an LCD display is as follows:

With reference to FIG. 8.

EXAMPLE ONE

Prior Art Absorbing Type of Polarizer (Kodak or Sharp Projector)

lumens of light emitted by the light source=L area of circle of light=$A_{cir}=\pi \cdot r^2$ area of aperture of LCD=$A_{LCD}$=length·width=6d·8d= $0.48d^2=0.48 \cdot (2r)^2=0.48 \cdot (4r^2)=1.92r^2$ (for a 3:4:5 LCD)

% of light impingent upon LCD due to aperture of LCD=$A_{LCD}/A_{CIR}=1.92r^2/\pi r^2=61.1\%$ % of light passed by absorption polarizer=total light %−absorbed %=100%−70%=30% amount of light impingent upon LCD=light output of lamp·% of light impingent upon LCD due to aperture of LCD·% of light passed by polarizer=L·0.611·0.30

For a lamp that emits 1000 lumens and for a one inch diagonal LCD, the light coming through an LCD is=1000·0.61·0.0.30=183 lumens.

This analysis, of course, does not deal with the other inefficiencies of the system, such as the second plastic polarizer efficiencies, the collection efficiency of the lamp, or the transmittance efficiency of the LCDs in the system.

EXAMPLE TWO

System of the Invention (FIG. 8)

lumens of light emitted by the light source=L area of circle of light=$A_{CIR}=\pi r^2$ area of aperture of LCD=$A_{LCD}$=length·width=6d·8d= $0.48d^2=0.48 \cdot (2r)^2=0.48 \cdot (4r^2)=1.92r^2$ (for a 3:4:5 LCD)

% of light impingent upon LCD due to aperture of LCD=$A_{LCD}/A_{CIR}=1.92r^2/\pi r^2=61.1\%$ of light passed to LCD=% of light impingent upon LCD to aperture of LCD= $A_{LCD}/A_{CIR}=1.92r^2/\pi r^2=61.1\%$·efficiency of polarization= (0.611·0.97)·100=59%. Therefore, for a lamp that emits 1000 lumens and a one inch diagonal LCD, the light coming through an LCD is 1000·0.59 or 590 lumens.

This gives an improvement over the prior art system by a factor greater than 3.2.

Figure 8A:
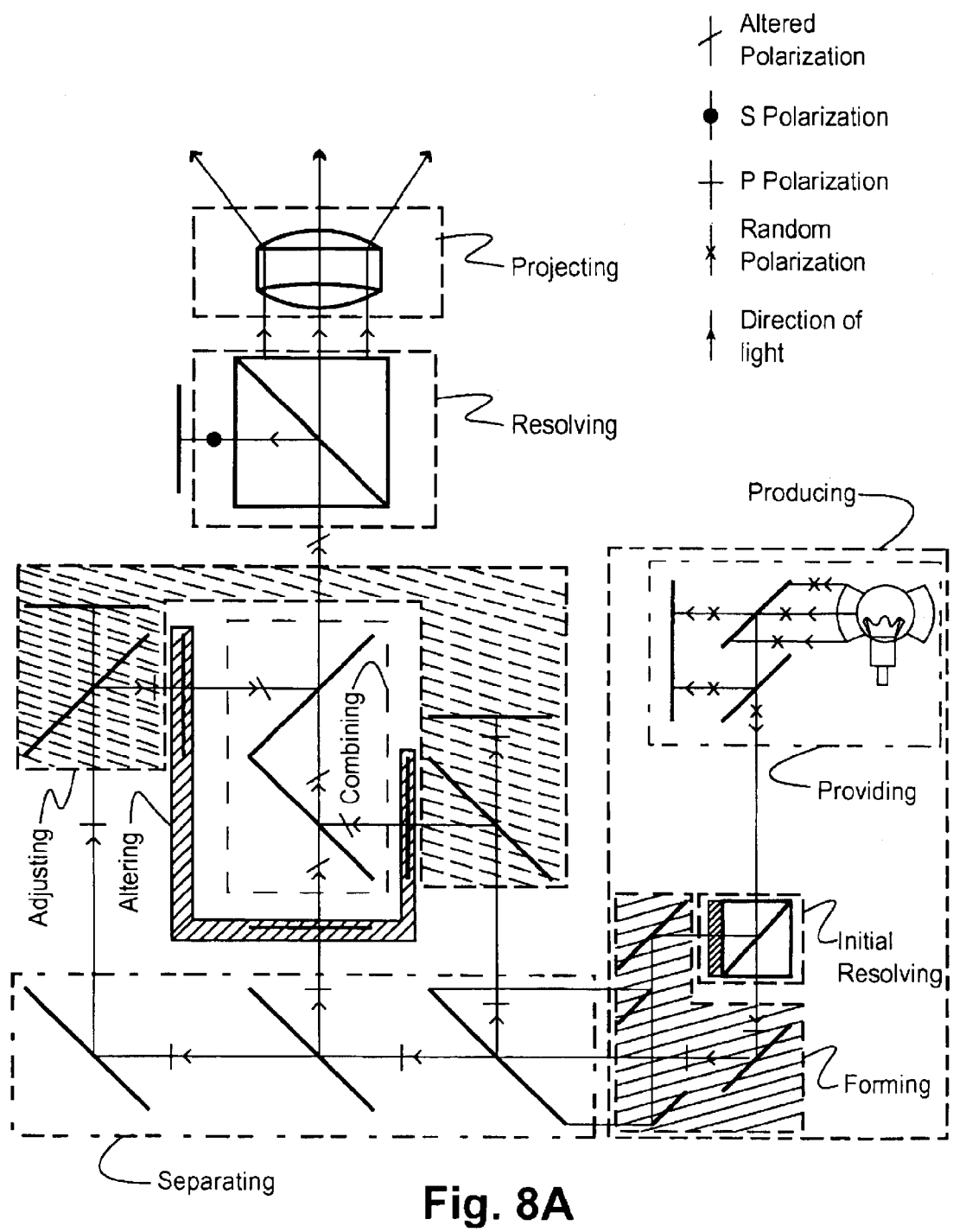
FIG. 8A is a functional illustration of FIG. 8 showing in diagrammatic form the steps involved in the method of producing a modulated beam of electromagnetic energy for use in a color LCLV projector.

Referring to FIG. 8A, a functional description of FIG. 8 is shown with the same parts, but with the part numbers removed for clarity. The parts are grouped according to functionality, however other parts can be substituted, removed, or added according to what is needed to be achieved. FIG. 8A shows the steps involved to achieve a method of this invention.

In FIGS. 8 & 8A the light source 32, the reflector 41, the collimating lens 43, mirror 33, mirror 35 and beam stop 161 work in accordance together, as detailed in the description of FIG. 8 above, for producing a beam of light 57 for the projector described.

The initial resolving of the light beam 57 is accomplished when it is sent through the polarizing means 36, as detailed in the description of FIG. 8 above, and initially resolved into two orthogonally polarized light beams 52, 54. The initial resolving may also include a retarding of the beam by passing it through a half-wave retarder to produce a light beam 56 which is of the same polarization as that of light beam 52.

The forming of the light beam 30 occurs when the two light beams are respectively reflected from forming means 40, 42, 44, and 46, as detailed in the description for FIGS. 3, 3A, 3B & 3C above, into a single beam of light 30 as depicted in FIG. 5. Arrangements of the forming means 40, 44, 46 other than those shown in FIGS. 3, 3A & 3C are also possible. The arrangement of forming means in FIGS. 3A & 3B are the same. Moreover, the forming means 40, 44, 46 may be shaped and arranged to produce a rectangular or square shaped beam, or any other desired geometrical shape.

The separating of the beam, as described above for FIG. 8, is achieved by passing this beam through the separating means 80, 84, 86. The formed polarized light beam 30 encounters the separating means 80 where it is separated into two beams 132, 134. Deflected beam 132 travels upwardly. The beam 134 strikes separating means 84 where it is separated into two beams 154, 156. Deflected beam 154 travels upwardly. The beam 156 strikes separating means 86 where deflected beam 154 travels toward the top.

Altering of the separate beams is achieved by passing the beam through the LCDs 138, 140, 142 or other suitable altering means, as described above for FIG. 8. Each beam passes through its respective LCD. Each cell alters its respective portion of a beam by rotating the orientation of the vector of the electric field according to the image that is desired to be displayed. Thus, an altered beam, having now passed through the LCD, is an altered beam comprising a combination of polarizations for the individual pixels of a display, each pixel having a predetermined orientation of electric field vector by the driving electronics. The amount of the rotation in the polarization state for an individual pixel will eventually decide how much of the light for that pixel will be passed all the way through the polarizing means 146 to finally strike the screen (not shown in FIG. 8A) used for display.

The adjusting of the beams 132, 156 is accomplished by passing the beam through the adjusting means or mirrors 82, 88 and the beam stops 136, 158. Any "unwanted" wavelengths will pass through mirrors or adjusting means 82, 88 and strike beam block 136, 158 while the wanted wavelengths are deflected at an angle of 90° toward the respective LCD. Beam blocks 136, 158 can be fabricated in the same manner as beam block absorber 161 previously described above, as detailed in the description of FIG. 8 above.

The combining of the beams 144, 152, & 160 is accomplished by passing the beams through the combining means or mirrors 90, 92. However, these combining means can also be used for adjusting if so desired by their beam pass/reflection criteria. The altered beam 134 travels through combining means or mirror 92, while altered beam 144 is deflected from combining means 92, which serves to combine the two beams 144, 152 into a single beam. It is preferable that combining means 92 does not change the state of polarization of any beam impingent upon or passing through it. This combined beam travels through reflecting means 90. It is preferable that combining means 90 does not change the state of polarization of any beam impingent upon or passing through it. The purpose of combining means or mirror 90 is to combine the combined altered 144 and altered 152 beams with an altered beam 160 into a single combined altered beam, as detailed in the description of FIG. 8 above.

After the beams have been combined into a single beam they are directed toward the resolving means where they are separated into two beams by passing the beam through the polarizing beam splitter means 146, with the desired separated beam being passed to the projecting means 148, as detailed in the description of FIG. 8 above.

The projecting means 148 can be either a single lens or a combination of lenses that produces a good focused image on the screen. It has a back focal point of the distance equal to the distance from the rear of the lens to each one of the altering means 138, 140, 142 in the system. This distance is made the same for all of the three altering means.

While the description above has been particularly shown and described with reference to preferred embodiments thereof, it will be understood by those skilled in the art that various changes in form and details can be made without departing from the spirit and scope of this invention.

Figure 8B:
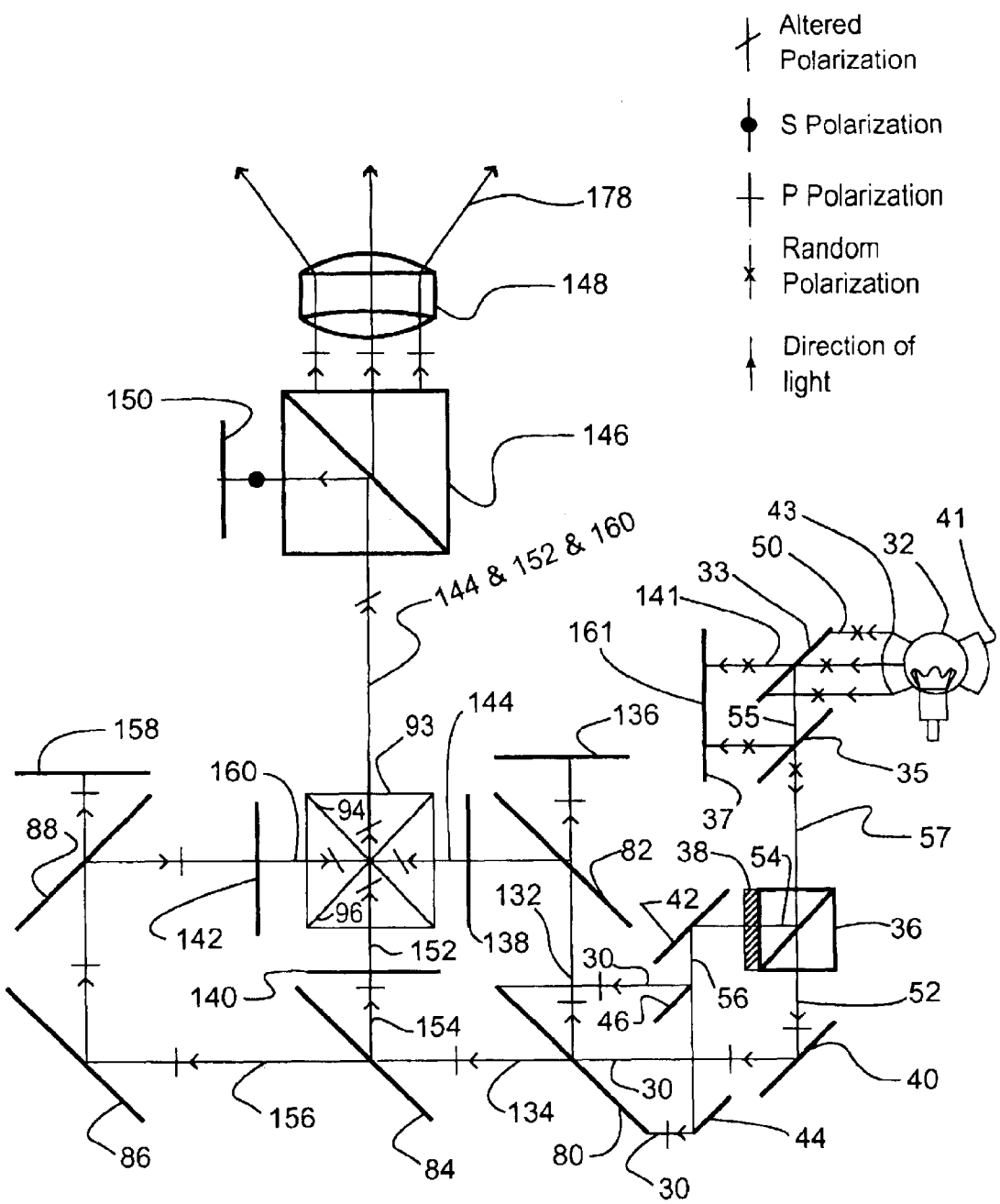
FIG. 8B is a schematic illustration of a preferred embodiment of a system for a LCLV projector in accordance with the invention using unequal light pathways from the light source to the LCDs and a dichroic beam combiner.

Referring to FIG. 8B, another alternative embodiment of the color LCLV projector as taught in FIG. 8 is shown. FIG. 8B is an improvement over U.S. Pat. No. 4,909,601 to Yajima et al., assigned to Seiko Epson Corp., utilizing the new and novel method and system of a single polarized light beam as disclosed herein. The alternate embodiment in FIG. 8B utilizes a different layout of the optical path of the invention. As previously stated in connection with FIG. 8, a polarized white light beam 30 is formed for use in the optical system. At this point, the white light beam 30 strikes mirror 80 and is divided into two beams, a red beam 132, and a blue-green beam 134. Continuing on with beam 132, it strikes mirror 82 and is deflected toward the left (as viewed in FIG. 8B) and passes through LCD 138. At this time, the orientation of the vector of the electric field is rotated responsive to a control signal input means (see FIG. 19) forming beam 144. Beam 144 is then deflected from the dichroic beam combiner 93 and, in particular, the dichroic surface 94 and is reflected upward (as viewed in FIG. 8B) through the polarizer analyzer 146. At this point, the red beam 144 is segregated according to the P and S vector components, with the P vector passing on through the analyzer 146 and the S vector component deflecting to the left to strike beam stop 150. Returning to beam 134, the blue-green beam 134 strikes dichroic mirror 84 and is separated into a green beam 154 and a blue beam 156. Green beam 154 is deflected upward (as viewed in FIG. 8B) through the green LCD 140 where it is altered with respect to the orientation of the electric field vector responsive to a signal input means (see FIG. 14). The altered green beam 152 enters the dichroic beam combiner 93 and passes through surfaces 94 and 96. The beam continues on through into polarizer analyzer 146. The P vector component passes on through to projection lens 148 with the S vector component of the beam being diverted to the left and striking beam stop 150. Returning now to blue beam 156, it is deflected from mirror 86 upward (as viewed in FIG. 5B) where it strikes dichroic mirror 88 and is deflected to the right and passes through LCD 142. At this point, it has the orientation of the electric field vector altered by response to a control signal input means (see FIG. 19) and forms blue beam 160. Blue Beam 160 then enters the dichroic beam combiner 93 and is deflected upwardly (as viewed in FIG. 8B) via surface 96 to enter the polarizer analyzer 146. At this point, the blue beam 160 is segregated according to the P and S vector components that have been formed with the P vector component of beam 160 passing through the analyzer 146 to projection lens 148 and the S vector component of beam 160 being deflected to the left (as viewed in FIG. 8B) to strike beam stop 150.

Figure 8C:
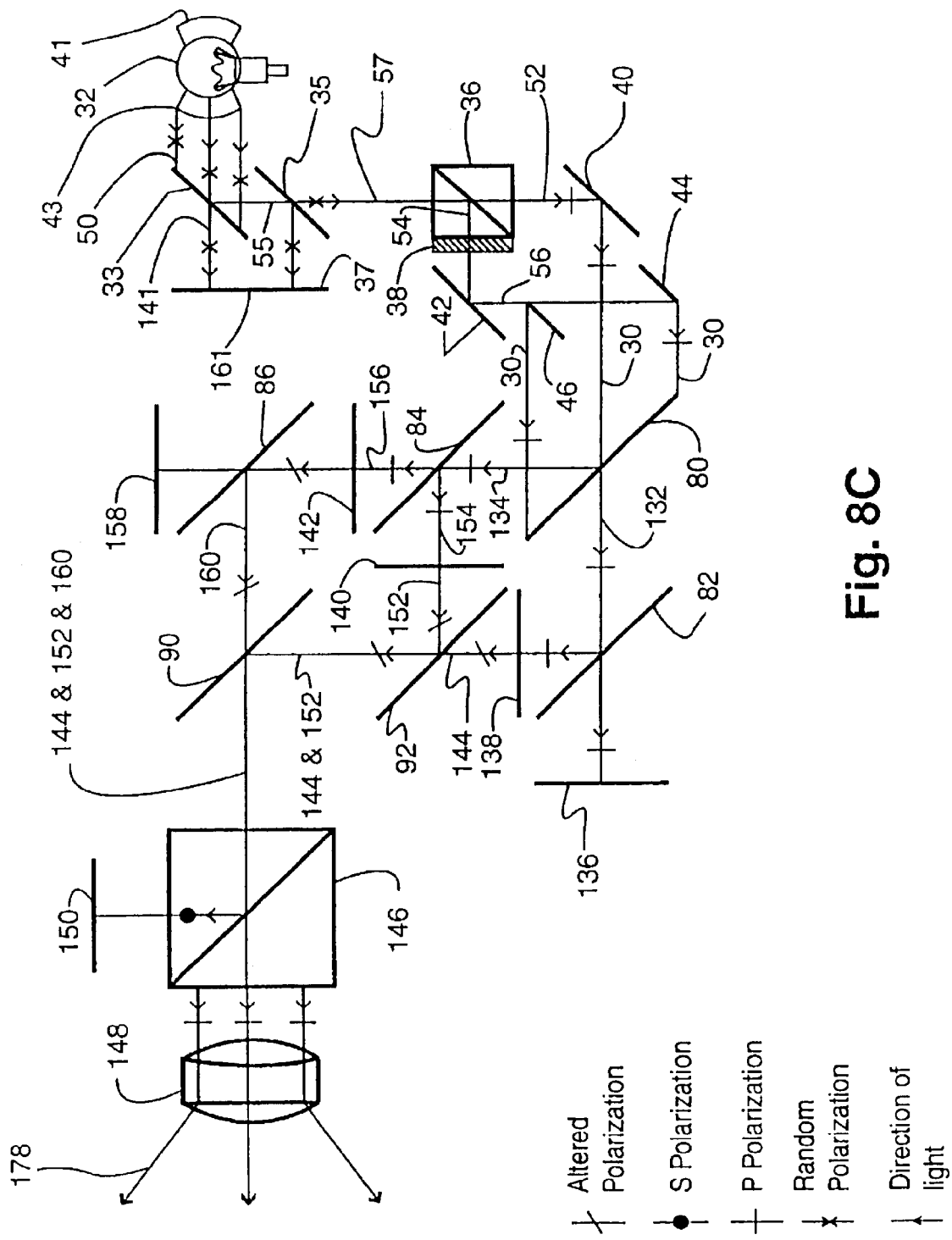
FIG. 8C is a schematic illustration of a preferred embodiment of a system for an LCLV projector in accordance with the invention using equal light pathways from the light to the LCDs and equal light pathways from the LCDs to the projection lens.

Referring now to FIG. 8C, an alternative embodiment of FIG. 8 of the color LCLV projector is shown. FIG. 8C is an improvement over U.S. Pat. No. 4,864,390 to McKechnie et al., assigned to North American Philips Corp., utilizing the new and novel method and system of a single polarized light beam as disclosed herein. The alternative embodiment shown in FIG. 8C is functionally the same as that in FIG. 8 with the addition that the optical path lengths from the LCDs to the light source are exactly the same and the optical paths of the LCDs to the beam combiner and output lens are the same. Operation and function of this system is the same as that of FIG. 8. It should be further understood that this FIG. 8C can have the optical layout of the LCD path duplicated and used as the second modulation subsystem to create a beam to input into polarizer combiner 146 to form a 3-D projector the same as that disclosed in FIGS. 20, 20A & 20B.

Referring now to FIG. 8D, an alternative embodiment of the color LCLV projector as taught by FIG. 8 is shown. FIG. 8D is an improvement over U.S. Pat. No. 4,850,685 to Kamakura et al., assigned to Seiko Epson Corp., and U.S. Pat. No. 4,943,154 to Kiyatake et al., assigned to Matsushita Electric Industrial Co. utilizing the new and novel method and system of a single polarized light beam as disclosed herein. The alternative embodiment of FIG. 8D operates and functions exactly the same as that of FIG. 8 with the exception that the separate dichroic beam splitters and combiners 80, 82 & 84 have been replaced with combined beam splitters and combiners 93. In light of the herein disclosed embodiments, it will now be understood that the splitting and combining system with respect to the others can be duplicated to create another beam that would be input into polarizer analyzer 146 to create a 3-D projector that functions and operates as those shown in FIGS. 20 through 20B inclusive.

In reference to FIG. 8D, as further explanation, the white light source beam 30 strikes the first dichroic color separator 93 and is separated into red beam 132, green beam 154 and blue beam 156. Green beam 154 is passed through green LCD 140 and has its individual portions altered with respect to the orientation of the electric field vector responsive to a control means input forming altered green beam 152. This altered green beam 152 then passes through the beam combiner 93 without having its orientation of electric field vector changed and is segregated at polarizer analyzer 146 according to the P component and S component with the P vector component passing through to the projection lens 148, and S component being rejected upward to beam block 150 where it is absorbed. Returning now to red beam 132, it is deflected from mirror 83 to the left (as viewed in FIG. 8D) to mirror 82 and then from mirror 82 where it is deflected downward (as viewed in FIG. 8D) through LCD 138. Passing through LCD 138, the beam 132 has its individual portions altered with respect to the orientation of the electric field vector and forms altered red beam 144. Altered red beam 144 is then deflected from surface 94 to the left (as viewed in FIG. 8D) to polarizer analyzer 146. At this point, altered red beam 144 is segregated according to the P and S components with the P component passing on to projection lens 148 and the S component being deflected upward (as viewed in FIG. 8D) to beam block 150. Returning now to beam 132 being deflected from surface 82, it can be further filtered at this point with the desired wavelengths passing to the left (as viewed in FIG. 8D) to be absorbed by beam block 136. Returning now to blue beam 156 coming out of the first dichroic beam splitter 93, it is deflected downward (as viewed in FIG. 8D) from surface 96 and is deflected to the left (as viewed in FIG. 8D) from surface 86. Blue beam 156 is then deflected from mirror 88 upward (as viewed in FIG. 8D) through the blue LCD 142. LCD 142 then functions to alter the individual portions of blue beam 142 by changing the orientation of the electric field vector responsive to a control signal input means (see FIG. 19) and forms altered blue beam 160. Blue beam 160 is then reflected to the left (as viewed in FIG. 8D) from surface 96 and is passed through polarizer analyzer 146. At this point, blue beam 160 is resolved into the P and S components with the P component passing through to the lens 148 and the S component being deflected upward (as viewed in FIG. 8D) to be absorbed by beam block 150.

Returning now to blue beam 156, when it strikes mirror 88, the desired filtering can take place with the unwanted wavelengths of blue beam 156 passing to the left (as viewed in FIG. 8D) to be absorbed by beam block 158 with the desired wavelengths being deflected upwardly.

Figure 8E:
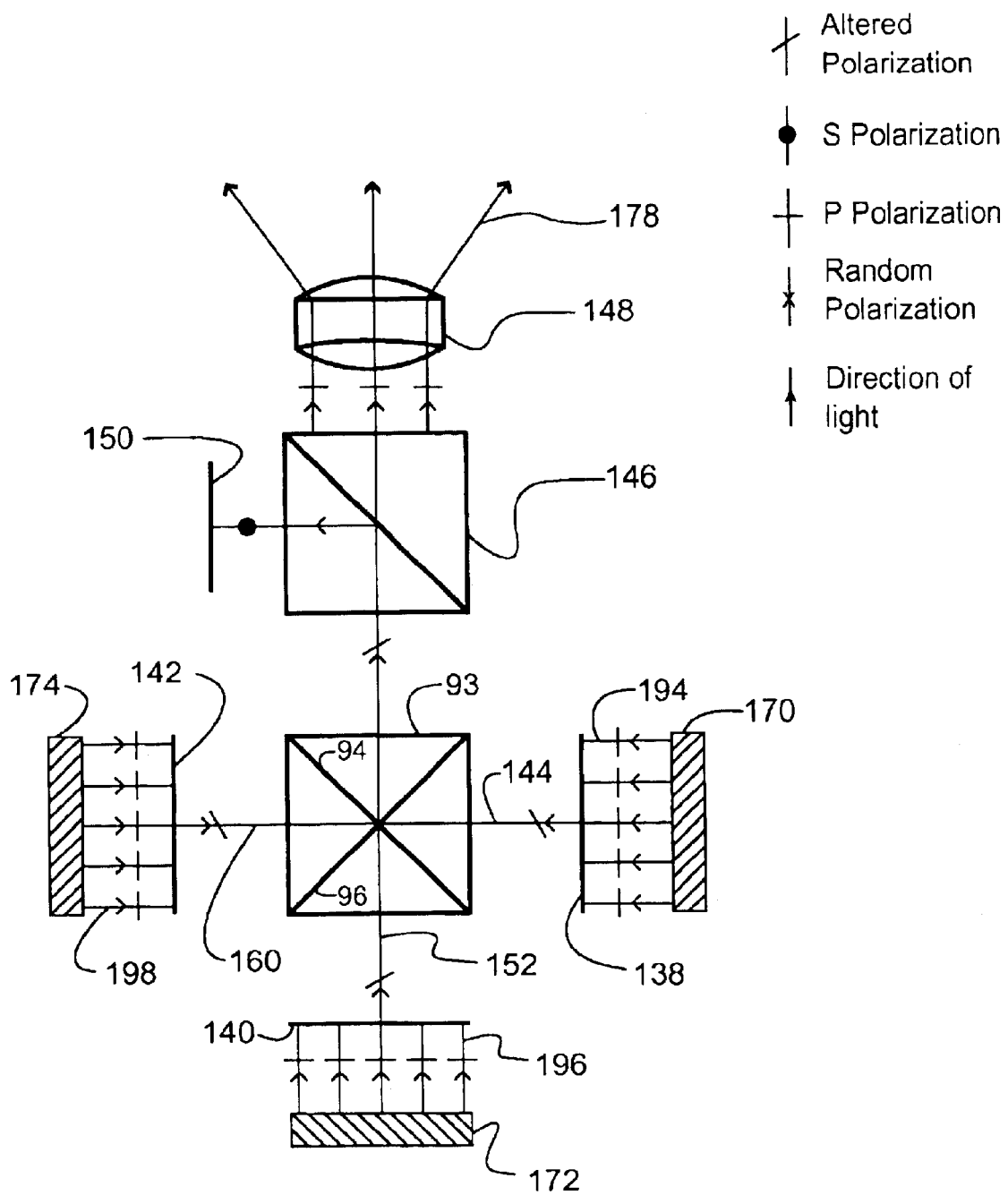
FIG. 8E is a schematic illustration of a preferred embodiment of a system for an LCLV projector in accordance with the invention using a dichroic beam combiner and using individual separated light sources such as rectangular linear arrays of laser diodes, LEDs, fluorescent flat plates, or neon flat plates.
Figure 8F:
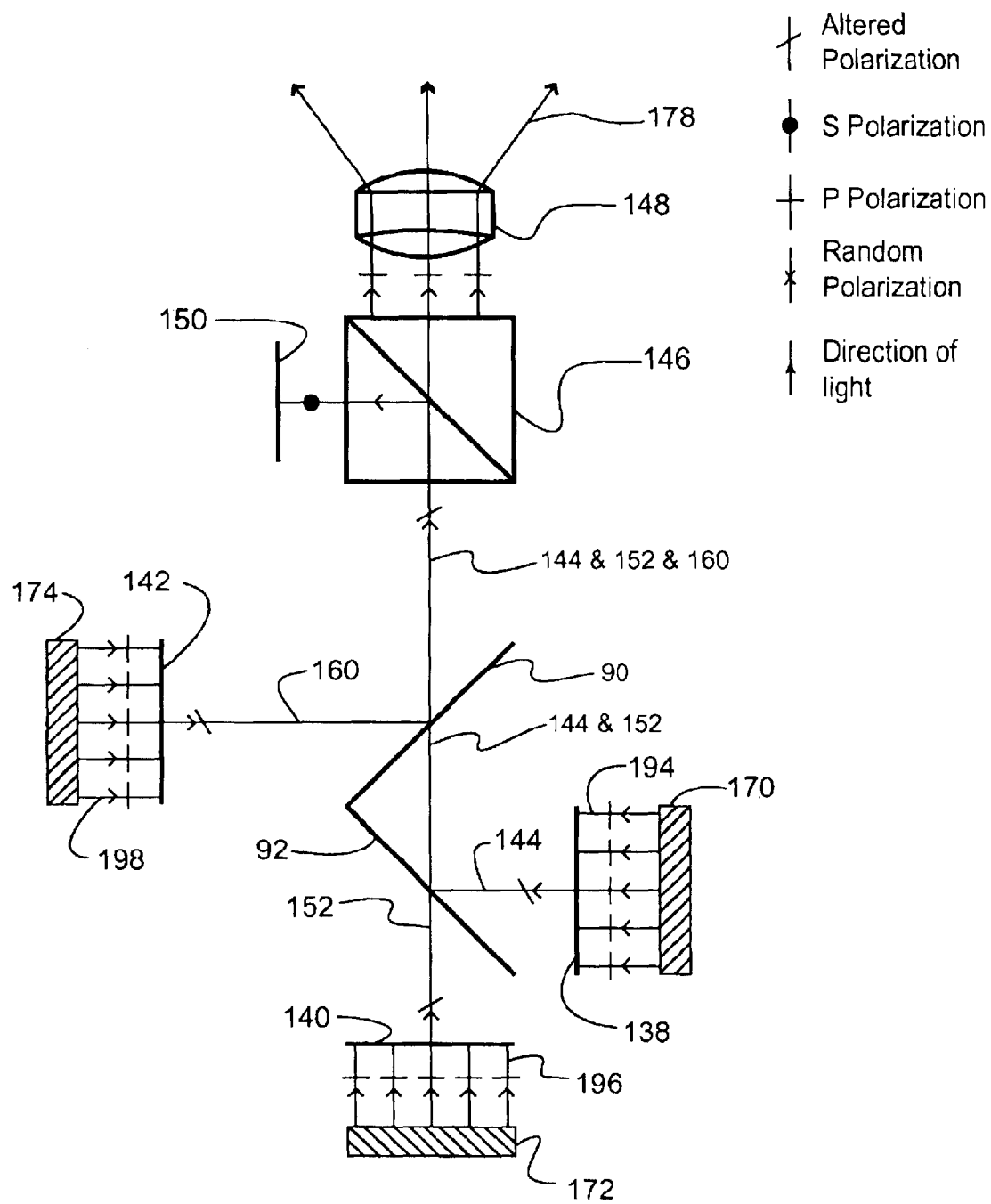
FIG. 8F is a schematic illustration of a preferred embodiment of a system for an LCLV projector in accordance with the invention using a separated dichroic mirror means for beam combination and using individual separated light sources such as rectangular linear arrays, laser diodes, LEDs, fluorescent flat plates, or neon flat plates.
Figure 8G:
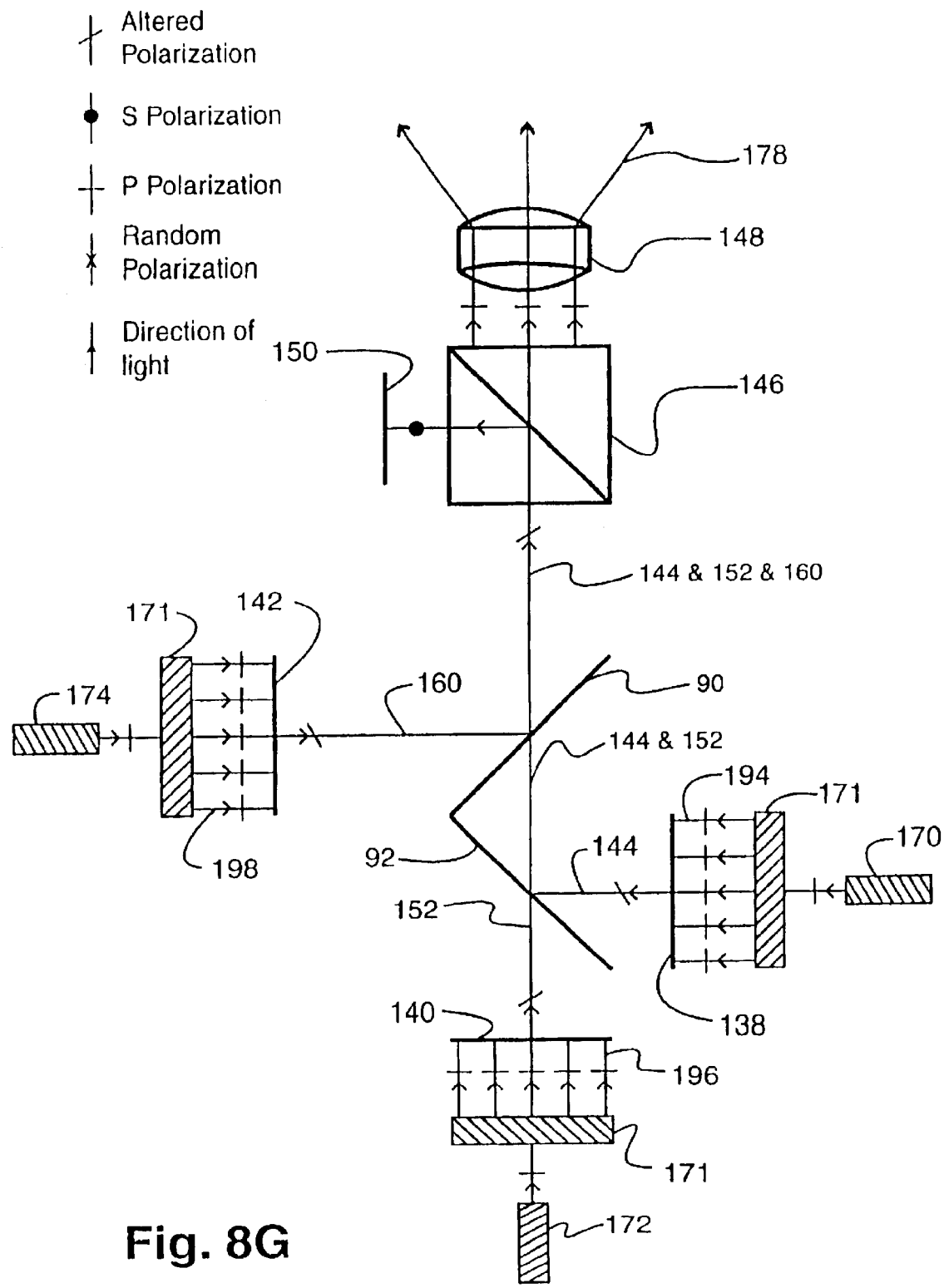
FIG. 8G is a schematic illustration of a preferred embodiment of a system for an LCLV projector in accordance with the invention using a separated dichroic mirror means for beam combination and using individual separated light sources such as single light sources such as argon ion lasers or high intensity white lights.

Yet another alternative embodiment of a color LCLV projector is shown in FIGS. 8E through 8G. The alternative embodiment in FIG. 8E utilizes independent light sources 170, 172 & 174 for forming a beam that is used to alter the orientation of the electric field vector by LCDs 138, 140 & 142. These light sources 170, 172 & 174 in FIGS. 8E, 8F may be of several different forms and functions. Such light sources can include a matrix of linear array diodes formed in a rectangular shape, a planar matrix of solid state lasers, LEDs light emitting diodes, etc., whereas in FIG. 8G, the light sources 170a, 172a & 174a can be a single beam output laser beam with an output beam converted into a rectangular shape for use by LCDs 138, 140 and 142. The light sources form respectively, beams 194, 196 and 198. In FIG. 8E, after each beam has the respective portions of their beams altered by the LCDs 138, 140 and 142 changing the orientation of the electric field vector of the respective portions, the altered beams 144, 152 and 160 are then combined in dichroic beam combiner means 93 to form a single collinear beam with a plurality of portions. This collinear beam is then passed to the polarizer analyzer 146 where it resolves the respective portions into P and S components with the S component being deflected to the left to beam block 150 and the P component passing through to the projection lens 148 where it is then displayed on a screen (not shown in FIG. 8E).

Yet another alternative embodiment of the color LCLV projector is shown in FIG. 8F. However, the dichroic beam combiner 93 has been replaced by two separate dielectric mirrors 90, 92 that function to combine the three individual beams into a single collinear beam.

In another embodiment shown in FIG. 8G, the light sources 170a, 172a, 174a are single beam output lasers such as are found in a gas type of laser. The output is converted to a rectangular output. The rest of FIG. 8G functions and operates exactly as in FIG. 8E.

By way of example and not limitation, a system and method constructed in accordance with the invention offers the following results and advantages over prior art illumination systems for a LCLV projector.

A rectangular singular polarized beam is created that will efficiently fill the aperture of an LCD display thus maximizing the output of light from an LCD projector.

The divergence of the resultant beam at the LCD display is smaller than with other methods of combination, i.e., U.S. Pat. No. 4,913,529.

The system of the invention enables projectors to utilize brighter light sources for projection, thus enabling the person viewing the projection to see the projection source in higher ambient light levels.

With the system of the invention, projectors will be brighter and lighter.

With the system of the invention, projectors will consume less energy due to the more efficient light source.

With the system of the invention, television projected on the larger screen video will be easier to watch.

Method for Producing a High Resolution or 3-D Projected Color Image

Figure 19:
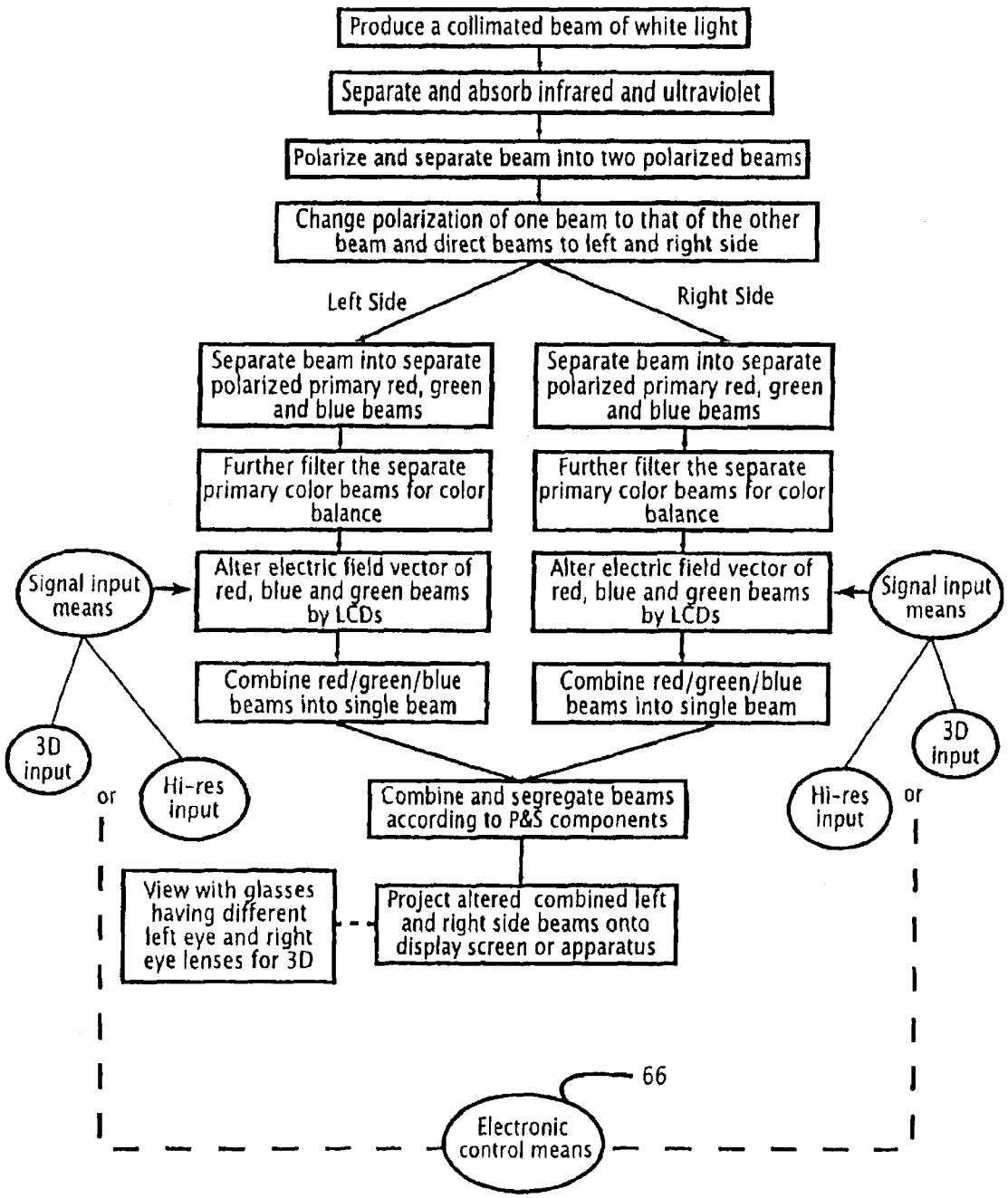
FIG. 19 is a schematic flow diagram of a color LCLV projector constructed in accordance with an illustrative embodiment of the invention.

With reference to FIG. 19, a schematic flow diagram of a method for producing a high resolution or 3-D projected color image is shown. The method and system for the invention can be summarized as follows: producing a collimated source beam of white light; separating and absorbing infrared and ultraviolet components from the source beam; polarizing and separating the source beam into two separate orthogonally polarized beams; changing a polarization direction of one of the orthogonally polarized beams to produce two polarized beams of the same orientation of the electric field vector and directing each of the separate polarized beams, respectively, to a left or a right side of the projector; separating the polarized left side beam and the polarized right side beam into separate polarized primary color beams (red, green, blue); further filtering the separate polarized primary color beams to provide a color balance; alter the orientation of the electric field vector of the separate polarized primary color beams with separate LCD's each of which is responsive to separate signal input means; (for 3-D viewing, the signal input means for the left side corresponds to a left eye image and the signal input means for the right side corresponds to a right eye image; in either case (3-D or high-resolution), the separate right side and left side signal input means are controlled by suitable electronic control means 66. It is to be understood that control electronics 66 can separate the video signal of HDTV into right and left video signals. As a result, this allows 3-D TV by use of the broadcast standard for HDTV.]; combining the altered separate polarized primary color beams; combining altered left and right side color beams into a unitary altered beam; resolving the combined beams according to the P & S vector components of the altered beams; projecting the unitary altered beam onto a viewing screen; (for 3-D viewing, a viewer may wear eye glasses having lens for viewing a left eye or a right eye image polarized in different directions).

Figure 20:
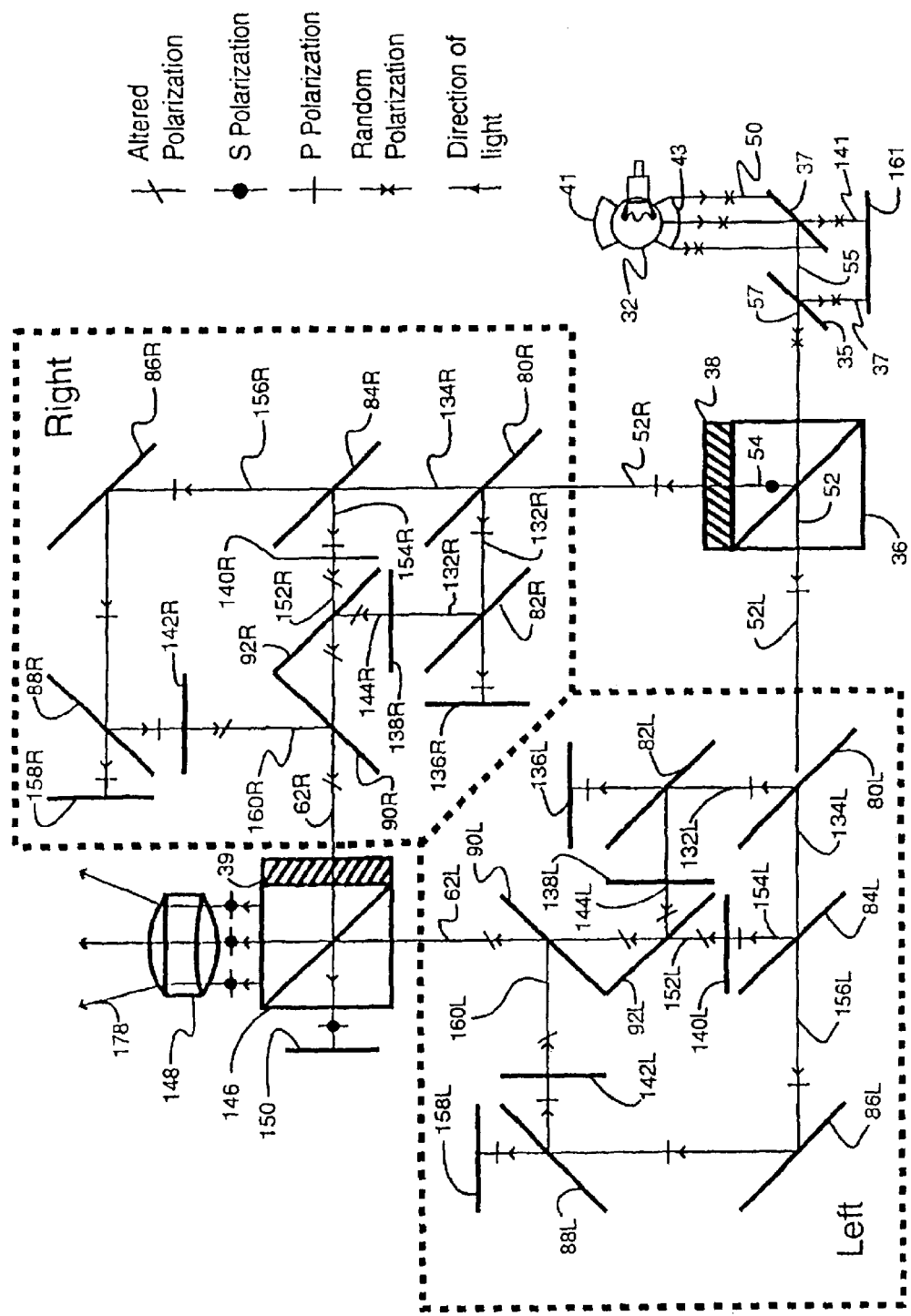
FIG. 20 is a diagrammatic representation of a 3-D color LCLV projector constructed in accordance with a preferred embodiment of the invention.

Referring now to FIG. 20, a projector constructed in accordance with an illustrative embodiment of the invention is shown. FIG. 20 is labeled with locative directions illustrating an optic path for convenience sake only and does not necessarily resemble what the actual layout may be. As long as all of the components are aligned in suitable optic paths with one another, other arrangements of the illustrative components arranged other than illustrated in FIG. 20 can be utilized.

Referring to the previous section, a source beam 57 is generated for input to the polarizer cube 36. The polarizer cube 36 separates and polarizes the source beam 57 into two orthogonally polarized beams, beam 52 and beam 54, of equal area and with different polarizations. A P-polarized beam 52L is propagated straight through the polarizer cube 36 to enter the left side of the projector. The other polarization component of the source beam 57, the S-polarized portion of the source beam 57, beam 54, is passed through a half-wave retarder 38 where it is converted or changed into a beam 52R of P-polarization. Beam 52R is then passed into the right side of the projector. Both the left side and right side of the projector thus function with beams 52L and 52R of the same polarization. Alternately, the projector is constructed to operate with beams of a different polarization direction, i.e., S-polarized.

Half-wave retarder 38 may be one of a class of optical elements known as retarders, which serve to change the polarization of an incident wave. With a retarder, one component of the P-polarized light is somehow caused to lag in phase behind the other component by a predetermined amount. Upon emerging from the retarder 38, the relative phase of the two components is different than it was initially and thus the polarization state is different as well. A retardation plate that introduces a relative phase difference of 900 is known as half-wave retarder. Alternately, mirrors may be used to produce a light beam that has been retarded appropriately.

A general discussion of half-wave retarder 38 requirements and specifications has been previously discussed above. Additionally, in place of the polarizer cube 36, any other suitable means for separating the source beam 57 and for producing orthogonally polarized beams (52, 54) may be utilized.

The left and right sides of the projector, which are enclosed in a broken line in FIG. 20 and labeled as such, will now be described. The left side and the right side of the projector include identical components arranged in identical optical paths. However, the parts have an additional L or R added to distinguish one from the other. Simply stated, both the left and right side include: means (mirrors 80 and 84) for separating a polarized beam of white light (52R or 52L) into separate primary color beams, red, green, blue; means in the form of LCDs 138, 140, 142, for altering the orientation of the electric field vector of individual portions of the separate polarized primary color beams responsive to separate signal input means controlled by a separate electronic control means 60 (FIG. 19); and means (mirrors 92, 90) for combining the altered separate polarized primary color beams.

Two separate beams, beams 62L and 62R, formed by the left side and right side of the projector, respectively, are combined and segregated a final time by a polarization analyzer 146 (combining and segregating means) and projected by a projector lens 148 as a beam 178 onto a viewing screen (not shown in FIG. 20).

Suitable electronic control means 66 (FIG. 19) control and coordinate the input signals to the separate left side and right side LCDs (138, 140, 142). For 3-D viewing, the electronic control means may be constructed to provide a visual image to the left side corresponding to a left eye image, and to the right side corresponding to a right eye image. Additionally, the left eye image and the right eye image can be superimposed with one another or timed sequentially. For example, as shown in FIG. 20, locatively, the right side can be moved up or down by mechanical or electrical means (not shown). For a high resolution projected image, the control means 66 can be constructed to provide a visual image to the left side which is offset from the visual image provided to the right side (i.e., offset by one pixel vertically or horizontally).

For convenience sake, the identical components of the left side and the right side of the projector are labeled with the same reference numerals. Left side polarized light beam 52L enters the left side of the projector and right side polarized light beam 52R enters the right side of the projector. The operation of the left side is as previously described in the section on the color projector above and shown in FIG. 20. The operation of the right side is the same with the distinction of different locative directions of the various light beams.

At this point, the beam 62L formed by the left side is transmitted into the bottom (locative direction only) of the polarizer analyzer 146 and the beam is segregated according to the P and S components of the electric field vector. The beam 62R formed by the right side of the projector is passed into the right side of the polarizer analyzer 146 (locative direction only) and is accordingly segregated to the P and S components of the electric field vector. The color beams to be displayed (red, green and blue) have passed through the system and the projection lens 148 to be projected onto the screen (not shown in FIG. 20); they are combined or superimposed on each other to produce a pixelized image that has the correct color balance. The right side of the projector functions in exactly the same manner with the same components. Before entering the polarizer analyzer 146, however, the polarization of right side beam 62R must be changed by the half-wave retarder 39 so that the right side beam 62R will be deflected by a 90° angle for combination with the left side beam 62L.

The projection lens 148 considerations and its proximity to a screen have been previously discussed above.

Figure 21:
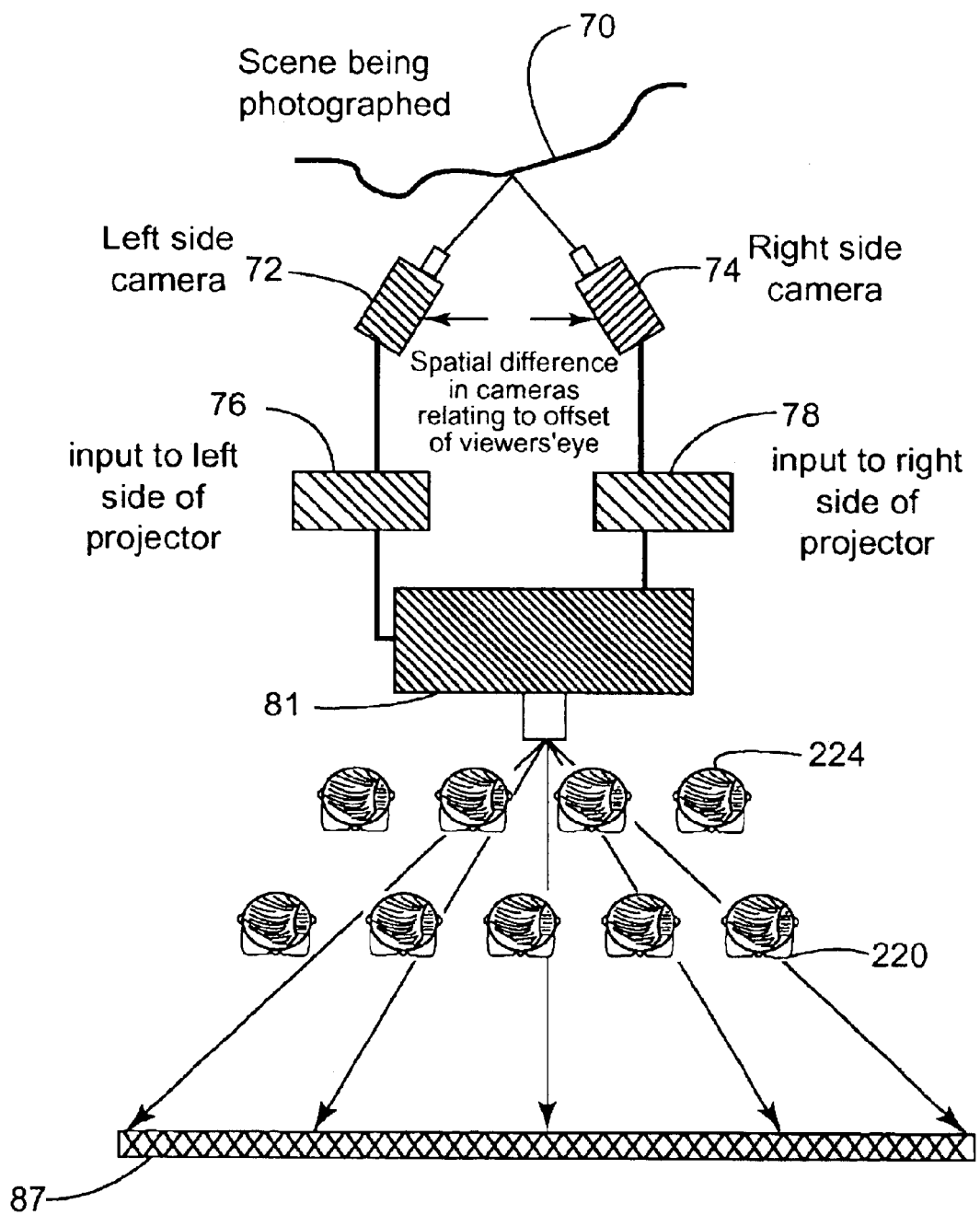
FIG. 21 is a schematic diagram of a two camera projector method for use with an illustrative embodiment of a 3-D projector constructed in accordance with the invention.

FIG. 21 illustrates such a 3-D application of a projector constructed in accordance with the invention. As shown in FIG. 21, a scene 70 is photographed with a left side camera 72 and a right side camera 74. The left side camera 72 provides an input signal 76 to the left side of the projector 81, while the right side camera 74 provides an input signal 78 to the right side of the projector 81. The electronic control means 66 (FIG. 19) may be operated as previously described to provide these separate inputs into the projector 81 from the left side input 76 and the right side input 78. The left side image may be polarized in a first direction and the right side image polarized in a different direction. By using viewing glasses 220, an image projected onto a viewing surface or screen 87 appears displayed as 3-D to viewers 224. Alternately, the control means 66 is configured to display left side and right side images in a timed sequence. This will also produce a 3-D effect with or without the use of glasses 220.

Figure 20A:
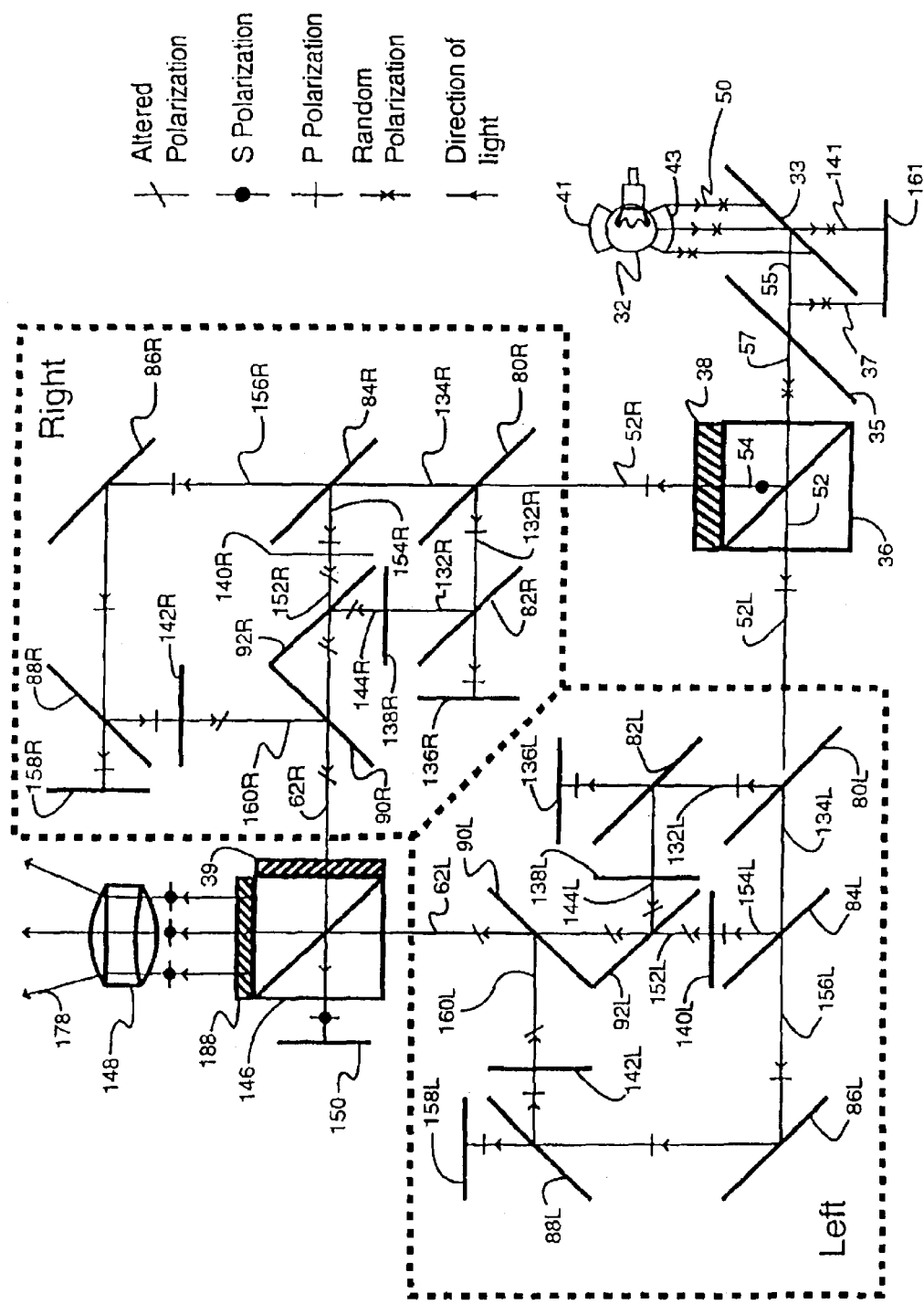
FIG. 20A is a diagrammatic representation of a 3-D color LCLV projector constructed in accordance with a preferred alternate embodiment of the invention using an additional quarter-wave retarder.

The alternate embodiment shown in FIG. 20A is the same as the preferred embodiment of FIG. 20 with the addition of a quarter-wave retarder 188 situated in an optic path between the projection lens 148 and the polarizer analyzer 146. The alternate embodiment projector of FIG. 20A can be used to provide a projected image which is circularly polarized. This can be used, for example, for providing circularly polarized left and right side images for use with circularly polarized viewer glass lens for 3-D projection.

Figure 20B:
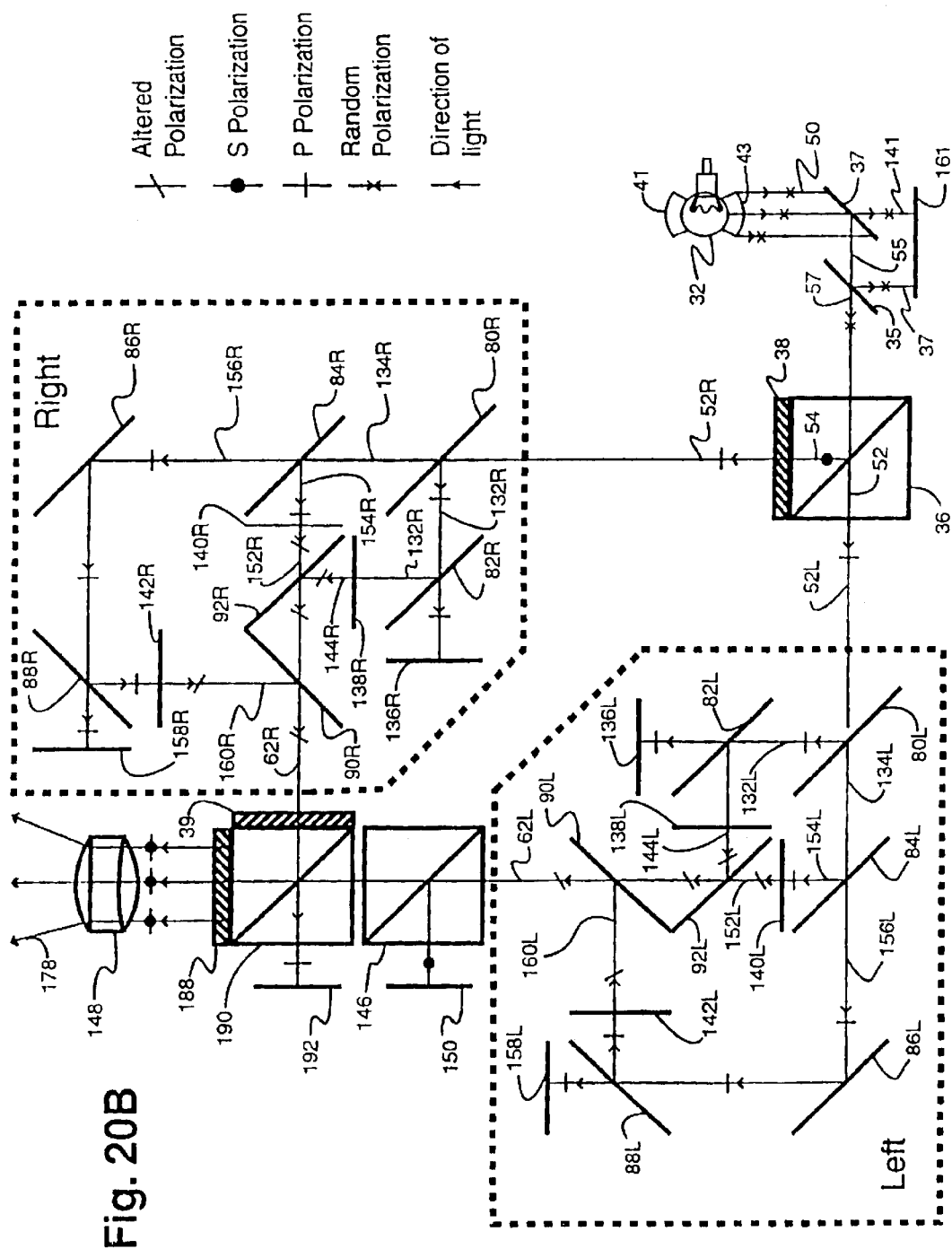
FIG. 20B is a diagrammatic representation of a 3-D color LCLV projector constructed in accordance with another alternate embodiment of the invention for use with circular polarization viewing lenses.

Yet another alternate embodiment is shown in FIG. 20B. The alternate embodiment of FIG. 20B is almost the sane as the alternate embodiment of FIG. 20A which added the quarter-wave retarder 188. The embodiment of FIG. 20B, however, also includes a second polarizer analyzer 190 (on which is mounted the half-wave retarder 39 and quarter-wave retarder 188) and rejection beam block 192 situated in an optic path between right side mirror 90R and polarizer analyzer 146. The second polarizer analyzer 190 is used to further analyze, segregate and combine the altered color beams 62R and 62L.

Figure 20C:
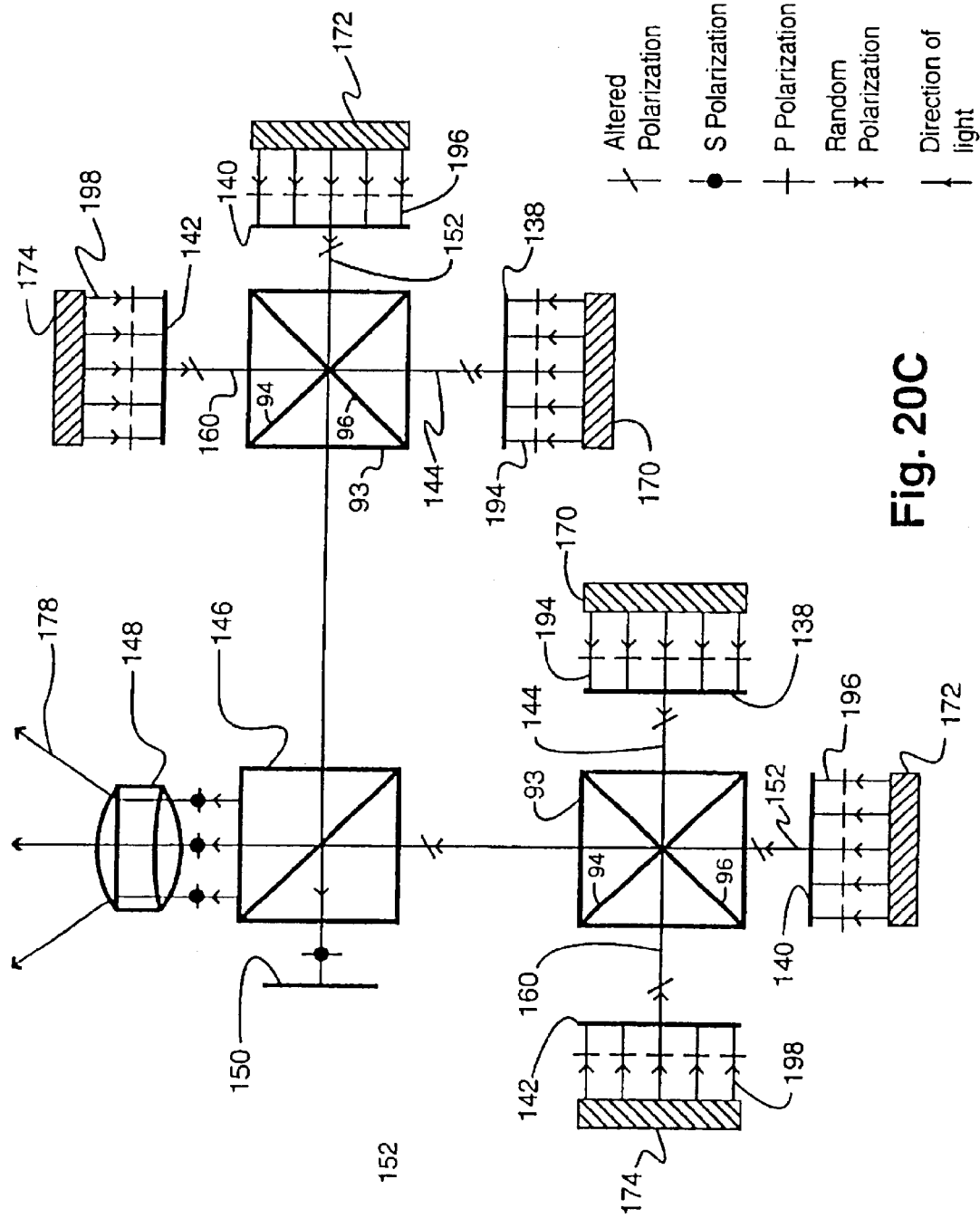
FIG. 20C is a schematic illustration of a preferred embodiment of a system for a dual beam LCLV projector suitable for 3-D, high brightness or high resolution in accordance with the invention using a dichroic beam combiner and using individual separated light sources such as rectangular linear arrays of laser diodes or LEDs.

In FIG. 20C (another alternative embodiment of the color LCLV 3-D projector), the re are now two constituent parts. Each constituent part generates a collinear beam as in FIG. 8F. They are then combined together in polarizer analyzer 146 as explained for the diagram and with reference to FIG. 8F. This combination can be of the form where the beams are combined exactly one on the other with different polarizations or one beam can be shifted with respect to the other so that the plurality of portions are offset from one another, or the portions overlap one another. Also, as explained before, the timing of the beams can produce beams that are temporally in sync with one another or can alternate between the different fields of the desired information to be displayed.

Figure 20D:
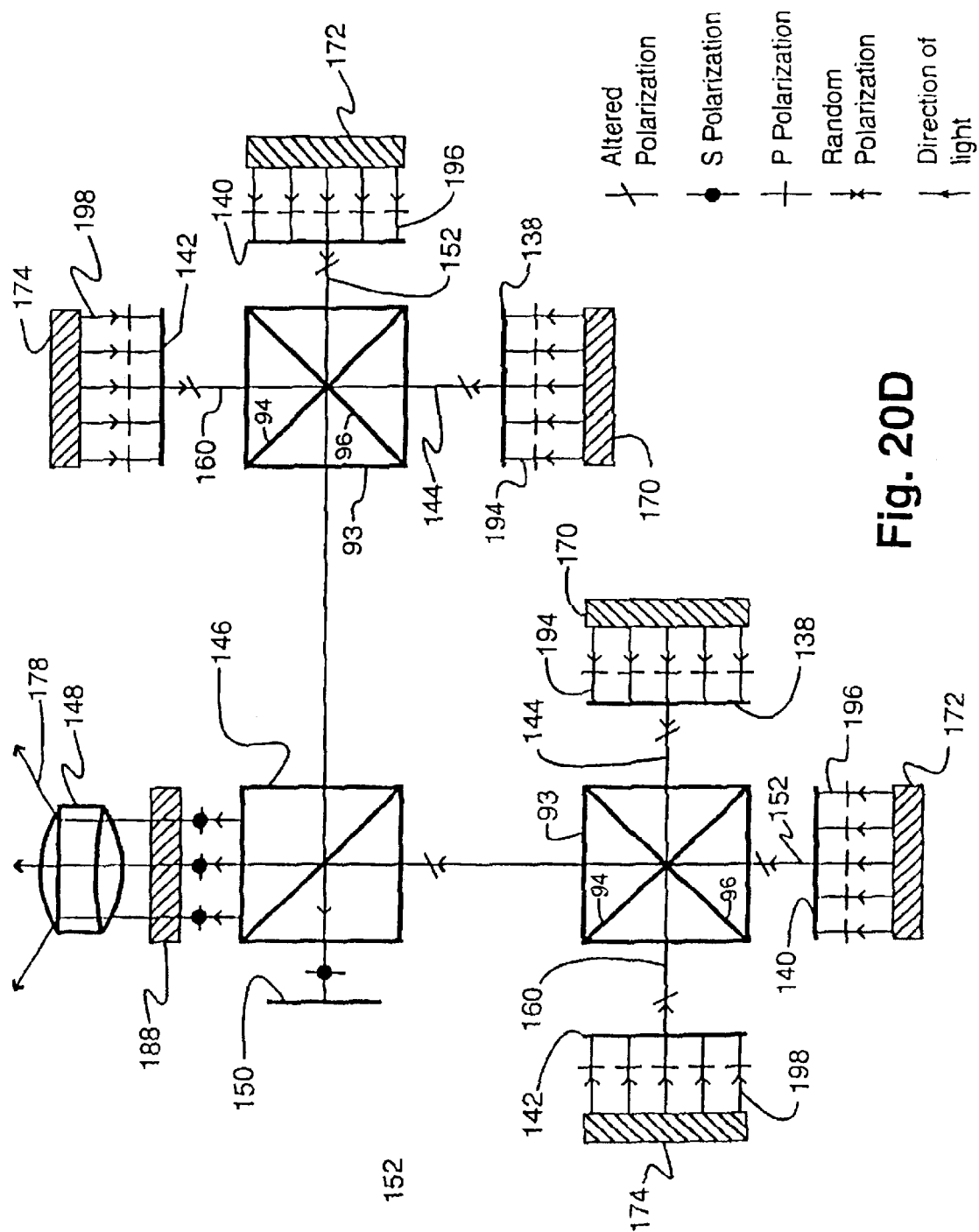
FIG. 20D is a schematic illustration of an alternative embodiment for a dual beam LCLV projector suitable for 3-D, high brightness or high resolution in accordance with the invention using beam combiners and using individual separated light sources such as rectangular linear arrays of laser diodes or LEDs and further using a LCD device as a variable retarder on the output beam.

FIG. 20D is the same as FIG. 20C, but with the addition of a quarter wave retarder 188 interposed between lens 148 and analyzer polarizer 146. This variable retarder functions to alter the plurality of portions of the segregated output beam from polarizer analyzer 146 such that each altered portion has a different electric field vector orientation. Thus each altered portion may be displayed on a different plane, such as that contained in screen or cube 175 shown in FIG. 23.

Method for Producing a High Resolution or 3-D Projected Black & White Image

Figure 22:
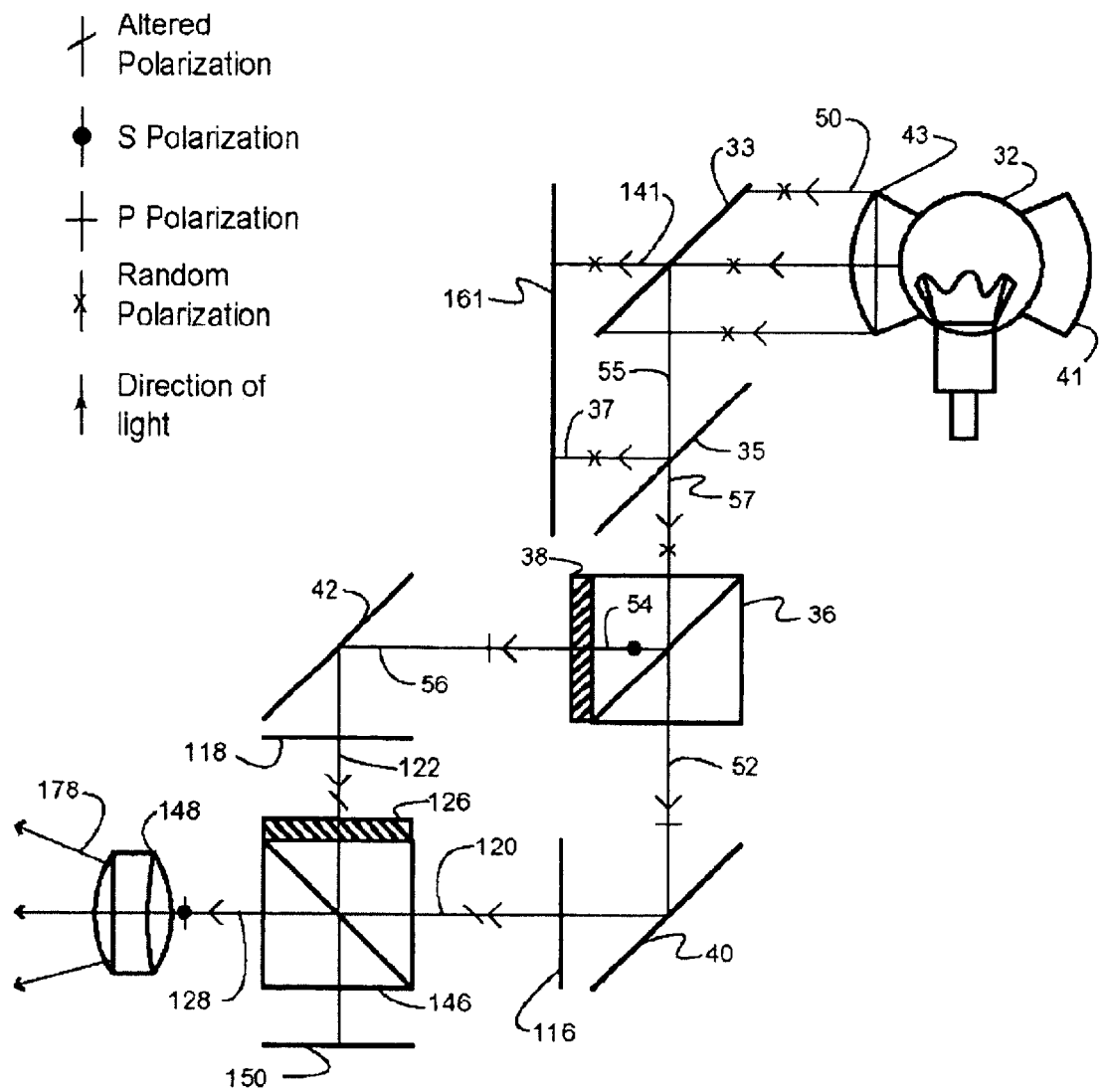
FIG. 22 is a preferred embodiment of a diagrammatic representation of a high resolution or three-dimensional black and white liquid crystal LCLV projector constructed in accordance with the invention.

Referring now to FIG. 22, an alternate embodiment high resolution or 3-D, black and white projector is disclosed. The black and white projector of FIG. 22 includes: a light source means 32 for producing a collimated source beam 50 containing white light; separation and absorption means in the form of mirrors 33 and 35 and beam block absorber 161 for removing and absorbing infrared and ultraviolet rays from the source beam 50; polarizing means in the form of a polarizer cube 36 for polarizing the source beam into two orthogonal beams, a P-polarized beam 52 and an S-polarized beam 54 with the S-polarized beam deflected at an angle of 90°; polarization changing means in the form of a half-wave retarder 38 for changing the direction of polarization of the S-polarized beam 54 to a second P-polarized beam 56; a first means in the form of a first LCD 116 for changing the orientation of the electric field vector of the first P-polarized beam-52 responsive to an input image to produce an altered first beam 120; second means in the form of a second LCD 118 for changing the orientation of the electric field vector of the second P-polarized beam 56 responsive to an input image to produce a second altered beam 122; a combining means in the form of a second polarizer cube 146 for combining the first 120 and second 122 altered beams; a second orientation of the electric field vector changing means in the form of a second half-wave retarder 126 located in an optic path between the second LCD 118 and the second polarizer cube 146 for converting the direction of polarization of the second altered beam 122; projection lens means in the form of a projection lens 148 for projecting a beam 128 from the second polarizer cube 146 as beam 178 onto a display screen (not shown in FIG. 22); and control means (not shown in FIG. 22; but see means 66 in FIG. 19) for providing and controlling input signals to the LCDs 116, 118.

The black and white projector shown in FIG. 22 functions in the same manner as the color projector shown in FIG. 20 without the color separation and combining as previously described. Moreover illumination of the LCDs 116, 118 is similar to the method described in previous sections.

As is apparent from the previous description, first LCD 116 and second LCD 118 may be controlled by control means with an input image to produce a 3-D effect or a high resolution image as previously described. That is, left eye and right eye corresponding images can be presented or encoded in different polarization states or timed sequentially or both.

Figure 22A:
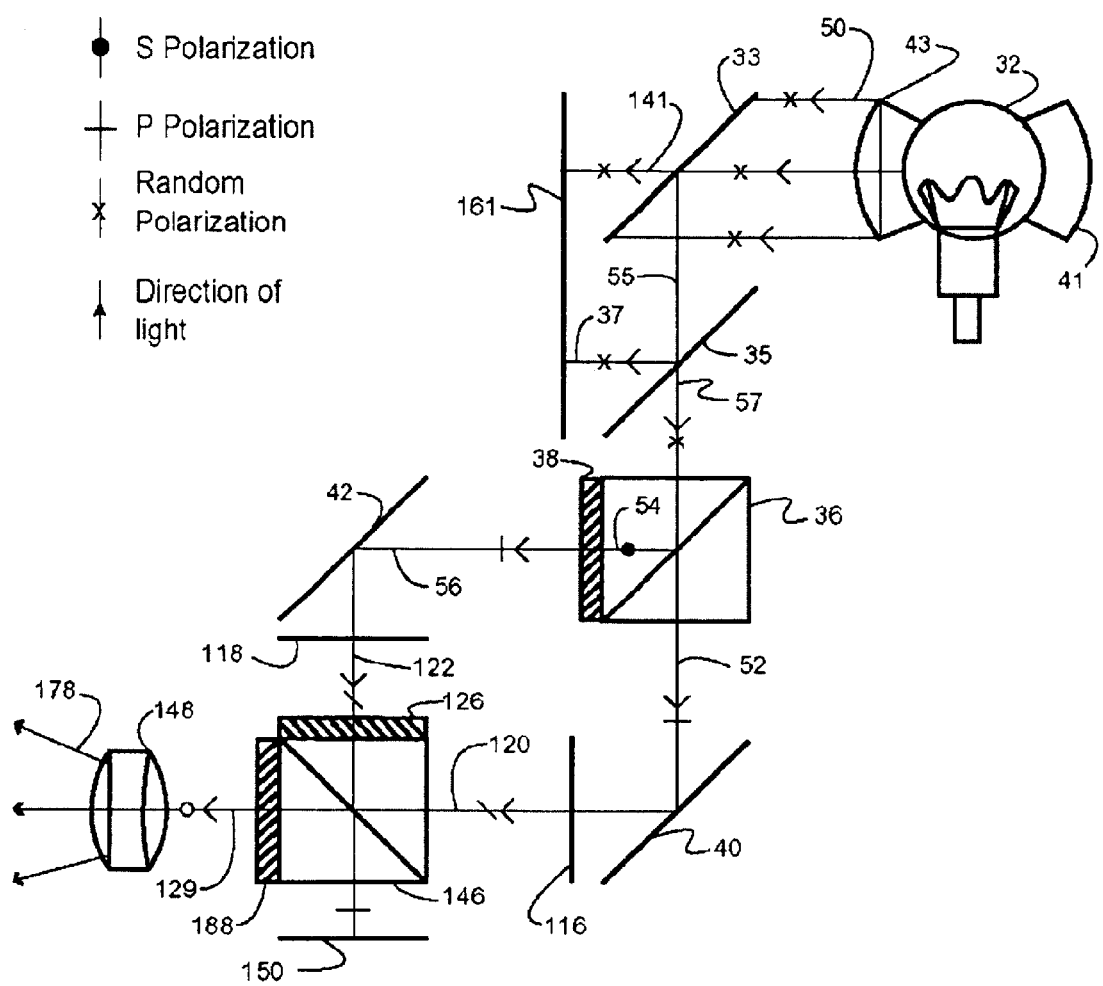
FIG. 22A is a diagrammatic representation of a preferred alternate embodiment high resolution or three-dimensional LCLV projector constructed in accordance with the invention using a quarter-wave retarder.

Referring now to FIG. 22A, an alternate embodiment of the black and white projector shown in FIG. 22 is shown. The alternate embodiment of FIG. 22A is exactly the same as that of FIG. 22 but with the addition of a quarter-wave retarder 188 for providing a projected image in the form of a circular polarization beam 129. As previously described, this can be used with circularly polarized viewer glasses for viewing a 3-D image.

Thus, the projector and method of the invention can also be adapted to provide a high-resolution or 3-D black and white image.

Method for Producing a 3-D Viewing Screen

Figure 23:
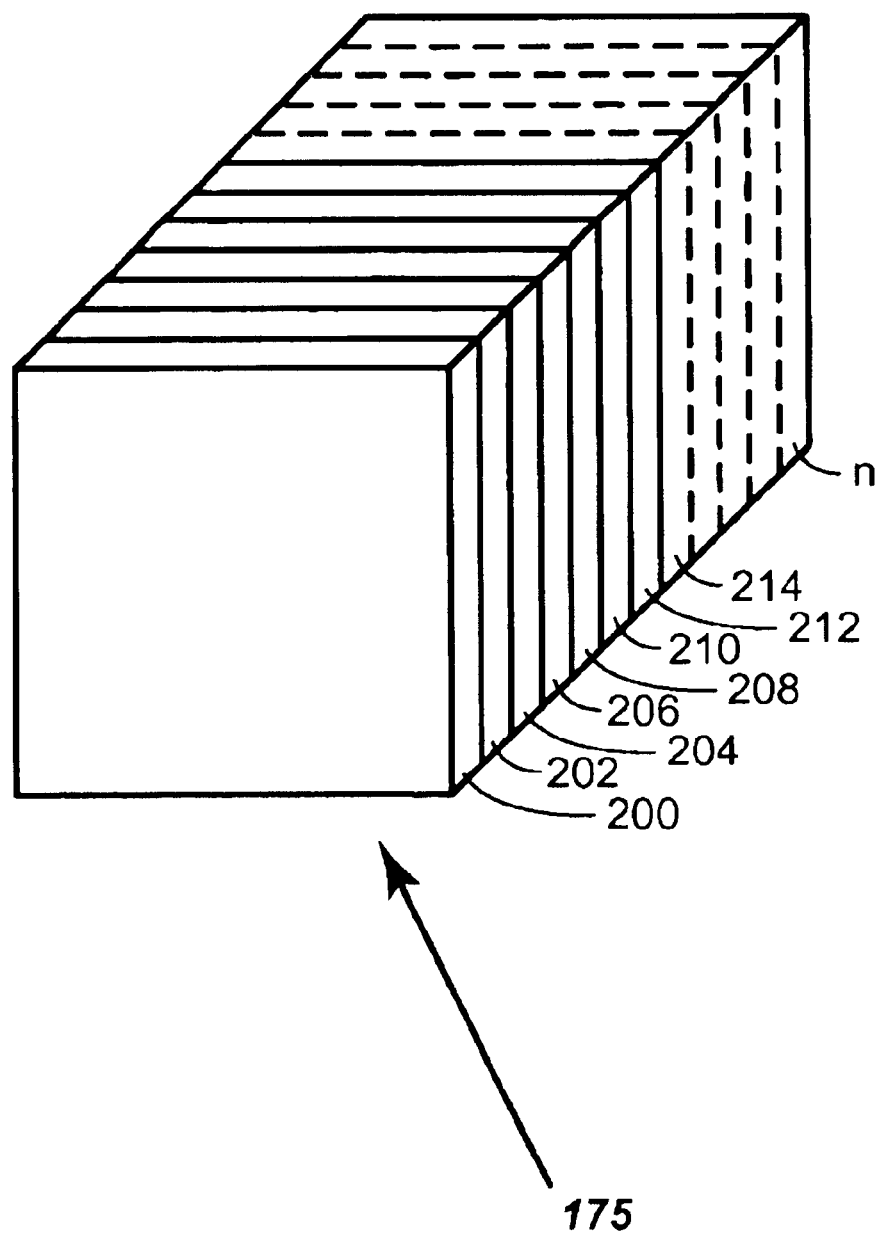
FIG. 23 is a schematic illustration of a preferred embodiment of a system for using a device as a 3-D screen or 3-D viewing cube.

FIG. 23 is the diagrammatic representation of the buildup of layers of a projection screen or the formation of a 3-D visualization cube. Referring now to FIG. 23, a new and novel display device is disclosed. The device acts in accordance with a beam generated by a 3-D projector such as disclosed in this document. The orientation of the electric field vector can be varied by such a device as a variable retarder 188 that is placed between the beam polarizer analyzer 146 and the output lens 148, such as shown in FIGS. 20A, 20B & 20D. This device acts by rotating the orientation of the electric field vector according to the drive electronics. This output beam is then fed into the device of FIG. 23. The device in FIG. 23 comprises a multiplicity of layers, each layer having a coating that is different from the successive layer whereby each layer is reflective to a particular (or range) orientation of the electric field vector. For example, layer 200 is reflective to the electric field vector that corresponds to a vector that has rotation between 0° and 5°. Layer 202 is reflective to an electric field vector that has an orientation between 5° and 10°. Layer 204 is reflective to an electric field vector that has a rotation between 10° and 15°. This would continue on for the multiplicity of layers that are contained within the device in FIG. 23. Thus, when a beam is incident upon the device in FIG. 23, the first image plane is on layer 200, the next image plane is on layer 202, the next image plane on layer 204, etc. The final image on the nth plane 216 is then reflected. By having a multiplicity of layers, images are displayed.

An alternate to the above device would replace the reflection on the planes with ones that would absorb, with the final plane 216 transmitting the remaining light.

As an alternative to the step indexes of reflection, a device is used that has a graded index of reflection with respect to the electric field vector of rotation for each individual plane layer.

Method for Producing a Flat Fluorescent Plate

Figure 24:
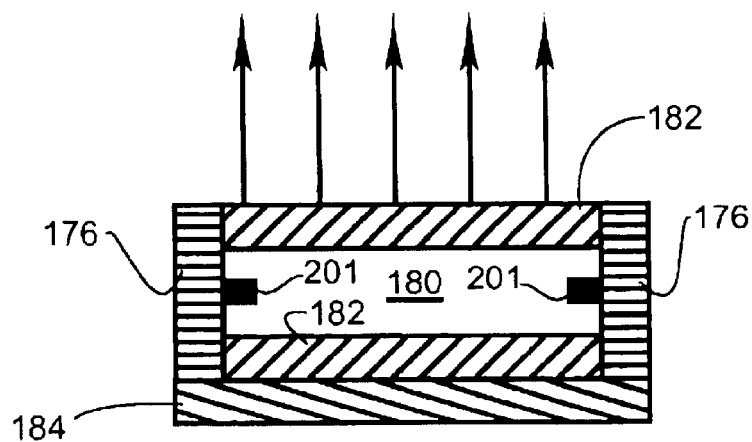
FIG. 24 is a schematic illustration of a preferred embodiment of a system for producing fluorescent lighting via a flat plate arrangement.
Figure 24A:
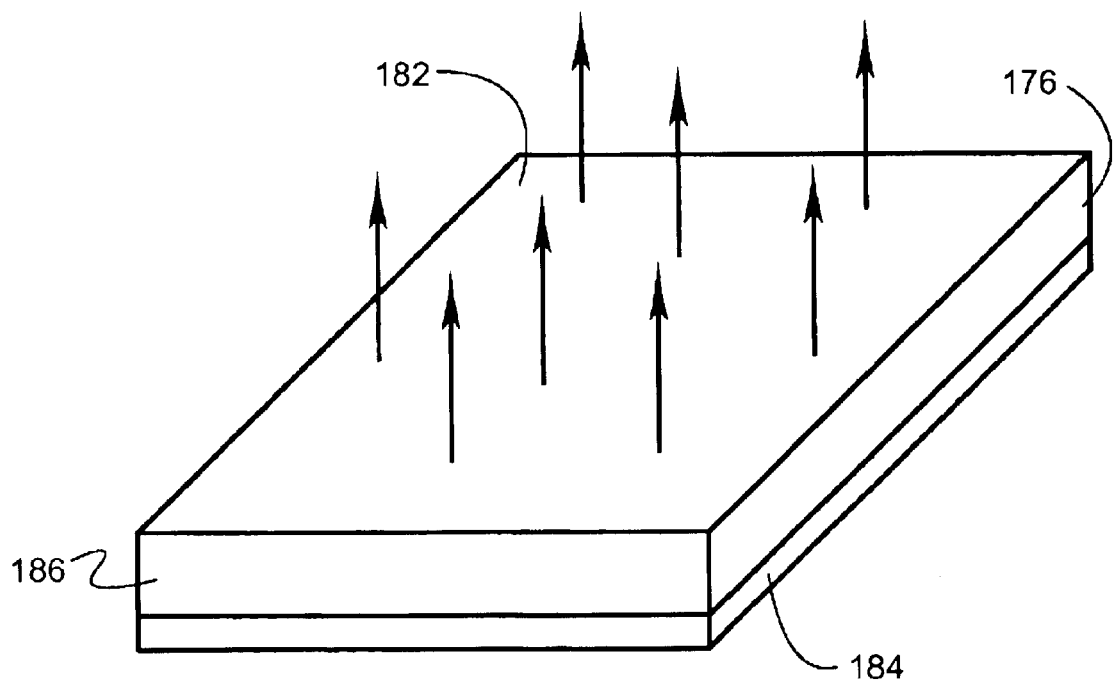
FIG. 24A is a perspective view of the device in FIG. 24.

FIGS. 24 and 24A illustrates an embodiment of a flat fluorescent or neon illumination plate that is used in conjunction with FIGS. 8E, 8F, 20C & 20D. A gas, 180, is surrounded by transparent plates 182 and metallic side pieces 176 and end caps 186. A voltage difference, applicable for the proper gas, is applied between electrodes 201, causing the atoms in the gas to go into an excited state. By coating the surfaces of the transparent plates 182 with a material that fluoresces, light will be emitted. Furthermore, a reflecting surface 184 can be applied to further reflect all of the light out of one surface. In addition, the upper surface 182 that light is emitted from can be made or formed like FIG. 27, such that the light emitted will be collimated. Also, by choosing different gases, different coatings on the transparent plates 182, and different excitation voltages and currents, the light emitted may be of different light spectrums (colors and intensities).

Method for Producing Laser Diode Matrix Array

Figure 25:
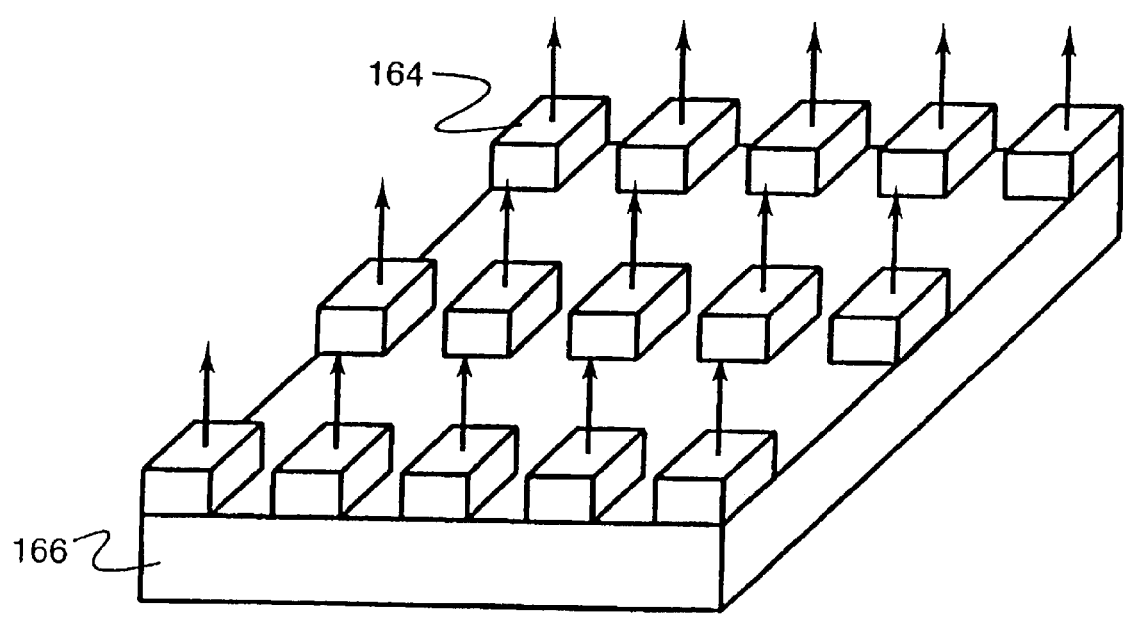
FIG. 25 is an illustration of a preferred embodiment of a system for producing a linear matrix array of laser diodes for use in FIGS. 8E, 8F, 20C & 20D.

FIG. 25 demonstrates the linear matrix array of individual LEDs or laser diodes 164 on substrate 166 that could be used for generating a collimated light source for use in FIGS. 8E, 8F, 20C & 20D. Light is emitted from laser diode 164 (or LED) in a collimated beam from its surface in a single beam. The system is made of a plurality of laser diodes 164 arranged in an appropriate matrix to line up with the cells in the LCDs.

Method for Producing a Collimated Beam of Light

Figure 28:
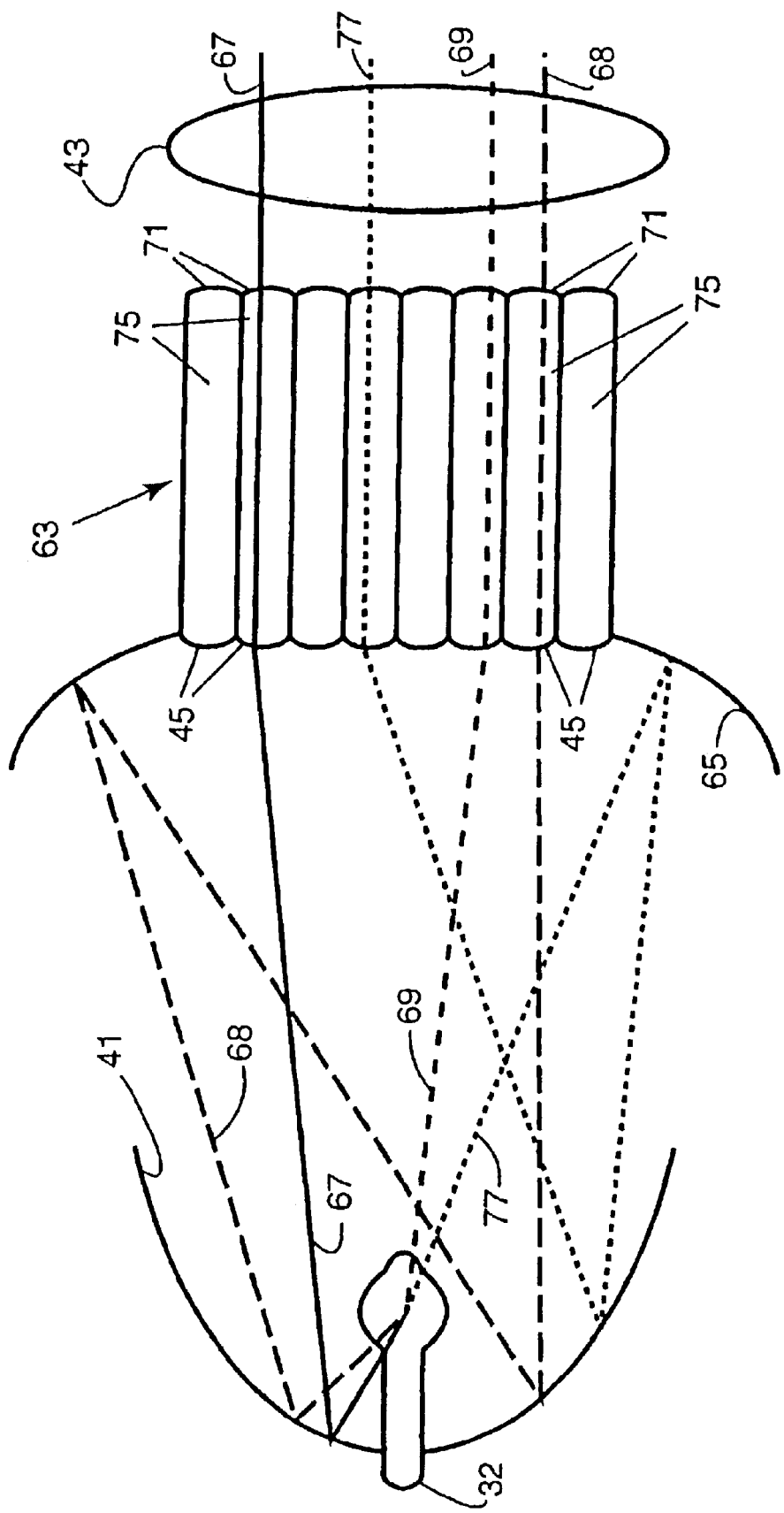
FIG. 28 is a preferred embodiment of an illustrative drawing of a system for producing a collimated beam of light including a light source, a first and second reflecting means, a light integrator means and a collimating means.

FIG. 28 is a preferred embodiment of an optical integrator/light source/reflector arrangement that provides a new and novel method of providing a collimated light beam with a substantially uniform flux intensity substantially across the entire beam. The operation of the basic elements are well known, however the combination of the elements is novel. The way the device operates is as follows:

(1) light is emitted by the light source 32 in a spherical fashion;

(2) portions of the light emitted from the light source will either travel in the forward direction or rearward direction (as viewed in FIG. 28) and behave in the manner of one of the following four cases:

(a) strike the first lenses 45 formed on the first ends of the plurality of light pipes included in the light integrator means 63 as shown by light path 69 in FIG. 28; or (b) strike the second concave reflecting means 65 where the light is reflected from and directed back toward the first concave reflecting means 41 where it is then reflected from and directed toward the light integrator means 63 and strike the first lenses 45 formed on the first ends of the plurality of light pipes included in the light integrator means 63 as shown by light path 77 in FIG. 28; or (c) strike the first concave reflecting means 41 and be reflected toward the light integrator 63 where it strikes the first lenses 45 formed on the first ends of the plurality of light pipes included in the light integrator means 63 as shown by light path 67 in FIG. 28; or (d) strike the first concave reflecting 41 where it is reflected from and directed towards the second concave reflecting means 65 where the light is then reflected and directed back toward the first concave reflecting means 41 where it is reflected and directed toward the light integrator 63 to strike the first lenses 45 formed on the first ends of the plurality of light pipes included in the light integrator means 63 as shown by light path 68 in FIG. 28;

(3) the light striking the first lenses 45 of the plurality of light pipes will be bent according to the angle of entry and lens formula and travel through the body 75 of the light pipe and exit the light pipe through the second lens 71 formed on the second end of the light pipe 75; and (4) the light at this time has substantially uniform flux intensity and collimation, and travels to lens 43 for further collimation.

The light integrator means is made of a plurality of parallel light pipes such as those shown in FIG. 27A, each light pipe being [adjacent and] in contact with one or more adjacent light pipes. Each light pipe consists of a first lens surface 45 formed on a first end thereof, a body 75, and a second lens surface 71 formed on a second end thereof. The first lens surface 45 functions to bend light more towards the normal. Body 75 carries the light to the second lens surface 71 and has the same index of refraction as the first lens surface 45 and second lens surface 71. This minimizes the number of interfaces the light must pass through. Continuing on, light strikes the second lens surface 71 which is ground to a predetermined shape, and is again bent more normal, thus the light rays exiting surface 71 are substantially collimated. Lens surfaces 45 and 71 may or may not be of the same shape or form and are dependent upon several factors, including, but not exclusive to, the size of the light source, the shape of the light source, the type of light source, the distance from the light source to the first lens surface 45, the length and size of body 75, the distance of the integrator second lens surface 71 to the target, and other factors known in the trade.

As shown in FIG. 28, the second concave reflecting means 65 has an opening formed therethrough in which is mounted a light integrator means 63. The light integrator means 63 substantially occupies the opening in said second concave reflecting means 65. The light integrator means 63 has an optical axis that is coincident with the optical axis of the second concave reflecting means 65. The cross section of the light integrator means 63 may be either rectangular, circular, elliptical, octagonal, or any desired shape. The shape of the light integrator means is dependent upon the final desired shape of the beam formed exiting from the integrator.

The first concave reflecting surface means 41 has an optical axis. The light means 32 is mounted along said optical axis. The optical axes of the first and second concave reflecting means 41 and 65 are coincident.

The system of this invention preferably includes a lens 43 positioned to receive the light from the second end of the light integrator means 63. The lens 43 further collimates the light beam from the light integrator means 63.

The first and second concave reflecting means 41 and 65 are preferably parabolic or elliptical in shape.

Figure 27B:
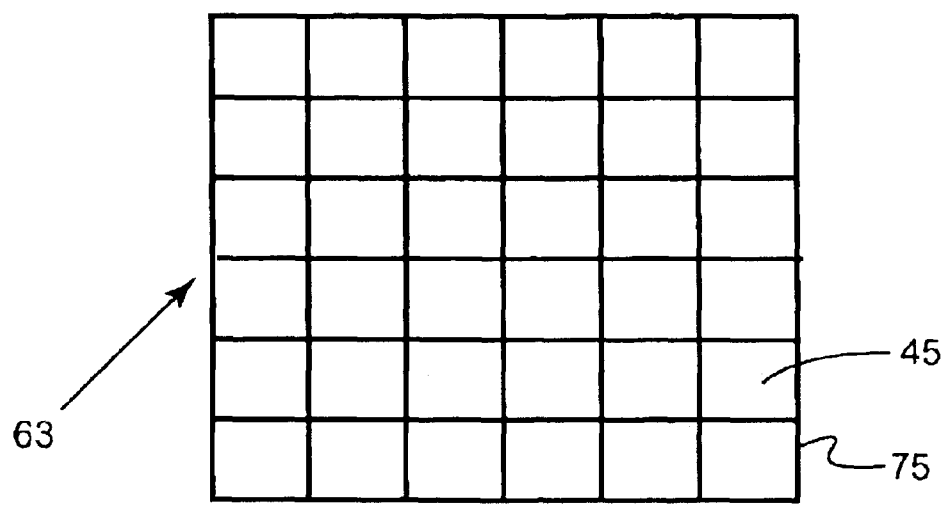
FIG. 27B is a preferred embodiment of an illustrative drawing of a fly-eye arrangement of the light pipes in the optical integrator shaped in a rectangular shape and with the light pipes made in a square shape.
Figure 27C:
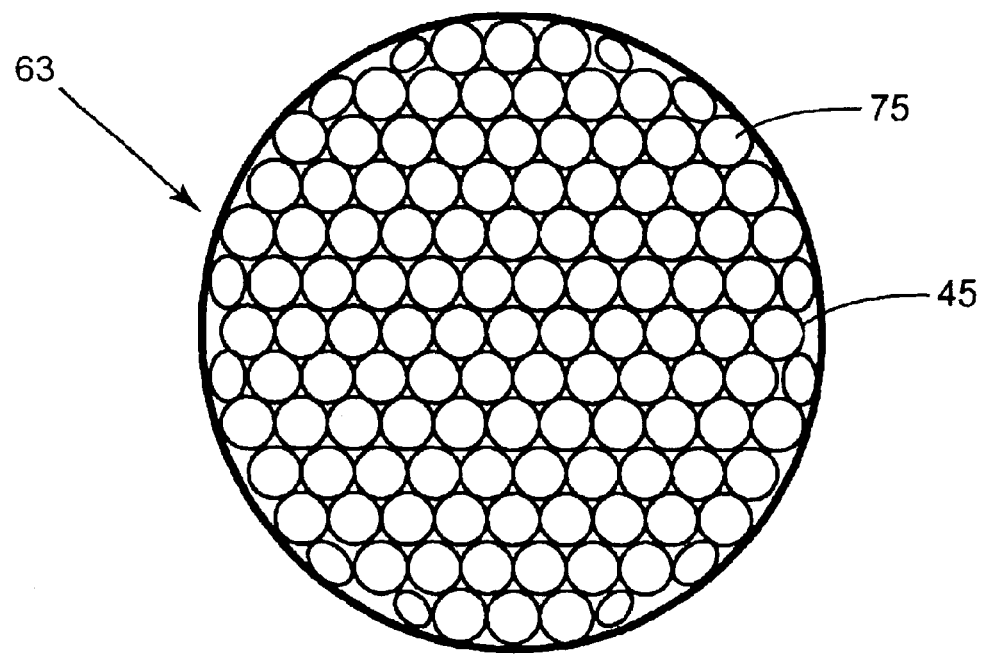
FIG. 27C is a preferred embodiment of an illustrative drawing of a fly-eye arrangement of the light pipes in the optical integrator shaped in a circular shape and with the light pipes made in a circular shape.

The optical light pipes are formed in a fly-eye arrangement in juxtaposition to each other as shown in FIGS. 27, 27B & 27C. The optical light pipes can be of circular, rectangular, octagonal, or any convenient geometrical shape as required by the application intended as shown in FIGS. 27B & 27C.

The light integrator means 63 is well known in prior art, as shown in U.S. Pat. No. 4,918,583 to Kudo et al., U.S. Pat. No. 4,769,750 to Matsumoto et al., U.S. Pat. No. 4,497,015 to Konno et al., U.S. Pat. No. 4,668,077 to Tanaka. These patents are mainly for forming a uniform intensity across a beam of light or ultraviolet for use in integrated circuit manufacturing. However the interaction of the light source, the two reflecting surfaces and the light integrator is novel. In order to make the system work properly, the design must take into consideration the light source and its radiation pattern, the first and second reflecting means 41 and 65 and the lenses 45, 71 formed respectively on the first and second surfaces of each light pipe included in the light integrator means 63 and the position of the particular individual light pipe in the matrix of the light integrator means 63. For such analysis, a commercially available computer ray tracing program such as Optics Analyst or Genii-Plus available from Genesse Optics Software, Inc., 3136 Winton Road South, Rochester, N.Y., 14623 or Beam Two, Beam Three, or Beam Four from Stellar Software, P.O. Box 10183, Berkeley, Calif., 94709 can be used in the design of the lens and reflecting means formula for the shapes needed in regard with the particular light source that is chosen.

Thus, the invention provides a color liquid crystal light valve LCD projector that produces an image of high brightness, contrast and resolution. Additionally, harmful infrared and ultraviolet rays have been removed from the projected image. Moreover, in light of the herein described invention, components of the system can be modified or easily adjusted to produce a color enhanced image.

At the present time, the overall preferred single embodiment of a projector constructed in accordance with the invention disclosed herein is a projector for producing a modulated beam of light suitable for projection of video images, comprising: means for providing a first initial beam of light having randomly changing orientations of the selected component of the electric field vectors; means for integrating the first initial beam of light to form a second initial beam of light having a substantially uniform flux intensity across substantially the entire second initial beam of light; means for collimating the second initial beam of light into an initial collimated beam of light having randomly changing orientations of the selected component of the electric field vectors and a substantially uniform flux intensity across substantially the entire second initial beam of light; means for removing from the initial collimated beam of light at least a portion of ultraviolet and infrared to produce an initial collimated beam of white light and directing the removed portions to a beam stop whereby the removed portion is absorbed; means for resolving from the initial collimated beam of white light an initial collimated first resolved beam of white light having substantially a first single selected predetermined orientation of a chosen component of the electric field vectors and an initial collimated second resolved beam of white light having substantially a second single selected predetermined orientation of a chosen component of the electric field vectors, whereby the first and second single selected predetermined orientation of the chosen component of the electric field vectors are different from one another, means for forming from the initial collimated first resolved beam of white light and initial collimated second resolved beam of white light a substantially collimated rectangular initial single beam of white light having substantially the same single selected predetermined orientation of a chosen component of the electric field vectors across substantially the entire beam of light and a substantially uniform flux intensity across substantially the entire initial collimated single beam of white light; means for separating the collimated rectangular initial single beam of white light into two or more separate collimated rectangular beams of color whereby each of the separate collimated rectangular beam of color has the same single selected predetermined orientation of a chosen component of the electric field vectors as that of the other separate collimated rectangular beams of colors and each separate collimated rectangular beam of color having a different color from the other separate collimated rectangular beams of colors; means for adjusting the color by removing at least a predetermined portion of color of at least one of the separate collimated rectangular beam of colors and directing the removed portion to a beam stop whereby the removed portion is absorbed; means for altering the single selected predetermined orientation of the chosen component of the electric field vectors of a plurality of portions of each separate collimated rectangular beam of color by passing a plurality of portions of each separate collimated rectangular beam of color through a respective one of a plurality of altering means whereby the single selected predetermined orientation of the chosen component of the electric field vectors of the plurality of portions of each separate beam of color is altered in response to a stimulus means by applying a signal means to the stimulus means in a predetermined manner as the plurality of portions of each of the substantially collimated separate beams of electromagnetic energy passes through the respective one of the plurality of altering the single selected predetermined orientation of a chosen component of the electric field vectors; means for combining the altered separate collimated rectangular beams of color into a single collimated rectangular collinear color beam without substantially changing the altered selected predetermined orientation of the chosen component of the electric field vectors of the plurality of portions of each separate collimated rectangular beam of color, means for resolving from the single collimated rectangular collinear color beam a first collimated rectangular resolved color beam having substantially a first single selected predetermined orientation of a chosen component of the electric field vectors and second collimated rectangular resolved color beam having substantially a second single selected predetermined orientation of a chosen component of the electric field vectors, whereby the first and second single selected predetermined orientation of the chosen component of the electric field vectors are different from one another; and means for passing one of the first collimated rectangular or second collimated rectangular resolved color beam to a projection means.

In light of the previous discussions and further in the description and claims, it will become apparent that the following partial list of the advantages of the invention is:

high brightness is easily achieved: brightness is limited only by the LCD characteristics, and brightness is not changed by the reflection of any of the light paths back into the light source, brightness can be easily modified by changing light sources;

improved efficiency means lower heat: a high efficiency optical path is utilized and the only significant heating in the optics is due to LCD absorption;

modifications are simple: optics can accommodate any intensity and variety of LCDs;

a unique light path provides a rectangular beam: less ghosting, no light is returned to the light source, better polarization control, high contrast ratios, more compact projector, more easily manufactured, refuses or eliminates light diffraction, no deterioration of the polarizers;

longevity: longer life polarizers, the components are exposed to less heat;

increased resolution/brightness: not resolution limited, improved resolution with increased brightness;

materials: uses transmissive (non-reflective) LCDs, polarizers do not absorb light, reduces the number of imaging objects, reduced amount of critical imaging objects;

registration of pixels: provides a collinear output beam with no angular difference between pixels;

color resolution and registration is easily adjusted;

three-dimensional capability can be obtained with the same type of components at little additional cost;

other objects, advantages and capabilities of the present invention will become more apparent as the description proceeds.

While the invention has been particularly shown and described with reference to preferred embodiments thereof, it will be understood by those skilled in the art that various changes in form and details can be made without departing from the spirit and scope of this invention.

NO.
Use Description of Usage
30 combined polarized beam from source
31 point light source
32 light source
33, infrared mirror
34 LCD display
35 ultraviolet mirror
36 polarizing beam splitter
37 ultraviolet portion of source beam 55
38 half-wave retarder
39 half-wave retarder
40 Broad band mirror
41 light source reflecting means
42 Broad band mirror
43 collimating lens or means
44 Broad band mirror
45 first lensing surface
46 Broad band mirror
47 polarized separated beam
48 color filters
49 separated polarized beam
50 unpolarized collimated beam of light
51 input polarized beam into LCD
52 P polarized beam
53 reflected beam
54 S polarized beam
55 resultant beam without infrared portion
56 reflected second P-polarized beam
57 source beam without ultraviolet portion
58 separated reflected beam
59 altered polarized beam
60 separated reflected beam
62 left side beam output
63 integrator
64 right side beam output
65 light source reflecting means
66 control means
67 light ray
68 light ray
69 light ray
70 scene
71 second lensing surface
72 left side camera
73 rays from light source
74 right side camera
75 body of integrator
76 left side input to projector
77 light ray
78 right side input to projector
80 red-green/blue splitting mirror
81 projector
82 red mirror/filtering means
84 green-blue splitting mirror
86 blue mirror
87 viewing screen
88 blue mirror/filter
89 quarter-wave retarder
90 mirror/combiner for red/green-blue
92 mirror/combiner for red and green
93 dichroic combiner or splitter
94 coating in X dichroic (oriented for red)
96 coating in X dichroic (oriented for blue)
100 LCD cell or pixel
101 liquid crystal material
103 transparent plate
104 transparent plate
105 spacer for LCD cell
106 spacer for LCD cell
107 sealing element
108 sealing element
109 conductive coating
110 conductive coating
116 first LCD 118 second LCD
120 first altered beam
122 second altered beam
126 second half-wave retarder
128 combined S&P beam
129 Combined S&P beam in elliptical beam
132 red beam
134 green/blue beam
136 red beam block
138 red LCD
140 green LCD
141 Infrared portion of visible light beam
142 blue LCD
144 altered red beam
146 polarizer analyzer
148 projector lens
150 rejection beam block
152 altered green beam
154 green beam
156 blue beam
158 blue beam block
160 altered blue beam
161 beam block absorber
164 laser diodes or leds
166 substrate
170 Single red light source
171 beam expander means
172 Single green light source
174 Single blue light source
175 3D polarization viewing device
176 metallic end pieces
178 Projected beam through lens
180 gas
182 clear plates of glass for fluorescent tubes
184 silver reflector
186 end cap
188 quarter-wave retarder
189 Variable retarder
190 second polarizer analyzer
192 rejection beam-block
194 collimated red beam with 1 polarization
196 collimated green beam with 1 polarization
198 collimated blue beam with 1 polarization
200 1st surface for reflecting polarized beam
201 Electrodes
202 2nd surface for reflecting polarized beam
204 3rd surface for reflecting polarized beam
206 4th surface for reflecting polarized beam
208 5th surface for reflecting polarized beam
210 6th surface for reflecting polarized beam
212 7th surface for reflecting polarized beam
214 8th surface for reflecting polarized beam

What is claimed is:

1. A method of producing a modulated beam of light suitable for projection of video images, comprising:

[a] providing a first initial beam of light having randomly changing orientations of the selected component of the electric field vectors;

[b] integrating the first initial beam of light to form a second initial beam of light having a substantially uniform flux intensity across substantially the entire second initial beam of light;

[c] collimating the second initial beam of light into an initial collimated beam of light having randomly changing orientations of the selected component of the electric field vectors and a substantially uniform flux intensity across substantially the entire second initial beam of light

[d] removing from the initial collimated beam of light at least a portion of ultraviolet and infrared to produce an initial collimated beam of white light and directing the removed portions to a beam stop whereby the removed portion is absorbed;

[e] resolving from the initial collimated beam of white light an initial collimated first resolved beam of white light having substantially a first single selected predetermined orientation of a chosen component of the electric field vectors and an initial collimated second resolved beam of white light having substantially a second single selected predetermined orientation of a chosen component of the electric field vectors, whereby the first and second single selected predetermined orientation of the chosen component of the electric field vectors are different from one another;

[f] forming from the initial collimated first resolved beam of white light and initial collimated second resolved beam of white light a substantially collimated rectangular initial single beam of white light having substantially the same single selected predetermined orientation of a chosen component of the electric field vectors across substantially the entire beam of light and a substantially uniform flux intensity across substantially the entire initial collimated single beam of white light;

[g] separating the collimated rectangular initial single beam of white light into two or more separate collimated rectangular beams of color whereby each of the separate collimated rectangular beam of color has the same single selected predetermined orientation of a chosen component of the electric field vectors as that of the other separate collimated rectangular beams of colors and each separate collimated rectangular bean of color having a different color from the other separate collimated rectangular beams of colors;

[h] adjusting the color by removing at least a predetermined portion of color of at least one of the separate collimated rectangular beam of colors and directing the removed portion to a beam stop whereby the removed portion is absorbed;

[i] altering the single selected predetermined orientation of the chosen component of the electric field vectors of a plurality of portions of each separate collimated rectangular beam of color by passing a plurality of portions of each separate collimated rectangular beam of color through a respective one of a plurality of altering means whereby the single selected predetermined orientation of the chosen component of the electric field vectors of the plurality of portions of each separate beam of color is altered in response to a stimulus means by applying a signal means to the stimulus means in a predetermined manner as the plurality of portions of each of the substantially collimated separate beams of electromagnetic energy passes through the respective one of the plurality of altering the single selected predetermined orientation of a chosen component of the electric field vectors;

[j] combining the altered separate collimated rectangular beams of color into a single collimated rectangular collinear color beam without substantially changing the altered selected predetermined orientation of the chosen component of the electric field vectors of the plurality of portions of each separate collimated rectangular beam of color;

[k] resolving from the single collimated rectangular collinear color beam a first collimated rectangular resolved color beam having substantially a first single selected predetermined orientation of a chosen component of the electric field vectors and second collimated rectangular resolved color beam having substantially a second single selected predetermined orientation of a chosen component of the electric field vectors, whereby the first and second single selected predetermined orientation of the chosen component of the electric field vectors are different from one another; and

[l] passing one of the first collimated rectangular or second collimated rectangular resolved color beam to a projection means.

2. A system of producing a modulated beam of light suitable for projection of video images, comprising:

[a] means for providing a first initial beam of light having randomly changing orientations of the selected component of the electric field vectors;

[b] means for integrating the first initial beam of light to form a second initial beam of light having a substantially uniform flux intensity across substantially the entire second initial beam of light;

[c] means for collimating the second initial beam of light into an initial collimated beam of light having randomly changing orientations of the selected component of the electric field vectors and a substantially uniform flux intensity across substantially the entire second initial beam of light;

[d] means for removing from the initial collimated beam of light at least a portion of ultraviolet and infrared to produce an initial collimated beam of white light and directing the removed portions to a beam stop whereby the removed portion is absorbed;

[e] means for resolving from the initial collimated beam of white light an initial collimated first resolved beam of white light having substantially a first single selected predetermined orientation of a chosen component of the electric field vectors and an initial collimated second resolved beam of white light having substantially a second single selected predetermined orientation of a chosen component of the electric field vectors, whereby the first and second single selected predetermined orientation of the chosen component of the electric field vectors are different from one another;

[f] means for forming from the initial collimated first resolved beam of white light and initial collimated second resolved beam of white light a substantially collimated rectangular initial single beam of white light having substantially the same single selected predetermined orientation of a chosen component of the electric field vectors across substantially the entire beam of light and a substantially uniform flux intensity across substantially the entire initial collimated single beam of white light;

[g] means for separating the collimated rectangular initial single beam of white light into two or more separate collimated rectangular beams of color whereby each of the separate collimated rectangular beam of color has the same single selected predetermined orientation of a chosen component of the electric field vectors as that of the other separate collimated rectangular beams of colors and each separate collimated rectangular beam of color having a different color from the other separate collimated rectangular beams of colors;

[h] means for adjusting the color by removing at least a predetermined portion of color of at least one of the separate collimated rectangular beam of colors and directing the removed portion to a beam stop whereby the removed portion is absorbed;

[i] means for altering the single selected predetermined orientation of the chosen component of the electric field vectors of a plurality of portions of each separate collimated rectangular beam of color by passing a plurality of portions of each separate collimated rectangular beam of color through a respective one of a plurality of altering means whereby the single selected predetermined orientation of the chosen component of the electric field vectors of the plurality of portions of each separate beam of color is altered in response to a stimulus means by applying a signal means to the stimulus means in a predetermined manner as the plurality of portions of each of the substantially collimated separate beams of electromagnetic energy passes through the respective one of the plurality of altering the single selected predetermined orientation of a chosen component of the electric field vectors;

[j] means for combining the altered separate collimated rectangular beams of color into a single collimated rectangular collinear color beam without substantially changing the altered selected predetermined orientation of the chosen component of the electric field vectors of the plurality of portions of each separate collimated rectangular beam of color;

[k] means for resolving from the single collimated rectangular collinear color beam a first collimated rectangular resolved color beam having substantially a first single selected predetermined orientation of a chosen component of the electric field vectors and second collimated rectangular resolved color beam having substantially a second single selected predetermined orientation of a chosen component of the electric field vectors, whereby the first and second single selected predetermined orientation of the chosen component of the electric field vectors are different from one another; and

[l] means for passing one of the first collimated rectangular or second collimated rectangular resolved color beam to a projection means.

* * * * *